US012671107B2

(12) United States Patent
Lu et al.

(10) Patent No.: US 12,671,107 B2
(45) Date of Patent: Jun. 30, 2026

(54) MULTI-VOLTAGE BATTERY PACK, POWER TOOL SYSTEM AND CHARGING SYSTEM

(71) Applicant: Globe (Jiangsu) Co., Ltd., Changzhou (CN)

(72) Inventors: Chuntao Lu, Changzhou (CN); Xuyan Xie, Changzhou (CN); An Yan, Changzhou (CN); Xi Li, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 604 days.

(21) Appl. No.: 18/005,063

(22) PCT Filed: Aug. 3, 2021

(86) PCT No.: PCT/CN2021/110243
§ 371 (c)(1),
(2) Date: Jan. 11, 2023

(87) PCT Pub. No.: WO2022/028399
PCT Pub. Date: Feb. 10, 2022

(65) Prior Publication Data
US 2023/0261248 A1 Aug. 17, 2023

(30) Foreign Application Priority Data

Aug. 4, 2020 (CN) .......................... 202010771251.5
Aug. 4, 2020 (CN) .......................... 202010771279.9
(Continued)

(51) Int. Cl.
*H01M 10/04* (2006.01)
*H01M 50/204* (2021.01)
(Continued)

(52) U.S. Cl.
CPC ..... *H01M 10/0445* (2013.01); *H01M 50/204* (2021.01); *H01M 50/247* (2021.01); *H01M 50/269* (2021.01); *H01M 2220/30* (2013.01)

(58) Field of Classification Search
CPC ......... H01M 10/0445; H01M 10/4207; H01M 10/425; H01M 10/441; H01M 10/482;
(Continued)

(56) References Cited

U.S. PATENT DOCUMENTS

2018/0262152 A1* 9/2018 White ........................ B25F 5/02
2019/0259985 A1* 8/2019 Hanawa ................ H02J 7/0045
(Continued)

FOREIGN PATENT DOCUMENTS

CN 204464097 U 7/2015
CN 109360928 A 2/2019
(Continued)

OTHER PUBLICATIONS

Machine translation CN109360930A (Year: 2019).*

*Primary Examiner* — Victoria H Lynch

(57) ABSTRACT

Disclosure is a multi-voltage battery pack which includes: a housing, battery strings disposed inside the housing and including a plurality of battery cells, a battery interface disposed on the housing for use with the power tool, and a converting assembly disposed within the housing and electrically connected to the battery strings. The converting assembly has a first state, a second state, and a third state. The multi-voltage battery pack can separately output a first operating voltage, a second operating voltage, and a third operating voltage. The third operating voltage is greater than the second operating voltage, and the second operating voltage is greater than the first operating voltage.

20 Claims, 47 Drawing Sheets

(30) Foreign Application Priority Data

| | | |
|---|---|---|
| Aug. 4, 2020 | (CN) .......................... | 202010771291.X |
| Aug. 4, 2020 | (CN) .......................... | 202010771306.2 |
| Aug. 4, 2020 | (CN) .......................... | 202010771549.6 |
| Aug. 4, 2020 | (CN) .......................... | 202021589650.1 |
| Aug. 4, 2020 | (CN) .......................... | 202021589707.8 |
| Aug. 4, 2020 | (CN) .......................... | 202021589716.7 |
| Aug. 4, 2020 | (CN) .......................... | 202021590594.3 |
| Aug. 4, 2020 | (CN) .......................... | 202021590617.0 |

(51) Int. Cl.
    *H01M 50/247*          (2021.01)
    *H01M 50/269*          (2021.01)

(58) Field of Classification Search
    CPC ..... H01M 2010/4271; H01M 2220/30; H01M
                50/204; H01M 50/213; H01M 50/247;
                H01M 50/269; H01M 50/296; H01M
                50/503; H01M 50/509; H01M 50/51;
                                    H01M 6/42; Y02E 60/10
    See application file for complete search history.

(56) References Cited

U.S. PATENT DOCUMENTS

| | | | | |
|---|---|---|---|---|
| 2020/0176827 A1* | 6/2020 | Mao | .................... | H01M 50/213 |
| 2021/0175551 A1* | 6/2021 | Li | ....................... | H01M 10/441 |

FOREIGN PATENT DOCUMENTS

| | | | |
|---|---|---|---|
| CN | 109360930 A | 2/2019 |
| CN | 109638210 A | 4/2019 |
| CN | 110783651 A | 2/2020 |

* cited by examiner 1432
1435
142
143
145
146
1436
1423
1437
1425
1541
1513
151

144
142 total
negative total
positive

450 positive electrode
of the battery pack negative
electrode of the
battery pack

452

4521

4524          4522          4523 positive electrode
of the battery pack negative
electrode of the
battery pack

453

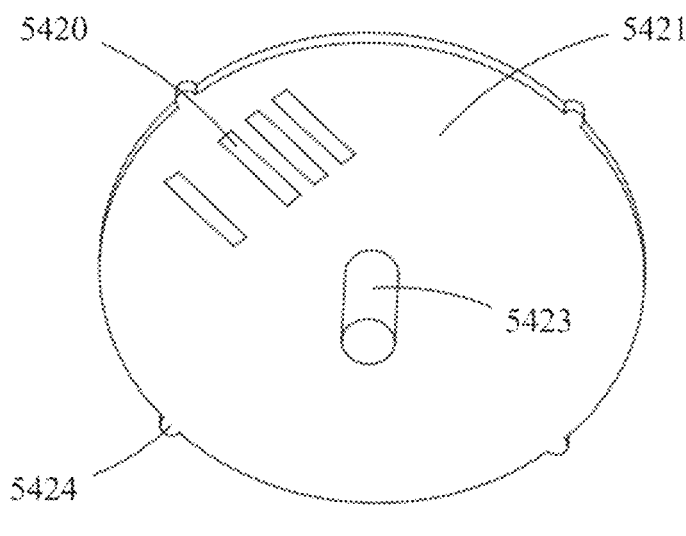
FIG.86
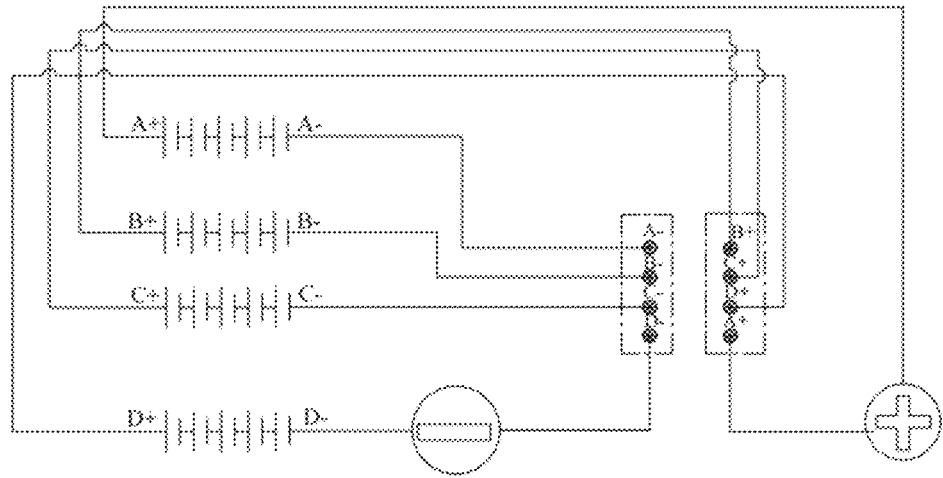
FIG.87
FIG.88

MULTI-VOLTAGE BATTERY PACK, POWER TOOL SYSTEM AND CHARGING SYSTEM

TECHNICAL FIELD

The disclosure relates to the technical field of battery packs, particularly to a multi-voltage battery pack, a power tool system and a charging system.

BACKGROUND

In garden machinery and power tool industries, tools with different rated voltages typically require battery packs with different rated voltages to supply power, that will cause the increase of categories and cost of battery pack.

Accordingly, it is necessary to design an improved battery pack, a power tool system and a charging system to solve the problems mentioned above.

BRIEF DESCRIPTION OF THE DISCLOSURE

The disclosure provides a multi-voltage battery pack, a power tool system and a charging system. The multi-voltage battery pack can provide multiple output voltages and is quick convertible between the multiple output voltages.

To solve the above technical problems, the disclosure provides technical solutions as bellow.

The disclosure provides a multi-voltage battery pack for use with power tools of different operating voltages, the multi-voltage battery pack including: a housing, battery strings disposed inside the housing, a battery interface disposed on the housing for use with the power tool, and a converting assembly disposed within the housing and electrically connected to the battery strings. The battery strings include a first battery string including a plurality of battery cells arranged in series, a second battery string including a plurality of battery cells arranged in series, a third battery string including a plurality of battery cells arranged in series, and a fourth battery string including a plurality of battery cells arranged in series. The converting assembly has a first state, a second state, and a third state. When the converting assembly is in the first state, the multi-voltage battery pack outputs a first operating voltage. When the converting assembly is in the second state, the multi-voltage battery pack outputs a second operating voltage. When the converting assembly is in the third state, the multi-voltage battery pack outputs a third operating voltage. Wherein the third operating voltage is greater than the second operating voltage, and the second operating voltage is greater than the first operating voltage.

In one embodiment of the disclosure, the first battery string is provided with a first positive electrode and a first negative electrode. The second battery string is provided with a second positive electrode and a second negative electrode. The third battery string is provided with a third positive electrode and a third negative electrode. And the fourth battery string is provided with a fourth positive electrode and a fourth negative electrode.

In an embodiment of the disclosure, when the converting assembly is in the first state, the converting assembly is located at a first position. When the converting assembly is in the second state, the converting assembly is located at a second position. And when the converting assembly is in the third state, the converting assembly is located at a third position.

In one embodiment of the disclosure, when the converting assembly is in the first state, the first positive electrode, the second positive electrode, the third positive electrode and the fourth positive electrode are connected to each other, the first negative electrode, the second negative electrode, the third negative electrode and the fourth negative electrode are connected to each other, and the first battery string, the second battery string, the third battery string and the fourth battery string are connected in parallel.

In one embodiment of the disclosure, when the converting assembly is in the second state, the first positive electrode and the second positive electrode are connected to each other, the first negative electrode, the second negative electrode, the third positive electrode and the fourth positive electrode are connected to each other, the third negative electrode and the fourth negative electrode are connected to each other, and the first battery string, the second battery string, the third battery string and the fourth battery string are in a parallel-series state.

In one embodiment of the disclosure, when the converting assembly is in the second state, the first positive electrode and the third positive electrode are connected to each other, the first negative electrode and the second positive electrode are connected to each other, the third negative electrode and the fourth positive electrode are connected to each other, the second negative electrode and the fourth negative electrode are connected to each other, and the first battery string, the second battery string, the third battery string and the fourth battery string are in a series-parallel state.

In one embodiment of the disclosure, when the converting assembly is in the third state, the first negative electrode is connected with the second positive electrode, the second negative electrode is connected with the third positive electrode, the third negative electrode is connected with the fourth positive electrode, and the first battery string, the second battery string, the third battery string and the fourth battery string are connected in series.

In one embodiment of the disclosure, the voltages of the first battery string, the second battery string, the third battery string and the fourth battery string are separately nV, the first operating voltage is nV, the second operating voltage is 2nV, and the third operating voltage is 4nV.

In one embodiment of the disclosure, when nV is 18 V, the first operating voltage is 18 V, the second operating voltage is 36 V, and the third operating voltage is 72 V.

In one embodiment of the disclosure, when nV is 20 V, the first operating voltage is 20 V, the second operating voltage is 40 V, and the third operating voltage is 80 V.

In one embodiment of the disclosure, when nV is 24 V, the first operating voltage is 24V, the second operating voltage is 48 V, and the third operating voltage is 96 V.

In one embodiment of the disclosure, the multi-voltage battery pack further includes a circuit board and an output terminal. The circuit board is disposed inside the housing and electrically connected to the output terminal, and the output terminal is used for outputting energy to the power tool. An output terminal groove is configured on the battery interface to contain the output terminal.

In one embodiment of the disclosure, the first battery string is horizontally disposed, the second battery string is disposed above the first battery string, the third battery string is disposed above the second battery string, and the fourth battery string is disposed above the third battery string.

In one embodiment of the disclosure, each of the first battery string, the second battery string, the third battery string, and the fourth battery string includes five battery cells.

In one embodiment of the disclosure, each of the first battery string, the second battery string, the third battery string, and the fourth battery string includes six battery cells.

In an embodiment of the disclosure, in an initial state, the converting assembly is in the first state, the first battery string, the second battery string, the third battery string and the fourth battery string are connected in parallel, and the battery pack outputs the first operating voltage.

The disclosure further provides a power tool system, the power tool system including a first power tool having a first tool interface and capable of operating at a first operating voltage, a second power tool having a second tool interface and capable of operating at a second operating voltage, a third power tool having a third tool interface and capable of operating at a third operating voltage, and a multi-voltage battery pack. The multi-voltage battery pack includes a housing, battery strings housed in the housing, a battery interface disposed on the housing for use with (1) the first tool interface of first power tool, (2) the second tool interface of the second power tool, and (3) the third tool interface of the third power tool, and a converting assembly disposed on the housing and electrically connected to the battery strings. The battery strings include a first battery string including a plurality of battery cells arranged in series, a second battery string including a plurality of battery cells arranged in series, a third battery string including a plurality of battery cells arranged in series, and a fourth battery string including a plurality of battery cells arranged in series. The converting assembly has a first state, a second state, and a third state. When the first power tool is coupled with the multi-voltage battery pack, the converting assembly is in the first state, and the multi-voltage battery pack outputs the first operating voltage to the first power tool. When the second power tool is coupled with the multi-voltage battery pack, the converting assembly is in the second state, and the multi-voltage battery pack outputs the second operating voltage to the second power tool. When the third power tool is coupled with the multi-voltage battery pack, the converting assembly is in the third state, and the multi-voltage battery pack outputs the third operating voltage to the third power tool. Wherein the third operating voltage is greater than the second operating voltage, and the second operating voltage is greater than the first operating voltage.

In one embodiment of the disclosure, the first tool interface has a first plug of a first configuration, the second tool interface has a second plug of a second configuration, and the third tool interface has a third plug of a third configuration. The first plug, the second plug, and the third plug are different in configuration.

In one embodiment of the disclosure, at least two of the first plug, the second plug and the third plug are provided with a triggering device, and the triggering device is used for cooperating with the converting assembly so as to enable the converting assembly to switch between different states.

The disclosure further provides a charging system and the charging system includes a charger having a charging interface and a multi-voltage battery pack for use with power tools of different operating voltages. The multi-voltage battery pack includes a housing, battery strings disposed inside the housing, a battery interface disposed on the housing for use with power tools, and a converting assembly disposed within the housing and electrically connected to the battery strings. The battery strings include a first battery string including a plurality of battery cells in series, a second battery string including a plurality of battery cells in series, a third battery string including a plurality of battery cells in series, and a fourth battery string including a plurality of battery cells in series. The converting assembly has a first state, a second state, and a third state. When the converting assembly is in the first state, the multi-voltage battery pack outputs a first operating voltage. When the converting assembly is in the second state, the multi-voltage battery pack outputs a second operating voltage. When the converting assembly is in the third state, the multi-voltage battery pack outputs a third operating voltage. Wherein the third operating voltage is greater than the second operating voltage, and the second operating voltage is greater than the first operating voltage. When the multi-voltage battery pack is coupled with the charger, the charging interface is coupled with the battery interface, the converting assembly is in the first state, and the first battery string, the second battery string, the third battery string, and the fourth battery string are connected in parallel, then the charger charges the multi-voltage battery pack in the first operating voltage.

When using the multi-voltage battery pack of the disclosure, the series-parallel state of each battery string is switched by adjusting the state of the converting assembly. The output voltage of the battery pack can be changed, and the adaptability of the power tool system of the battery pack can be improved thereby.

Certainly, it is not necessary for any product applying the disclosure to achieve all of the advantages described above.

BRIEF DESCRIPTION OF THE DRAWINGS

To illustrate the technical solutions of the embodiments of the disclosure clearer, drawings referring to the embodiments will be described in simple. Apparently, the description of the drawings is just some embodiments of the disclosure. For those skilled in the art, some other drawings can be obtained from the drawings of the disclosure without any creative effort.

Figures 53, 54:
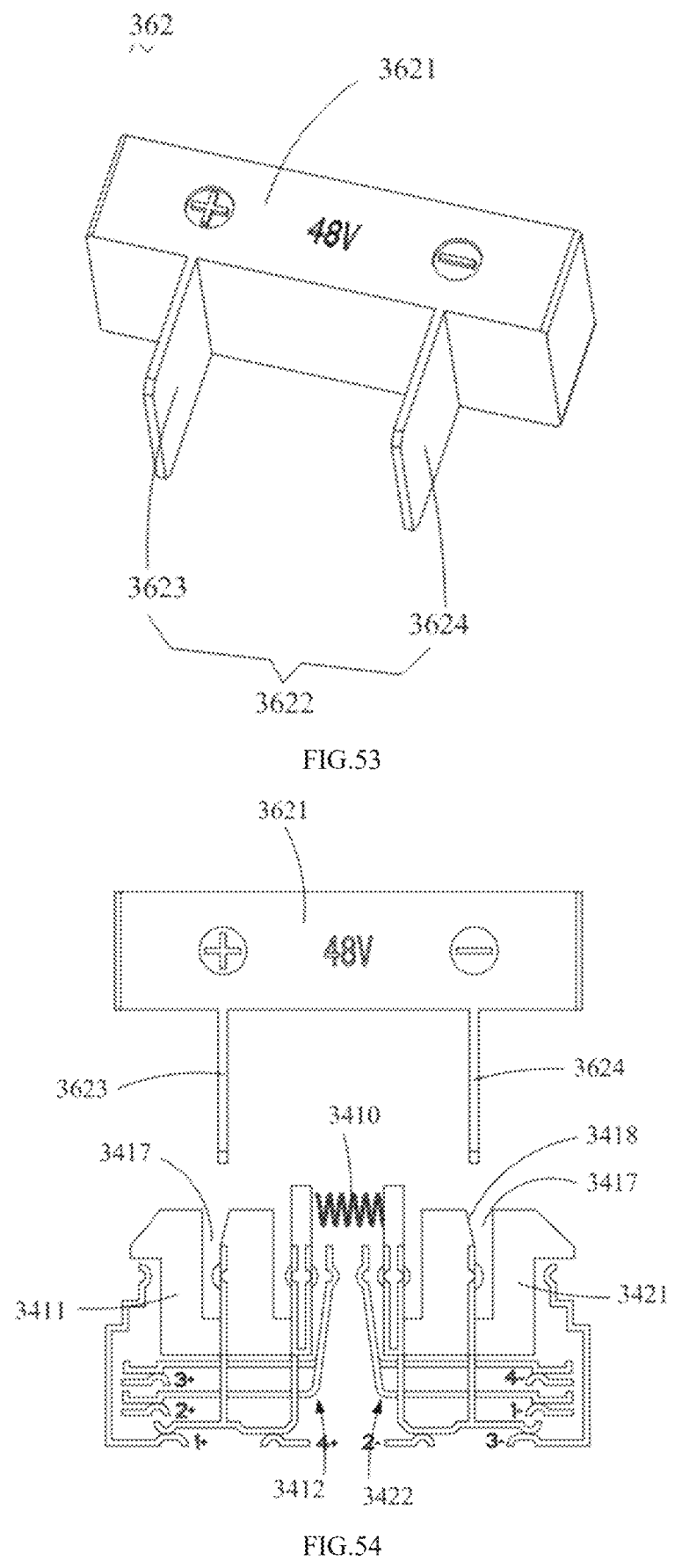

FIG. 53 is a perspective structural view of a second inserting assembly.

FIG. 54 is a combined schematic structural diagram of the converting assembly and the terminal assembly when the second inserting assembly shown in FIG. 53 starts to insert.

FIG. 86 is another perspective view of the rotating assembly shown in FIG. 85.

FIG. 87 is a perspective view of an external coupling element of FIG. 79.

FIG. 88 is a circuit schematic diagram of the rotation of the rotating assembly to a first target area after the external coupling element shown in FIG. 87 is inserted.

DETAILED DESCRIPTION

Embodiments combined with drawings of the disclosure will be clearly and completely described as bellow. Apparently, the described embodiments are merely partial embodiments of the disclosure but not all embodiments. Based on the described embodiment of disclosure, other embodiments can be obtained by ordinary technicians in this field without any creative effort.

Figure 1:
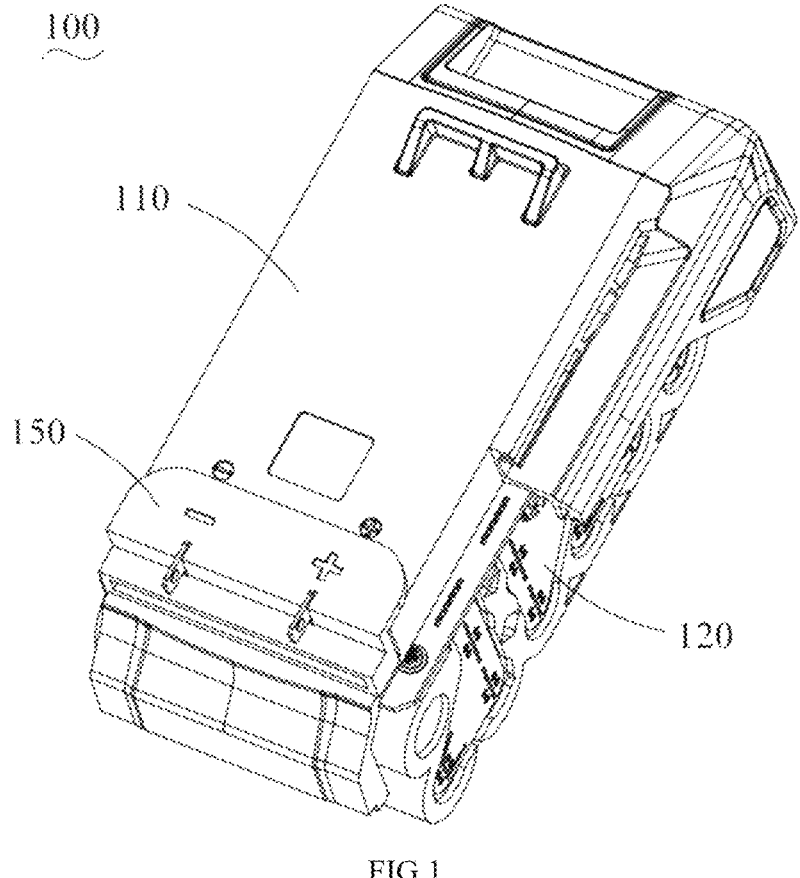
FIG. 1 is a first perspective view of a power tool system of the disclosure.
Figure 2:
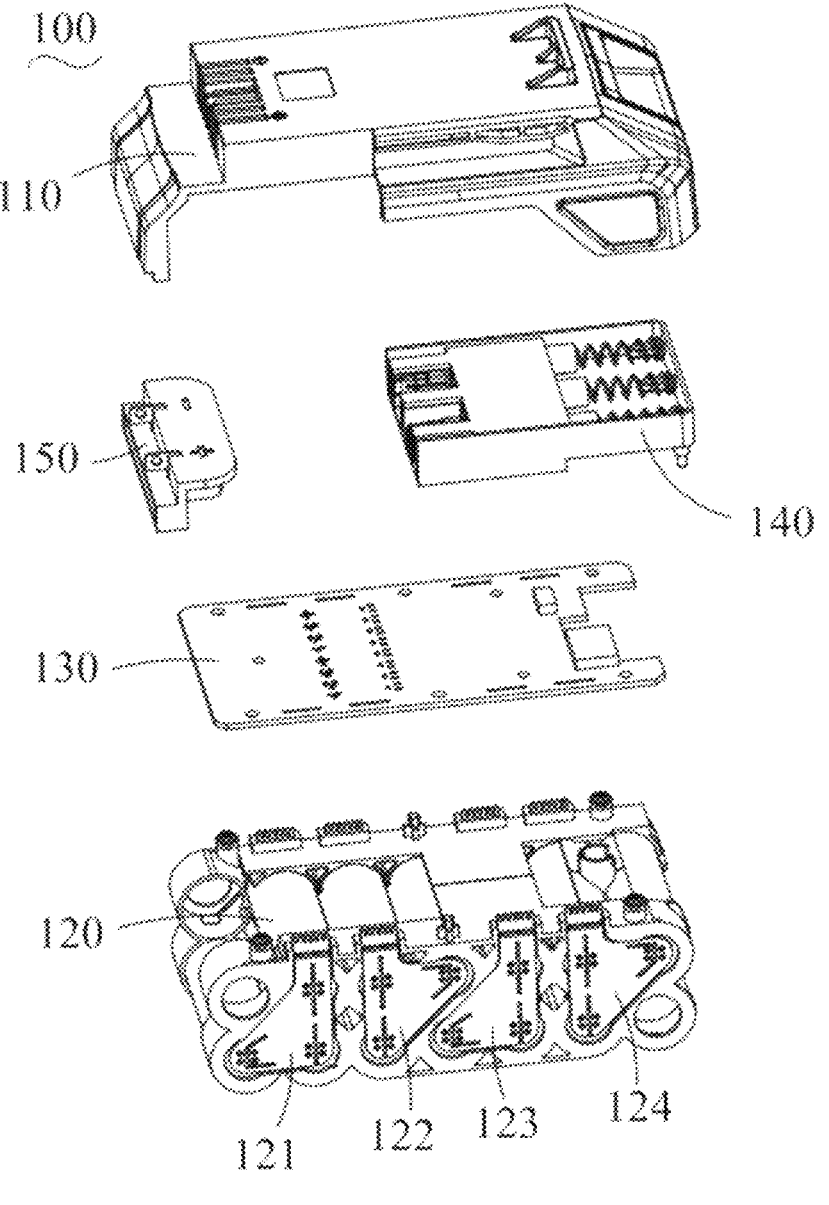
FIG. 2 is an exploded view of the power tool system shown in FIG. 1.
Figure 3:
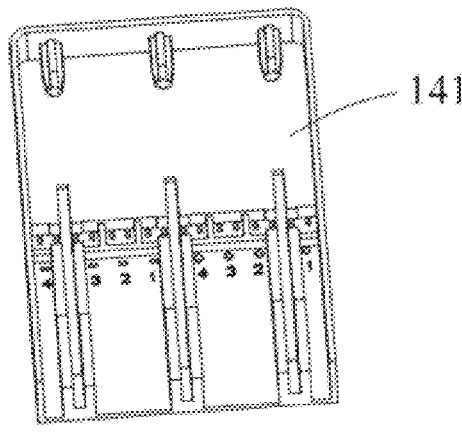
FIG. 3 is an exploded view of a converting assembly of FIG. 2.
Figure 3:
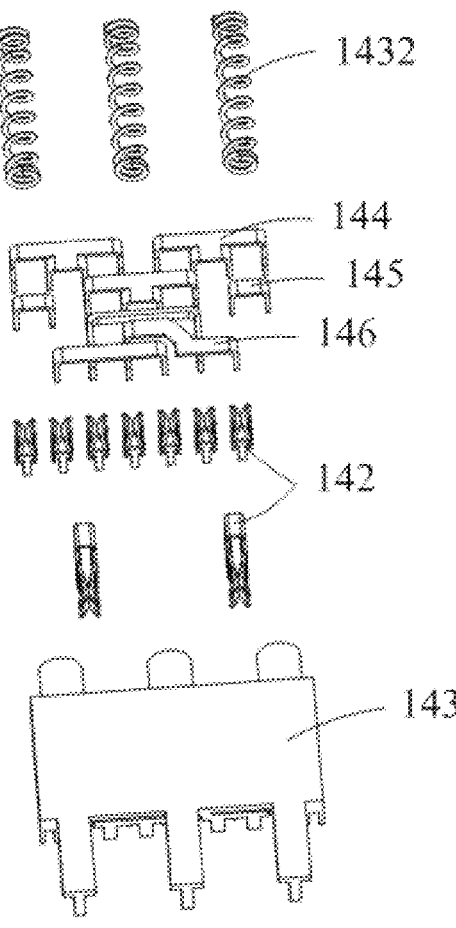
Figure 4:
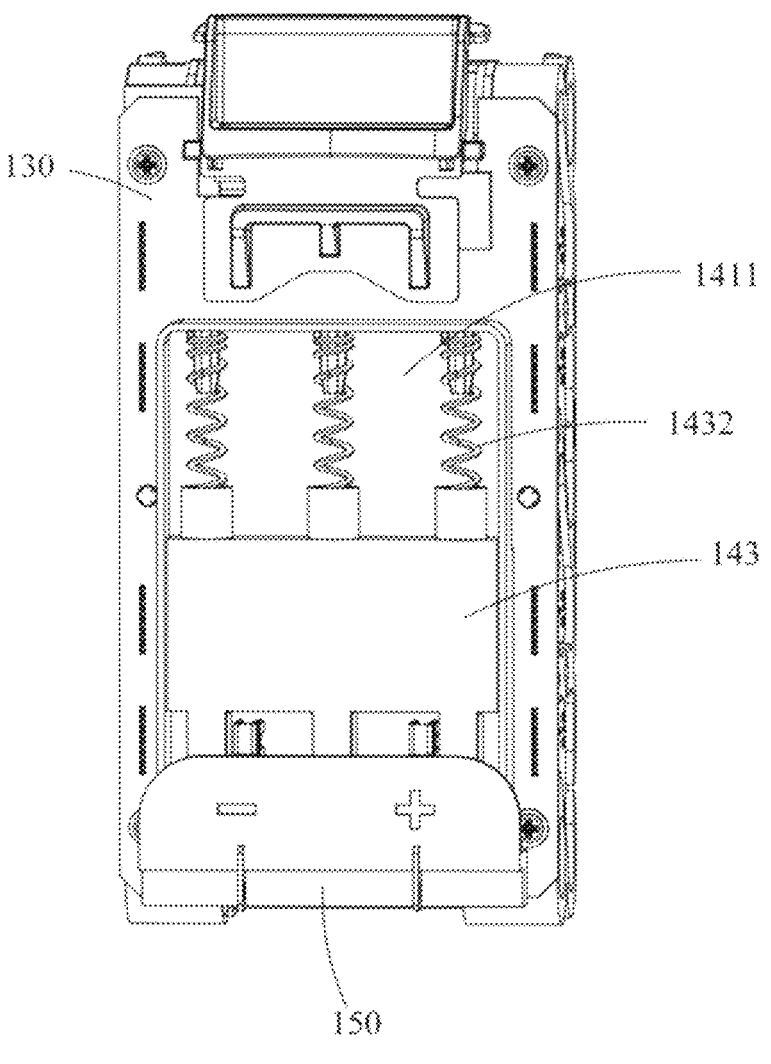
FIG. 4 is a partial combined perspective view of the power tool system shown in FIG. 1.
Figure 5:
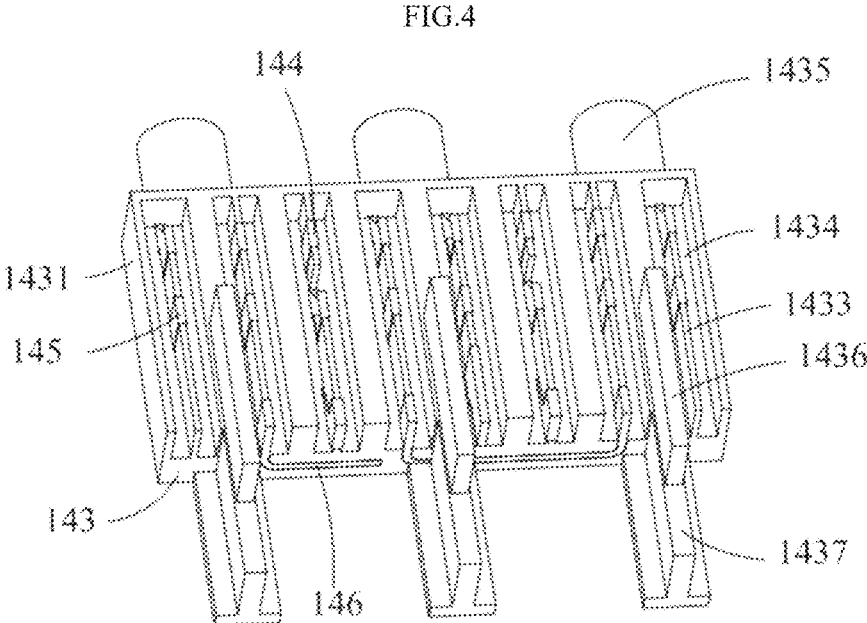
FIG. 5 is a schematic structural diagram of an internal socket of FIG. 3.
Figure 6:
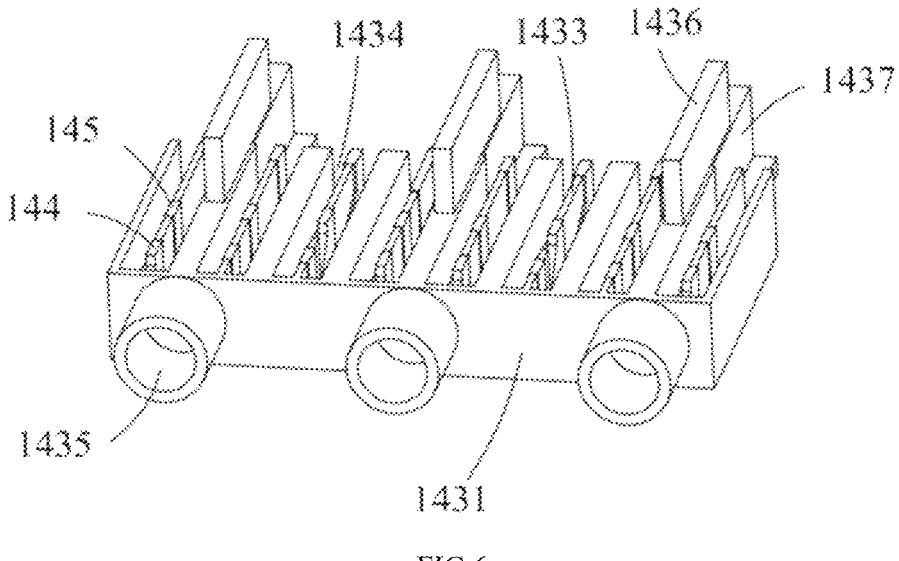
FIG. 6 is another view of the internal socket of FIG. 5.
Figure 7:
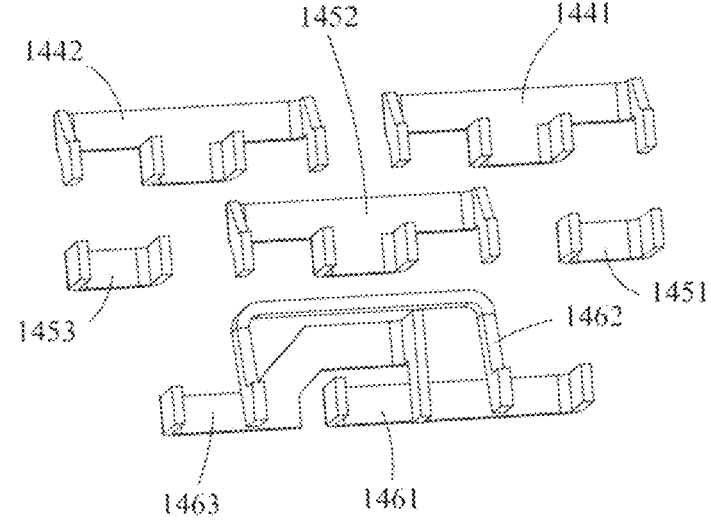
FIG. 7 is a schematic structural diagram of the internal socket of FIG. 5 after removing the substrate.

As shown in FIG. 1 to FIG. 3, the disclosure provides a multi-voltage battery pack 100 which includes a housing 110, battery strings 120 housed within the housing 110, a circuit board 130, and a converting assembly 140 and a terminal assembly 142 which are electrically connected to the battery strings 120. The converting assembly 140 is electrically connected to the battery strings 120. The housing 110 is provided with a battery interface for use with a power tool. And the battery interface is provided with an output terminal groove for containing the output terminal. The converting assembly 140 includes an electrode socket 141 and an internal socket 143 disposed opposite with the terminal assembly 142. In the disclosure, the terminal assembly 142 is preferably a female terminal assembly, but should not be limited herein. The battery pack 100 of the disclosure may apply to a power tool system. And the power tool system further includes an external socket 150 that can be inserted into the battery pack 100 to connect the terminal assembly 142 of the battery pack 100.

As shown in FIGS. 2, 3, 4 and 8, the electrode socket 141 is provided with a containing cavity 1411, the terminal assembly 142 and the internal socket 143 are disposed inside the containing cavity 1411, and the terminal assembly 142 is electrically connected to the electrode of the battery strings 120 by the circuit board 130. Specifically, the terminal assembly 142 includes a positive terminal 1421 and a negative terminal 1422. Wherein the positive terminal 1421 includes a first positive terminal 1423 and a second positive terminal 1424. The first positive terminal 1423 is connected with the external socket 150 as a total positive output terminal, and the second positive terminal 1424 is electrically connected to the positive electrode of the corresponding battery strings 120. The negative terminal 1422 also includes a first negative terminal 1425 and a second negative terminal 1426. The first negative terminal 1425 is connected with the external socket 150 as a total negative output terminal, and the second negative terminal 1426 is electrically connected to the negative electrode of the corresponding battery strings 120. Such that the battery pack 100 can output voltage.

As shown in FIG. 2 to FIG. 8, in the embodiment, the first positive terminal 1423 and the first negative terminal 1425 are disposed close to one end of the electrode socket 141. The second positive terminal 1424 and the second negative terminal 1426 are located approximately at a middle position of the electrode socket 141, and the second positive terminal 1424 and the second negative terminal 1426 are left-right arranged on one straight line. The battery strings 120 includes at least a first battery string 121, a second battery string 122, a third battery string 123, and a fourth battery string 124. Correspondingly, the first positive terminal 1423 is connected to the positive electrode of the first battery string 121, and the first negative terminal 1425 is connected to the negative electrode of the fourth battery string 124. The second positive terminal 1424 and the second negative terminal 1426 are each provided with four, and are arranged in a ++++−−−−way to separately connect the four strings of battery cells.

As shown in FIG. 2, each battery string is provided with a plurality of battery cells, and the battery cells may be connected with each other in series or in parallel, no more description herein. Assuming that the rated output voltage of each battery string is 'n' V, namely, the rated output voltage u1 of the first battery string 121=the rated output voltage u2 of the second battery string 122=the rated output voltage u3 of the third battery string 123=the rated output voltage u4 of the fourth battery string 124='n' V. In this embodiment, such as the rated output voltage of each battery string is 18 V.

As shown in FIG. 2, the converting assembly 140 has a first state, a second state, and a third state. When the converting assembly 140 is in the first state, the battery pack 100 outputs a first operating voltage. When the converting assembly 140 is in the second state, the battery pack 100 outputs a second operating voltage. And when the converting assembly 140 is in the third state, the battery pack 100 outputs a third operating voltage. In the embodiment, the converting assembly 140 is slidably disposed. When the converting assembly 140 is in the first position, the first battery string 121, the second battery string 122, the third battery string 123, and the fourth battery string 124 are connected in parallel, and the battery pack 100 outputs the first operating voltage. When the converting assembly 140 slides to the second position, the positive electrode of the first battery string 121 is connected to the positive electrode of the second battery string 122, the negative electrode of the first battery string 121 is connected with the negative electrode of the second battery string 122 and then connected with the positive electrode of the third battery string 123 and the fourth battery string 124, and the negative electrode of the third battery string 123 is connected to the negative electrode of the fourth battery string 124. At this time, the battery pack 100 outputs the second operating voltage. When the converting assembly slides to the third position, the first battery string 121, the second battery string 122, the third battery string 123, and the fourth battery string 124 are connected in series, and the battery pack 100 outputs the third operating voltage. The first operating voltage is less than the second operating voltage, and the second operating voltage is less than the third operating voltage.

As shown in FIG. 3 to FIG. 8, a first connecting assembly 144, a second connecting assembly 145, and a third connecting assembly 146 are arranged at intervals inside the internal socket 143 and corresponding to the terminal assembly 142. The internal socket 143 is slidably disposed. And when the internal socket 143 located at the first position, the terminal assembly 142 is electrically connected to the first connecting assembly 144. When the internal socket 143 slides to the second position, the terminal assembly 142 is electrically connected to the second connecting assembly 145. And when the internal socket 143 slides to the third position, the terminal assembly 142 is electrically connected to the third connecting assembly 146.

As shown in FIG. 2 to FIG. 8, the first connecting assembly 144, the second connecting assembly 145, and the third connecting assembly 146 are arranged at intervals along the sliding direction (up and down direction) of the internal socket 143. When the terminal assembly 142 is electrically connected to the first connecting assembly, the first battery string 121, the second battery string 122, the third battery string 123, and the fourth battery string 124 are connected in parallel. At which time the first operating voltage output by the battery pack 100 is 'n' V. When the terminal assembly 142 is electrically connected to the second connecting assembly 145, the first battery string 121, the second battery string 122, the third battery string 123, and the fourth battery string 124 are connected in a series and parallel (connected in series-parallel or in parallel-series), at which time the second operating voltage output by the battery pack 100 is '2n' V. When the terminal assembly 142 is electrically connected to the third connecting assembly 146, the first battery string 121, the second battery string 122, the third battery string 123, and the fourth battery string 124 are connected in series, at which time the third operating voltage output by the battery pack 100 is '4n' V.

As shown in FIG. 2 to FIG. 8, the first connecting assembly 144 includes a first positive connecting sheet 1441 and a first negative connecting sheet 1442. The first positive connecting sheet 1441 has four positive pins which are separately connected to the positive electrodes of the first battery string 121, the second battery string 122, the third battery string 123, and the fourth battery string 124. The first negative connecting sheet 1442 has four negative pins which are separately connected to the negative electrodes of the first battery string 121, the second battery string 122, the third battery string 123, and the fourth battery string 124. So that the first battery string 121, the second battery string 122, the third battery string 123, and the fourth battery string 124 are connected in parallel, at which time the first operating voltage 'n' V is equal to the rated output voltage of each battery string.

As shown in FIG. 2 to FIG. 8, the second connecting assembly 145 includes a second positive connecting sheet 1451 which connects the first positive electrode of the first battery string 121 with the second positive electrode of the second battery string 122; a fourth connecting sheet 1452 which is separately connected with the third positive electrode of the third battery string 123, the fourth positive electrode of the fourth battery string 124, the first negative electrode of the first battery string 121, and the second negative electrode of the second battery string 122; and a second negative connecting sheet 1453 which connects the third negative electrode of the third battery string 123 with the fourth negative electrode of the fourth battery string 124. So that the first battery string 121 is connected in parallel with the second battery string 122, and the third battery string 123 is connected in parallel with the fourth battery string 124, and then connecting the first battery string 121 and the second battery string 122 with the third battery string 123 and the fourth battery string 124 in series (connected in parallel-series). At which time the second operating voltage '2n' V is equal to the sum of the rated output voltages of two strings of battery cells.

As shown in FIG. 2 to FIG. 8, the third connecting assembly 146 includes a first connecting sheet 1461 which connects the second positive electrode of the second battery string 122 with the first negative electrode of the first battery string 121, a second connecting sheet 1462 which connects the third positive electrode of the third battery string 123 with the second negative electrode of the second battery string 122, and a third connecting sheet 1463 which connects the fourth positive electrode of the fourth battery string 124 with the third negative electrode of the third battery string 123. Such that the first battery string 121, the second battery string 122, the third battery string 123, and the fourth battery string 124 are connected in series. At which time the third operating voltage '4n' V is equal to the sum of the rated output voltages of the four strings of battery cells.

As shown in FIG. 3 to FIG. 8, the internal socket 143 includes a substrate 1431 and a spring structure 1432 which abuts the substrate 1431. The first connecting assembly 144, the second connecting assembly 145, and the third connecting assembly 146 are integrally-formed with the substrate 1431. The substrate 1431 is provided with ribs 1433 and sliding grooves 1434 which are located on both sides of each rib 1433. The first connecting assembly 144, the second connecting assembly 145, and the third connecting assembly 146 are formed and exposed on the ribs 1433. And two contact sheets 1427 of each of the second positive terminal 1424 and the second negative terminal 1426 are contained in the sliding grooves 1434 and clamping corresponding the rib 1433. When the internal socket 143 slides, the second positive terminal 1424 and the second negative terminal 1426 can always slide within the sliding grooves 1434 and maintain a state in which the ribs 1433 are clamped and abutted.

As shown in FIG. 9 and FIG. 3 to FIG. 6, the substrate 1431 is provided with an containing part 1435 extending outwardly. The inner side wall of the electrode socket 141 is provided with a positioning column 1412. One end of the spring structure 1432 is sleeved on the periphery of the positioning column 1412, and the other end of the spring structure 1432 abuts against the inner wall of the containing part 1435. When the internal socket 143 slides, the spring structure 1432 is compressed or released so that the terminal assembly 142 is switchably connected among the first connecting assembly 144, the second connecting assembly 145, or the third connecting assembly 146.

As shown in FIG. 4 to FIG. 9, the substrate 1431 is further provided with a slide rail 1436 protruding toward one side of the electrode socket 141. A through groove 1413 is correspondingly formed in the electrode socket 141. And the slide rail 1436 is accommodated inside the through groove 1413 to guide the internal socket 143 to slide along the through groove 1413 within the electrode socket 141. The quantity and positions of the sliding rail 1436 and the through groove 1413 may be determined according to actual situations, and should not be limited herein. One side of the substrate 1431 away from the containing part 1435 protrudes outwards to form a pushing part 1437. And the slide rail 1436 is disposed on the pushing part 1437. The pushing part 1437 may be used to push the internal socket 143 to slide, so that the third connecting assembly 146 is closer to the pushing part 1437 than the second connecting assembly 145, and the first connecting assembly 144 is further away from the pushing part 1437 than the second connecting assembly 145.

As shown in FIG. 2 to FIG. 9, the converting assembly 140 further includes a push rod for further pushing the internal socket 143. The third connecting assembly 146 is closer to the push rod than the second connecting assembly 145, and the first connecting assembly 144 is further away from the push rod than the second connecting assembly 145. The push rod may be configured to be integrally-formed with the substrate 1431 or be integrally-formed with the external socket 150. Therefore, when the external socket 150 is inserted, the internal socket 143 can be forced to slide by the push rod. Then the terminal assembly 142 is electrically connected with the first connecting assembly 144, the second connecting assembly 145, or the third connecting assembly 146.

As shown in FIG. 2 to FIG. 9 and FIG. 10 to FIG. 22, when the push rods are formed on the external socket 150, the external socket 150 may be arranged as three separate external sockets according to the different lengths of the push rods. In addition, push rods of different lengths may be arranged on one external socket to obtain different configurations by switching the push rods of different lengths. For a more convenient description, defining that a power tool system includes a first power tool, a second power tool and a third power tool. The first power tool is provided with a first tool interface capable of operating at a first operating voltage. The second power tool is provided with a second tool interface capable of operating at a second operating voltage. And the third power tool is provided with a third tool interface capable of operating at a third operating voltage. In the embodiment, the first tool interface includes a first plug. As an example, the first plug is the first external socket 151. The second tool interface includes a second plug. As an example, the second plug is the second external socket 152. And the third tool interface includes a third plug. As an example, the third plug is the third external socket 153. And the first external socket 151, the second external socket 152, and the third external socket 153 are each provided with a triggering device for coupling with the converting assembly 140 to enable the converting assembly 140 to switch between different states. The principle of the power tool system of the disclosure will be described in detail below by taking the three separate external sockets as an example.

As shown in FIG. 2, FIG. 10, FIG. 19 and FIG. 23, the external socket 150 includes the first external socket 151, the second external socket 152, and the third external socket 153. And the length of the push rod on the first external socket 151 is less than the length of the push rod 147 on the second external socket 152, meanwhile the length of the push rod 147 on the second external socket 152 is less than the length of the push rod 147' on the third external socket 153.

Figure 8:
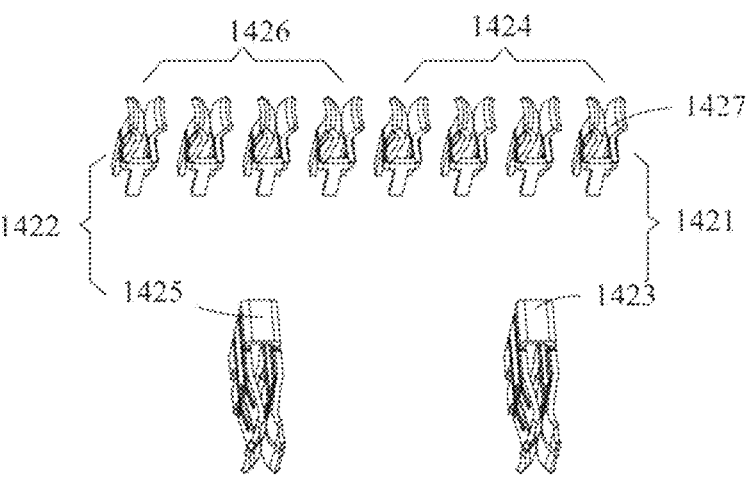
FIG. 8 is a schematic structural diagram of the terminal assembly of FIG. 3.
Figure 9:
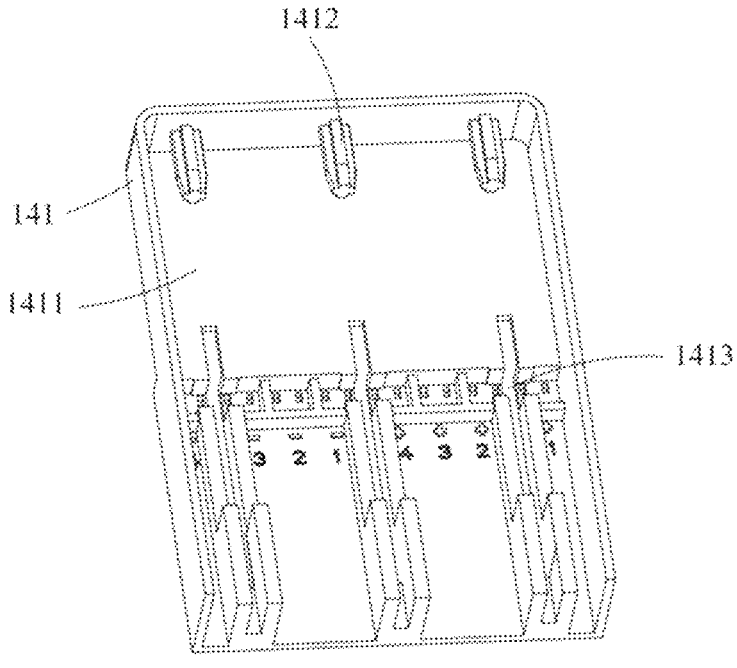
FIG. 9 is a schematic structural diagram of the electrode socket of FIG. 3.
Figure 10:
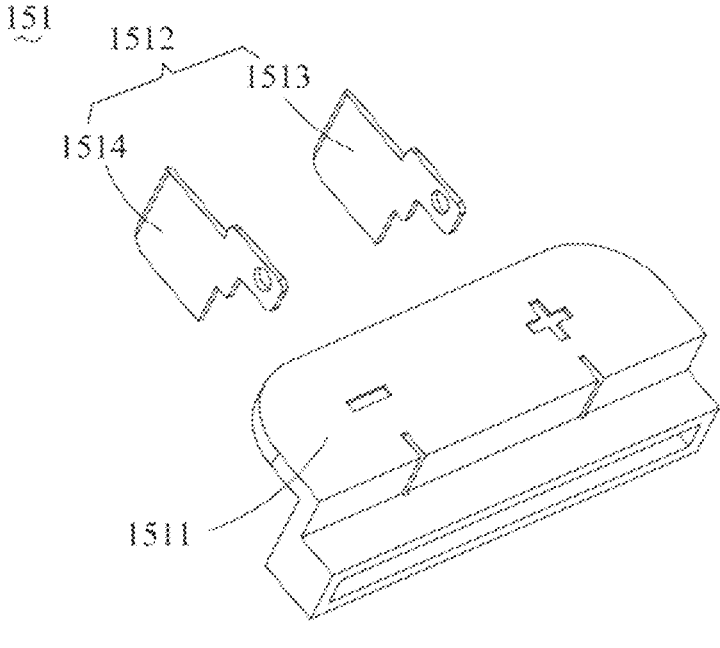
FIG. 10 is a perspective exploded view of a first external socket of FIG. 3.
Figures 11, 12:
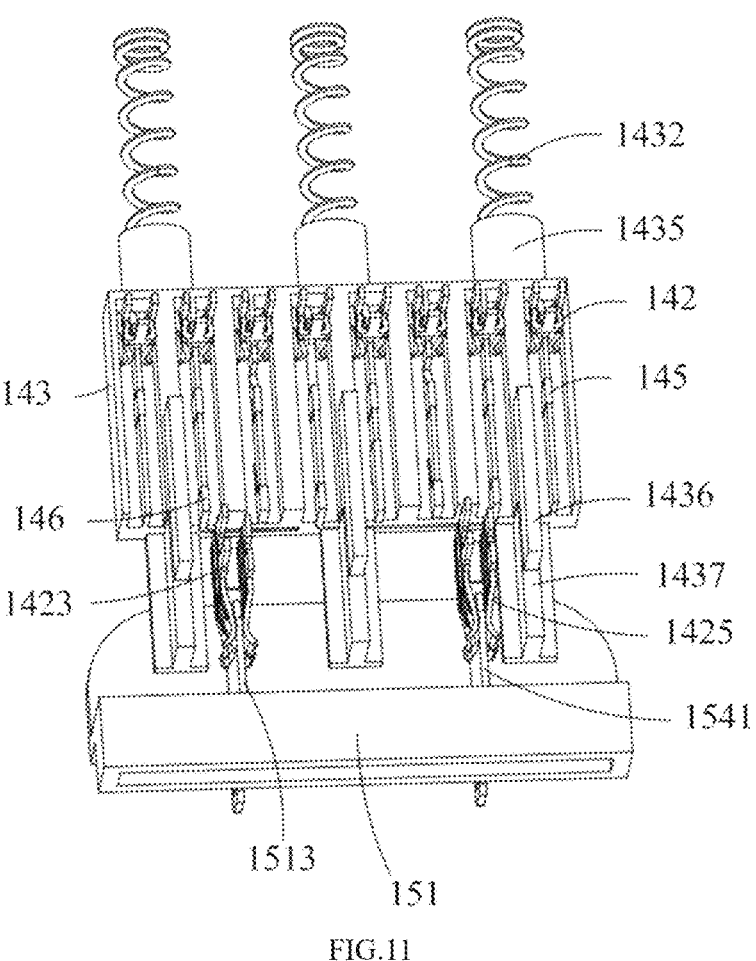
FIG. 11 is a schematic structural diagram of the connection of the terminal assembly with a first connecting assembly after the first external socket shown in FIG. 10 is inserted.
FIG. 12 is a schematic diagram of a circuit connection state within the battery pack after the first external socket shown in FIG. 10 is inserted.
Figure 13:
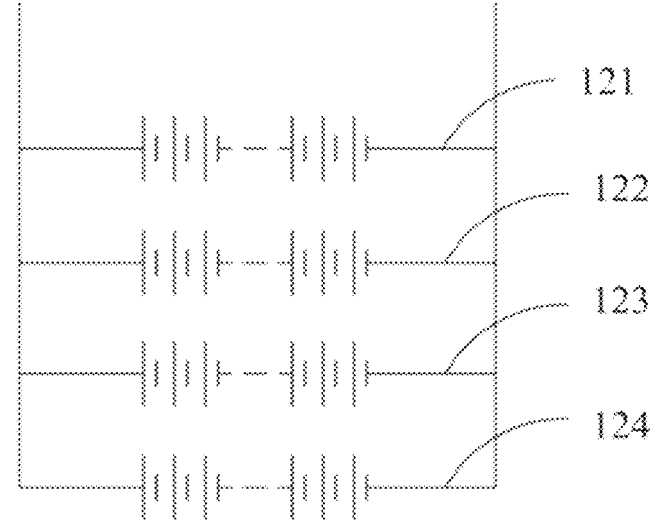
FIG. 13 is a circuit diagram of the battery strings after the first external socket shown in FIG. 10 is inserted.

As shown in FIG. 8 and FIG. 10, the first external socket 151 includes a body part 1511 and a male terminal 1512 inserted on the body part 1511. And the length of the push rod on the body part 1511 is zero. The male terminal 1512 includes a positive male terminal 1513 and a negative male terminal 1514. The positive male terminal 1513 is used for connecting with the first positive terminal 1423. And the negative male terminal 1514 is used for connecting with the first negative terminal 1425. Such that terminal assembly 142 of the battery pack 100 can electrically conduct with the male terminal 1512 of the first external socket 151 to transmit current and voltage.

As shown in FIG. 3 and FIG. 11 to FIG. 13, when the first external socket 151 is inserted, the positive male terminal 1513 is connected with the first positive terminal 1423, and the negative male terminal 1514 is connected with the first negative terminal 1425, then the internal socket 143 is located at the first position (at the bottom position of the electrode socket 141). At this time, the terminal assembly 142 is electrically connected to the first connecting assembly 144; and the first battery string 121, the second battery string 122, the third battery string 123, and the fourth battery string 124 are connected in parallel. The first operating voltage output by the battery pack 100 is equal to the rated output voltage of each battery string, namely $U=u1=u2=u3=u4='n'V=18V$.

Figure 14:
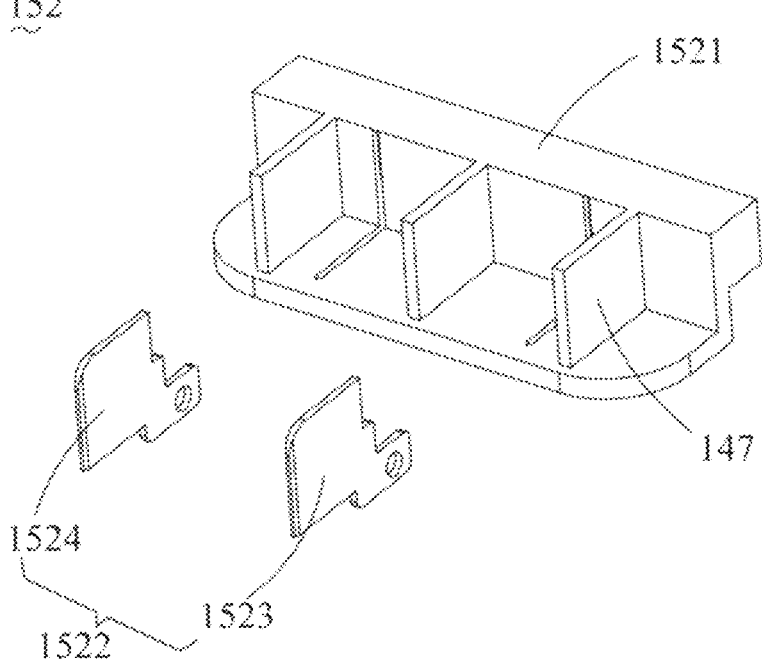
FIG. 14 is a perspective exploded view of a second external socket.
Figure 15:
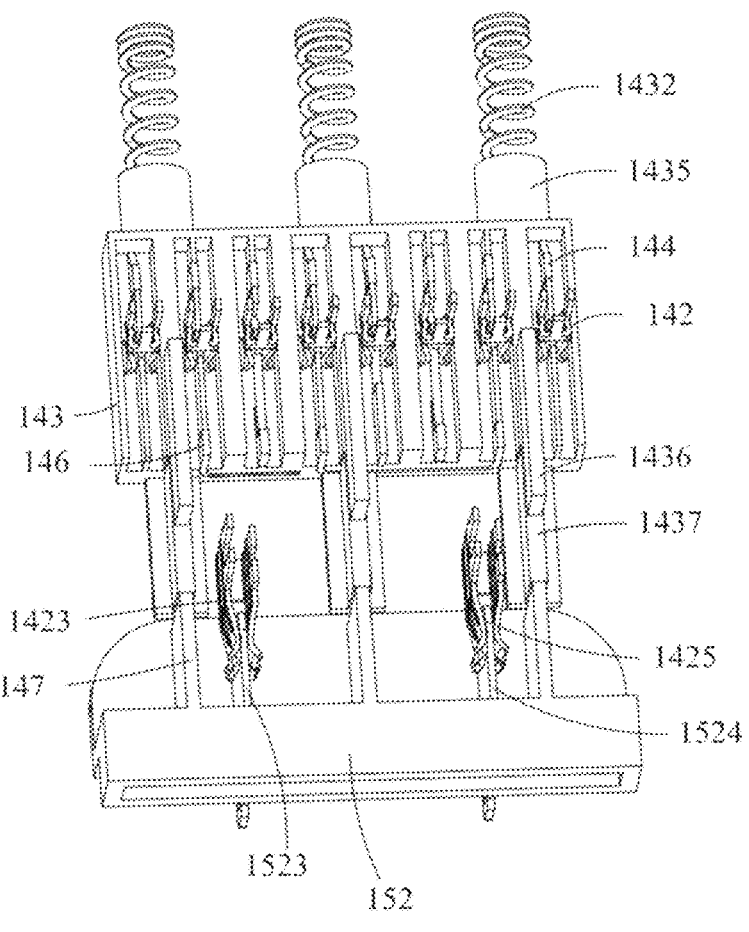
FIG. 15 is a schematic structural diagram of the connection of the terminal assembly with the second connecting assembly after the second external socket shown in FIG. 14 is inserted.
Figure 16:
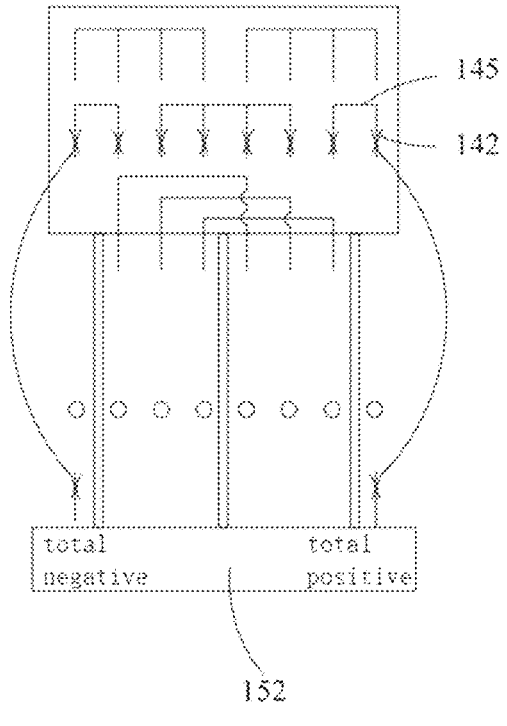
FIG. 16 is a schematic diagram of a circuit connection state within the battery pack after the second external socket shown in FIG. 14 is inserted.
Figure 17:
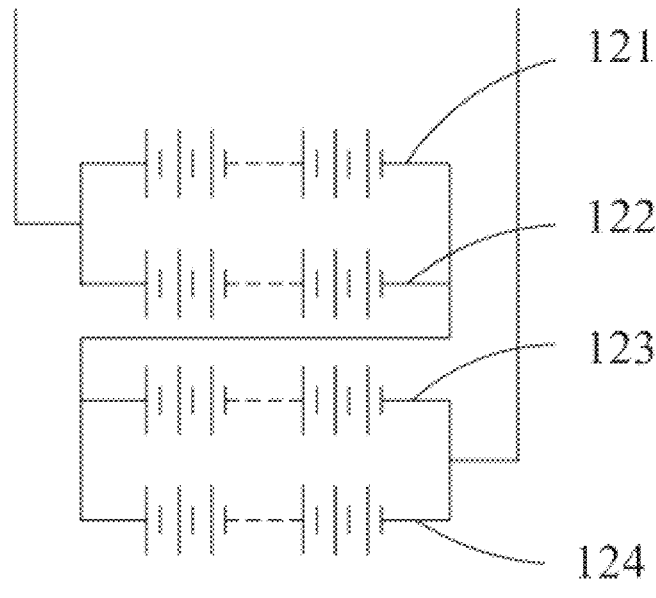
FIG. 17 is a circuit diagram of the battery strings after the second external socket shown in FIG. 14 is inserted.
Figure 18:
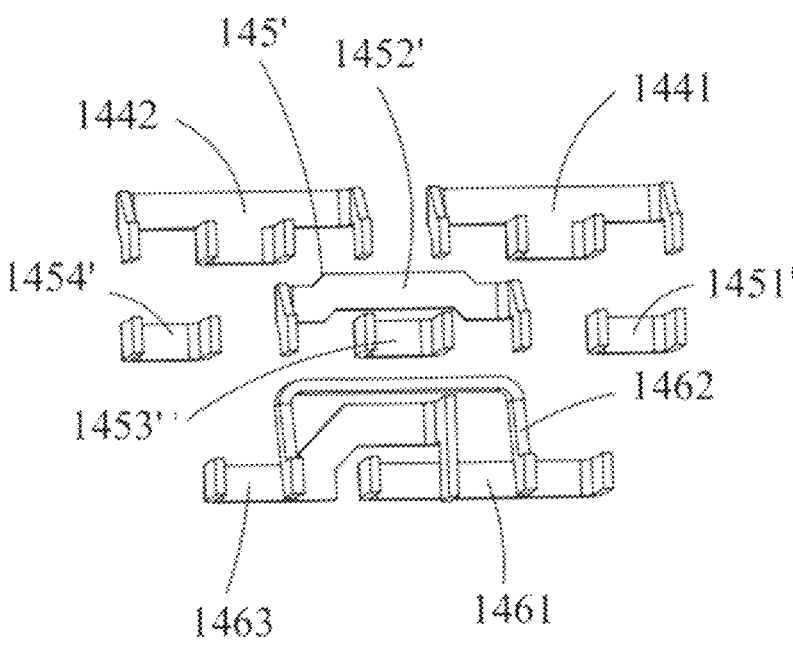
FIG. 18 is another embodiment of the second connecting assembly of FIG. 7.
Figure 19:
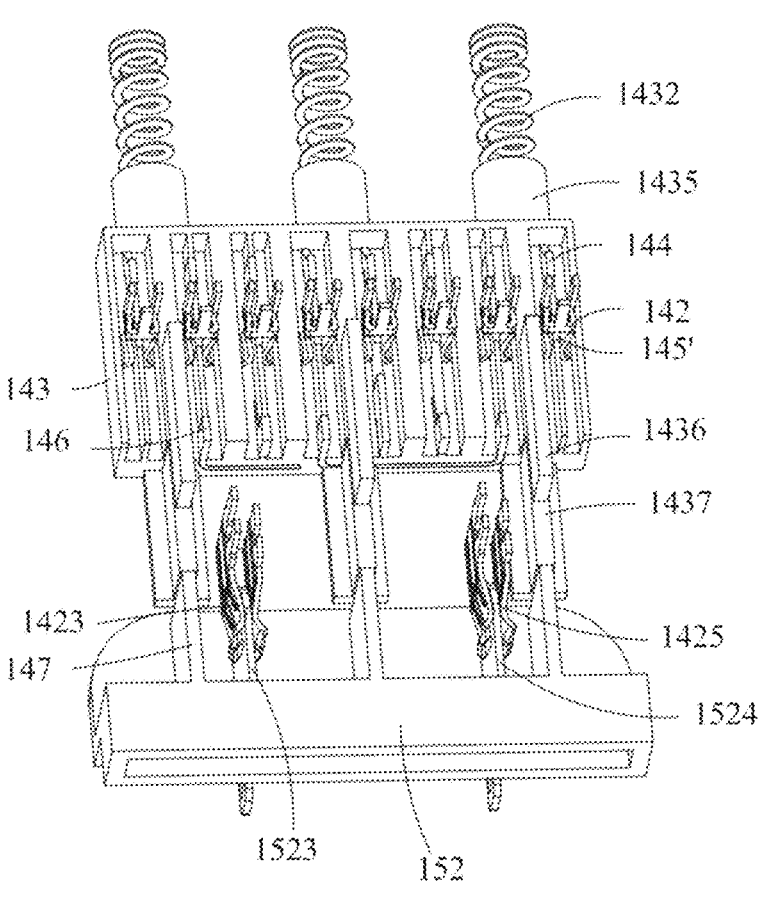
FIG. 19 is a schematic structural diagram of the connection of the terminal assembly with the second connecting assembly shown in FIG. 18 after the second external socket shown in FIG. 14 is inserted.
Figure 20:
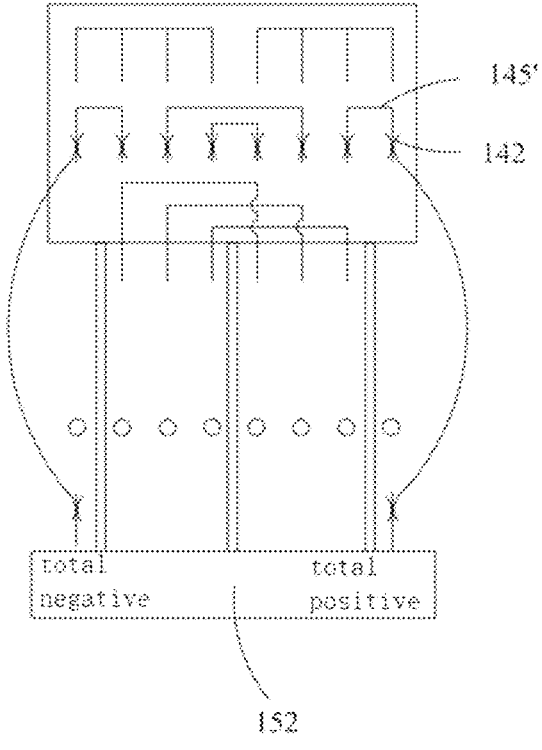
FIG. 20 is a schematic diagram of a circuit connection state within the battery pack corresponding to FIG. 19.
Figure 21:
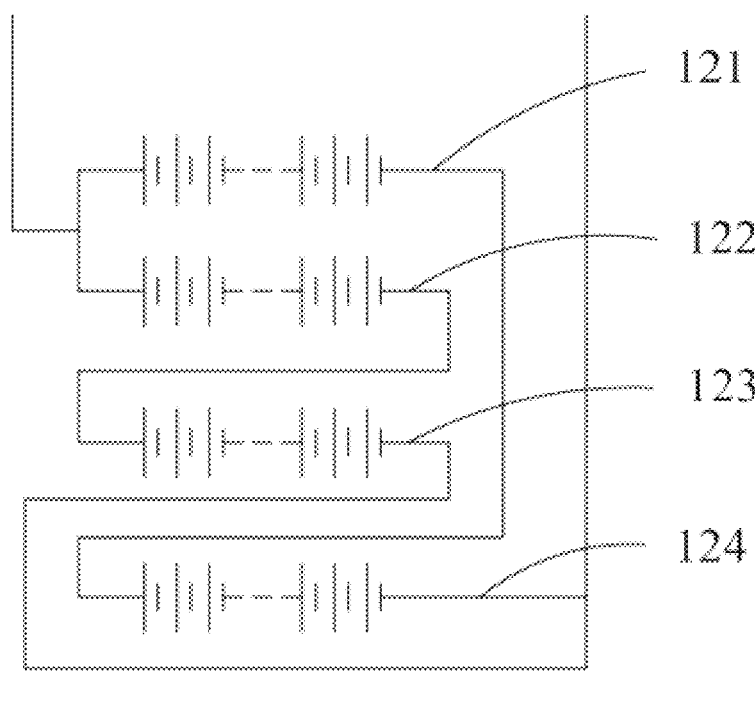
FIG. 21 is a connection circuit diagram of the battery strings corresponding to FIG. 19.

As shown in FIG. 3, FIG. 8 and FIG. 14, the second external socket 152 includes a body part 1521 and a male terminal 1522 inserted in the body part 1521. And the male terminal 1522 includes a positive male terminal 1523 and a negative male terminal 1524. The positive male terminal 1523 is used for connecting with the first positive terminal 1423, and the negative male terminal 1524 is used for connecting with the first negative terminal 1425. Such that the terminal assembly 142 of the battery pack 100 can electrically conduct with the male terminal 1522 of the second external socket 152 to transmit current and voltage. Unlike the first external socket 151 shown in FIG. 10, a push rod 147 is arranged on the body part 1521 of the second external socket 152.

As shown in FIG. 3 and FIG. 15 to FIG. 17, when the second external socket 152 is inserted, the push rod 147 pushes a push part 1437 on the internal socket 143 to force the internal socket 143 to slide upward and the spring structure 1432 being compressed, until the positive male terminal 1523 is connected with the first positive terminal 1423 and the negative male terminal 1524 is connected with the first negative terminal 1425. At this time, the internal socket 143 slides to the second position (the middle position of the electrode socket 141), and the terminal assembly 142 is electrically connected to the second connecting assembly 145, so that the first battery string 121 is connected in parallel with the second battery string 122, and the third battery string 123 is connected in parallel with the fourth battery string 124, and then the first battery string 121 and the second battery string 122 are connected in series with the third battery string 123 and the fourth battery string 124 (parallel-series connection). At this point, the second operating voltage output by the battery pack 100 is equal to the sum of the rated output voltages of two strings of battery cells, namely, U=u1+u2=u3+u4=2n' V=36 V.

Another embodiment of the second connecting assembly 145 is shown in FIG. 15 to FIG. 18. In the embodiment, the second connecting assembly 145' includes a second positive connecting sheet 1451' connecting the first positive electrode of the first battery string 121 with the second positive electrode of the second battery string 122, a fifth connecting sheet 1452' connecting the third positive electrode of the third battery string 123 with the second negative electrode of the second battery string 122, a sixth connecting sheet 1453' connecting the fourth positive electrode of the fourth battery string 124 with the first negative electrode of the first battery string 121, and a second negative connecting sheet 1454' connecting the third negative electrode of the third battery string 123 with the fourth negative electrode of the fourth battery string 124. So that the first battery string 121 may be connected in series with the fourth battery string 124, the second battery string 122 may be connected in series with the third battery string 123, and then the first battery string 121 and the fourth battery string 124 may be connected in parallel with the second battery string 122 and the third battery string 123 (connected in series-parallel).

As shown in FIG. 3 and FIG. 19 to FIG. 21, when the second external socket 152 shown in FIG. 14 is inserted, the push rod 147 pushes the push part 1437 on the internal socket 143 to force the internal socket 143 to slide upward and the spring structure 1432 to be compressed, until the positive male terminal 1523 is connected with the first positive terminal 1423, and the negative male terminal 1524 is connected with the first negative terminal 1425. At which point the internal socket 143 slides to the second position (the middle position of the electrode socket 141), the terminal assembly 142 is electrically connected to the second connecting assembly 145'. Such that the first battery string 121 is connected in series with the fourth battery string 124, and the second battery string 122 is connected in series with the third battery string 123, and then the first battery string 121 and the fourth battery string 124 are connected in parallel with the second battery string 122 and the third battery string 123. The second operating voltage output by the battery pack 100 is equal to the sum of the rated output voltages of two strings of battery cells, namely, U=u1+u4=u2+u3='2N' V=36 V.

Figure 22:
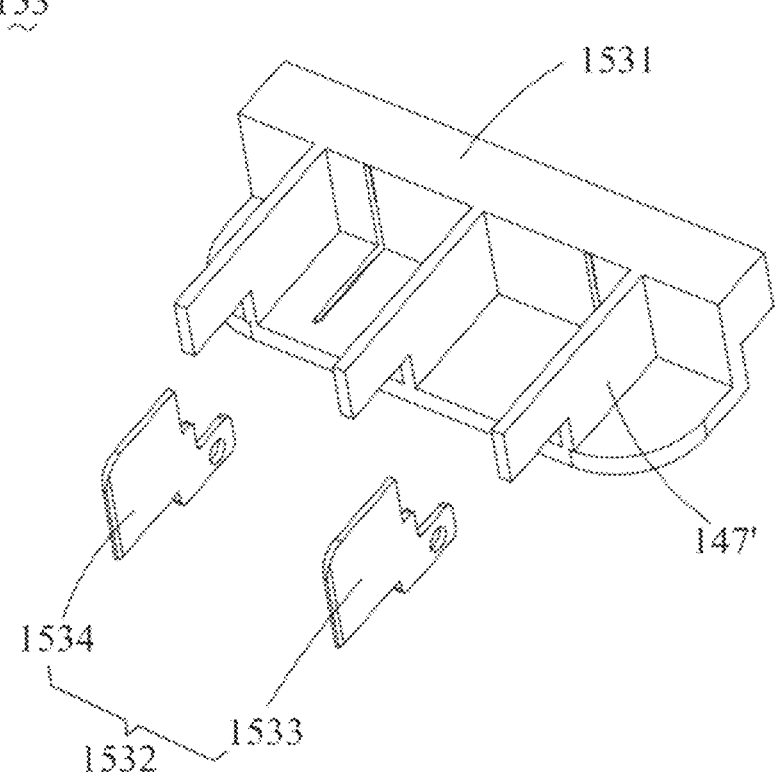
FIG. 22 is a perspective exploded view of a third external socket.
Figure 23:
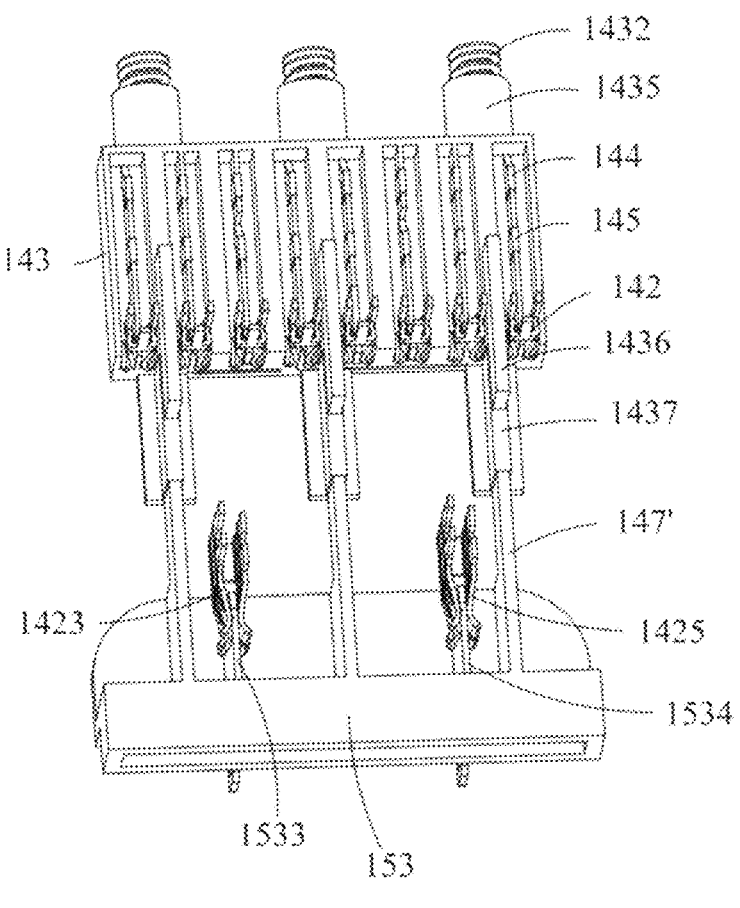
FIG. 23 is a schematic structural diagram of the connection of the terminal assembly with the third connecting assembly after the third external socket shown in FIG. 22 is inserted.
Figure 24:
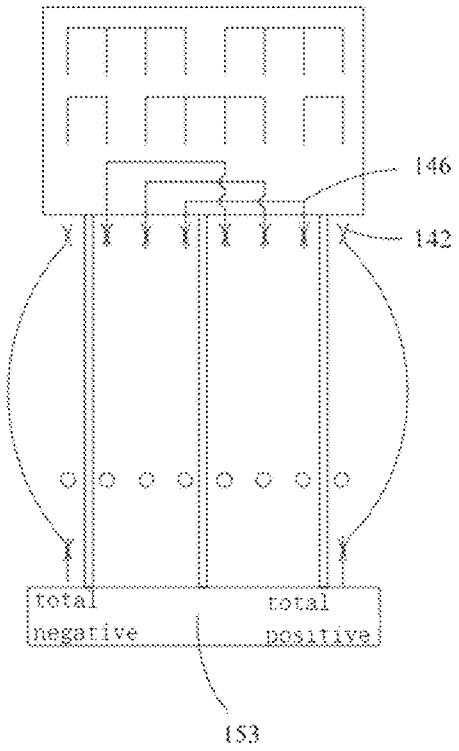
FIG. 24 is a schematic diagram of a circuit connection state within the battery pack after the third external socket shown in FIG. 22 is inserted.
Figure 25:
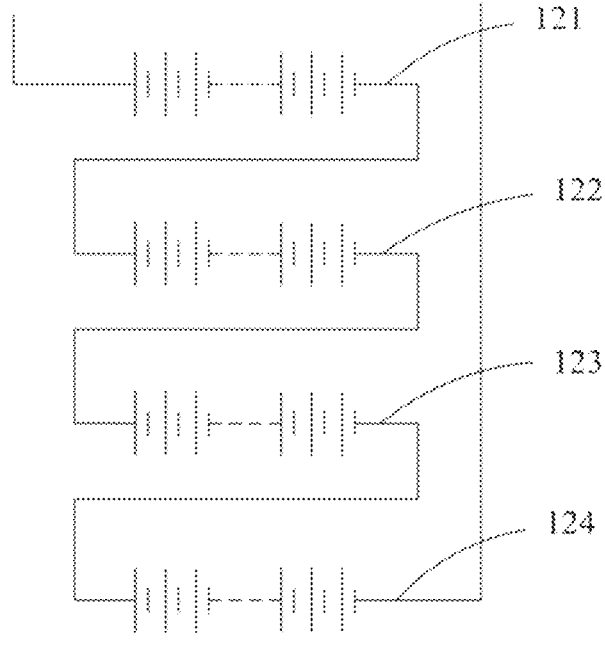
FIG. 25 is a connection circuit diagram of the battery strings after the third external socket shown in FIG. 22 is inserted.

As shown in FIG. 3, FIG. 8 and FIG. 22, the third external socket 153 includes a body part 1531 and a male terminal 1532 inserted in the body part 1531. The male terminal 1532 includes a positive male terminal 1533 and a negative male terminal 1534. The positive male terminal 1533 is used for connecting with the first positive terminal 1423, and the negative male terminal 1534 is used for connecting with the first negative terminal 1425. Such that the terminal assembly 142 of the battery pack can electrically conduct with the male terminal 1532 of the third external socket 153 to transmit current and voltage. Unlike the second external socket 152 shown in FIG. 14, a push rod 147' is arranged on the body part 1531 of the third external socket 153, and the length of the push rod 147' is greater than the length of the push rod 147.

As shown in FIG. 2 to FIG. 3 and FIG. 23 to FIG. 25, when the third external socket 153 is inserted, the push rod

147' pushes the push part 1437 on the internal socket 143 to force the internal socket 143 to slide upward and the spring structure 1432 being compressed, until the positive male terminal 1533 is connected with the first positive terminal 1423, and the negative male terminal 1534 is connected with the first negative terminal 1425. At which point the internal socket 143 slides to the third position (the topmost position of the electrode socket 141), the terminal assembly 142 is electrically connected to the third connecting assembly 146. And the first battery string 121, the second battery string 122, the third battery string 123, and the fourth battery string 124 can be connected in series. At this time, the third operating voltage output by the battery pack 100 is equal to the sum of the rated output voltages of the four strings of battery cells, namely, U=u1+u2+u3+u4='4N' V=72 V. The rated output voltages may be different by using different external sockets 150 to satisfy the voltage requirements of three different power tools and switch quickly and conveniently among the three voltages.

As shown in FIG. 1 to FIG. 3, the battery pack 100 of the disclosure may also be applied to a charging system (not shown) that includes the battery pack 100 and a charger that charges the battery pack 100. The charger is provided with a charging interface. When the charger is connected with the battery pack 100 for charging, the charging interface is coupled with the battery interface. Specifically, when the internal socket 143 is in the first position, the first battery string 121, the second battery string 122, the third battery string 123, and the fourth battery string 124 are connected in parallel. The charging voltage output by the charger is equal to the rated output voltage of a single battery string, and is a low voltage. That will protect the battery pack from the impact of high current and high voltage.

As shown in FIG. 1 to FIG. 25, the battery pack 100 of the embodiment is provided with the first connecting assembly 144, the second connecting assemblies 145, 145', and the third connecting assembly 146 at different positions of the internal socket 143. When the internal socket 143 slides to the first position, the second position, or the third position, the terminal assembly 142 can selectively connect to the first connecting assembly 144, or the second connecting assembly 145, 145', or the third connecting assembly 146 to switch the series/parallel states of the strings of battery cells in the battery pack 100. The output voltage of the battery pack can be changed, and the adaptability of a power tool system of the battery pack can be improved thereby.

Figure 26:
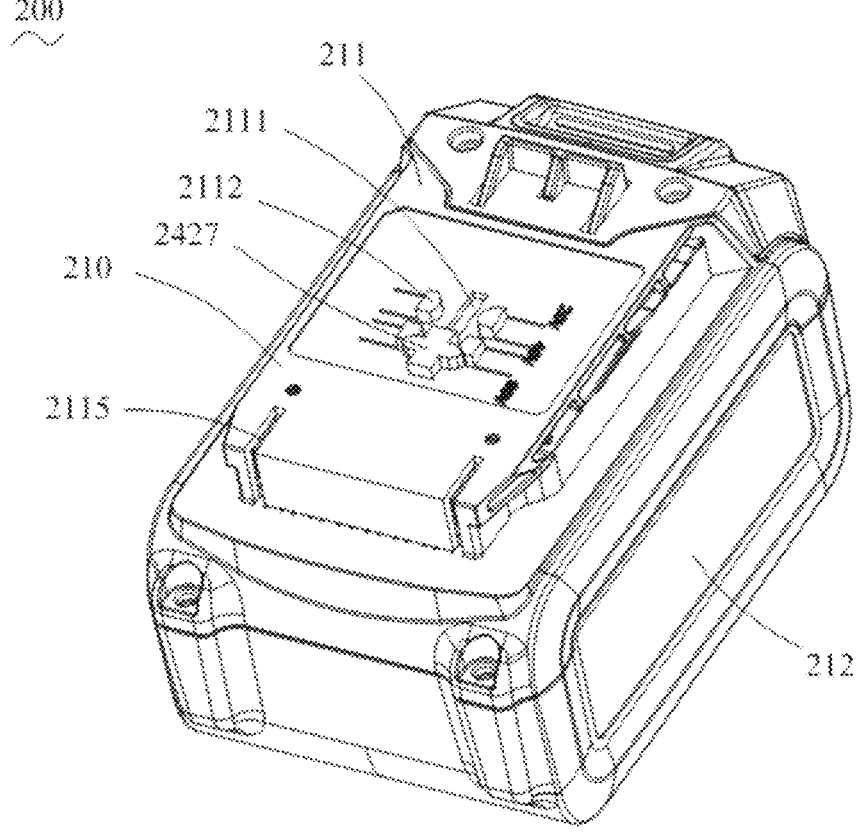
FIG. 26 is a perspective view of a battery pack of the disclosure.
Figure 27:
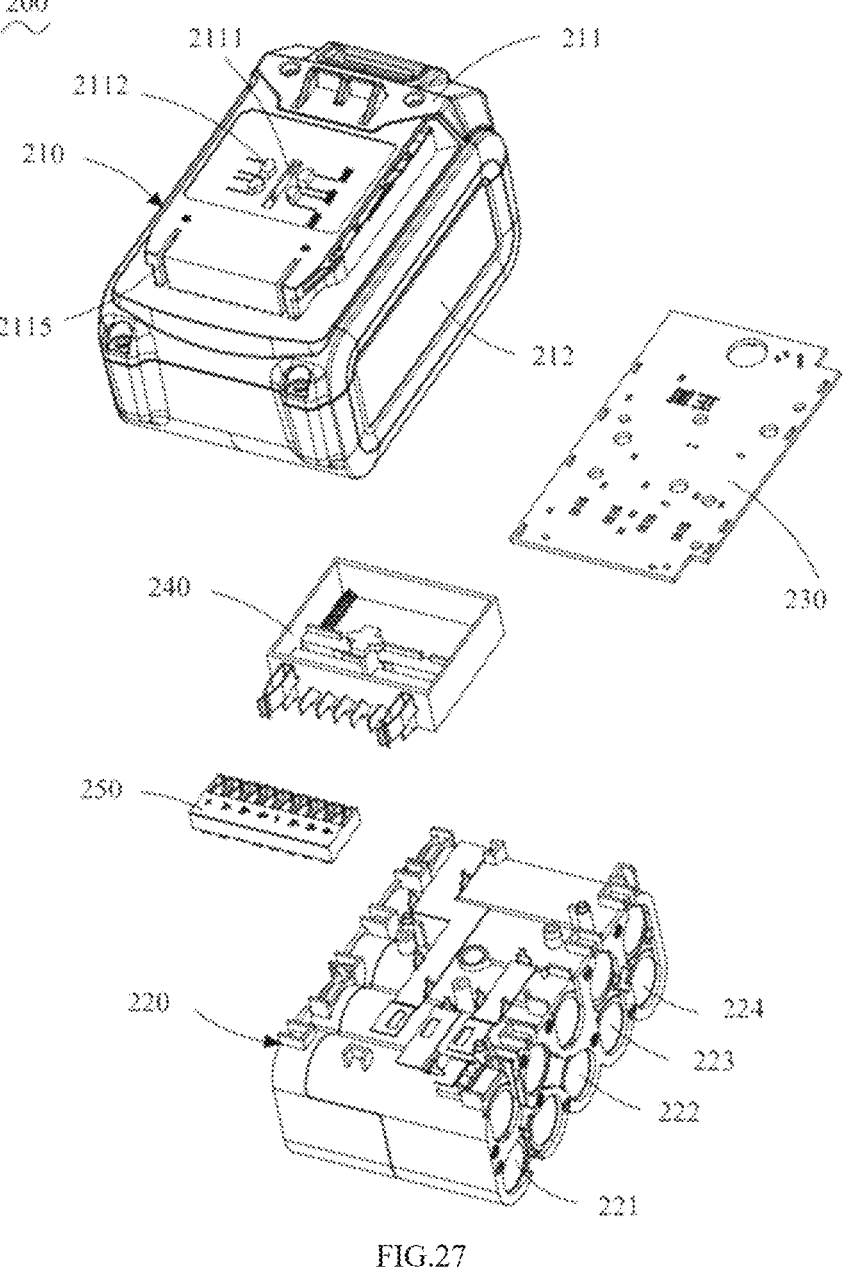
FIG. 27 is an exploded view of the battery pack shown in FIG. 26.

As shown in FIG. 26 and FIG. 27, the disclosure provides a battery pack 200 which includes a housing 210, battery strings 220 housed within the housing 210, a circuit board 230, and a converting assembly 240 and a terminal assembly 250 which are electrically connected to the battery strings 220. The battery strings 220 include a plurality of strings of battery cells, and the terminal assembly 250 is electrically connected to the plurality strings of battery cells. Preferably, the terminal assembly 250 is a female terminal assembly, but should not be limited herein. The battery pack 200 of the disclosure is applied to a power tool system. The power tool system includes an external socket (not shown) that can be inserted into the battery pack 200 to connect to the converting assembly 240 of the battery pack 200.

As shown in FIG. 26 and FIG. 27, the battery strings 220 includes at least a first battery string 221, a second battery string 222, a third battery string 223, and a fourth battery string 224. Each battery string has a plurality of battery cells. And the plurality of battery cells may be connected in series or in parallel with each other, without further description herein. Assuming that the rated output voltage of each battery string is 'n' V. Namely, the rated output voltage u1 of the first battery string 221=the rated output voltage u2 of the second battery string 222=the rated output voltage u3 of the third battery string 223=the rated output voltage u4 of the third battery string 224='n' V.

Figures 28, 29:
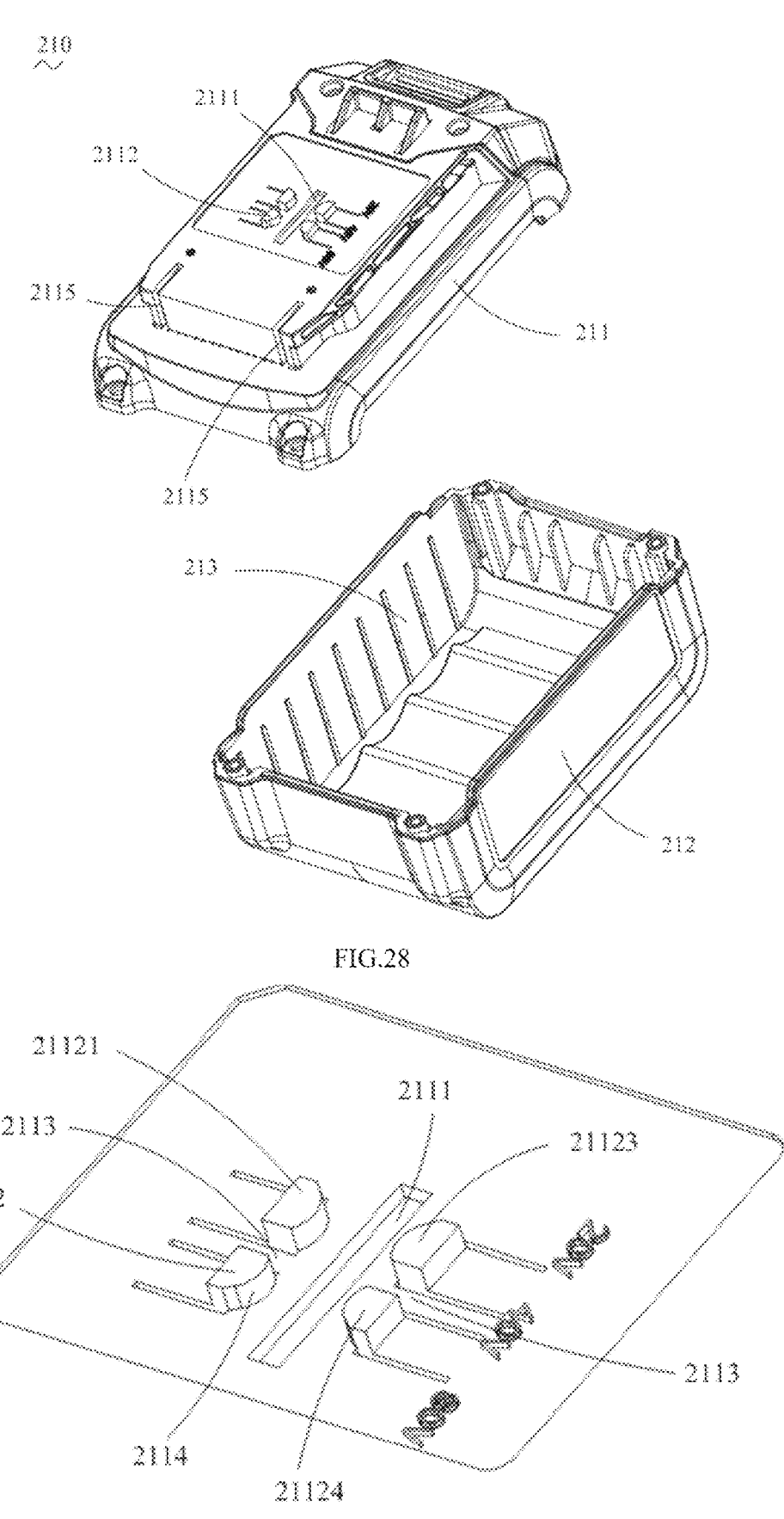
FIG. 28 is an exploded view of a housing of FIG. 26.
FIG. 29 is an enlarged view of a limiting block and a sliding groove of FIG. 28.

As shown in FIG. 27 and FIG. 29, the housing 210 is provided with a battery interface for use with a power tool. And the battery interface is provided with an output terminal groove for containing the output terminal. Specifically, the housing 210 includes an upper housing 211 and a lower housing 212 assembled with each other, and a containing space 213 formed between the upper housing 211 and the lower housing 212. The battery strings 220, the circuit board 230, the converting assembly 240, and the terminal assembly 250 are all housed within the containing space 213. The top wall of the upper housing 211 is provided with a sliding groove 2111 and limiting blocks 2112 located at two sides of the sliding groove 2111. The sliding groove 2111 is arranged in a rectangular shape. The two sides of the sliding groove 2111 are respectively provided with two limiting blocks 2112. And the two limiting blocks 2112 are spaced apart to form limiting spaces 2113 therebetween.

As shown in FIG. 28 and FIG. 29, the limiting blocks 2112 located at both sides of the sliding groove 2111 are defined as a first limiting block 21121, a second limiting block 21122, a third limiting block 21123 and a fourth limiting block 21124. Wherein the first limiting block 21121 is adjacent to and symmetrically arranged with the second limiting block 21122, the third limiting block 21123 is adjacent to and symmetrically arranged with the fourth limiting block 21124, the first limiting block 21121 and the third limiting block 21123 are symmetrically arranged with respect to the sliding groove 2111, and the second limiting block 21122 and the fourth limiting block 21124 are symmetrically arranged with respect to the sliding groove 2111. The limiting spaces 2113 are formed between the first limiting block 21121 and the second limiting block 21122, and formed between the third limiting block 21123 and the fourth limiting block 21124.

As shown in FIG. 28 and FIG. 29, in the disclosure, each of the limiting blocks 2112 is arranged in a shrapnel shape to be elastically deformed and reset under certain circumstances. An arc-shaped outside wall 2114 is formed on one side of each limiting blocks 2112 facing the sliding groove 2111, and can be used for guiding in certain circumstances, but should not be limited herein.

As shown in FIG. 27 and FIG. 28, the upper housing 211 is further provided with jacks 2115 for the external socket to insert. And the jacks 2115 are provided with two which are respectively corresponding to the positive output and negative output of the battery pack 200.

Figure 30:
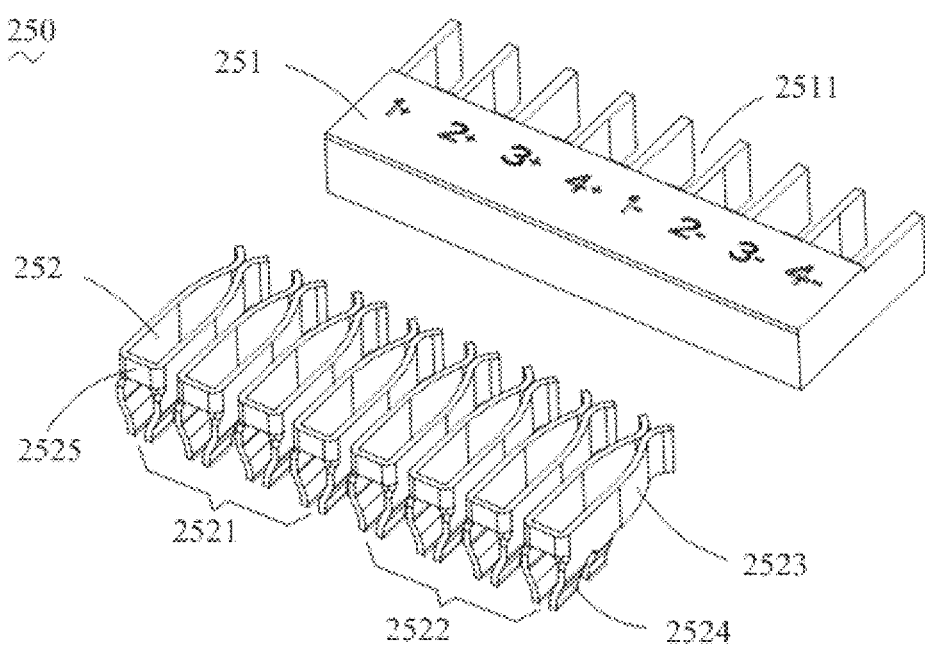
FIG. 30 is an exploded view of the terminal assembly of FIG. 27.
Figure 31:
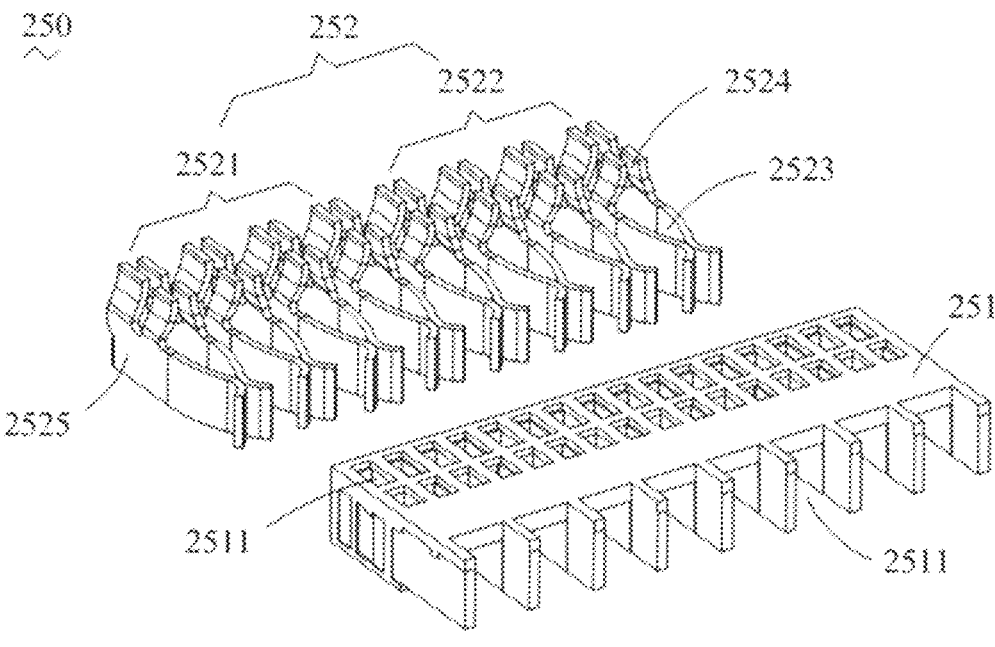
FIG. 31 is a view of FIG. 30 from another angle.

As shown in FIG. 27, FIG. 30 and FIG. 31, the terminal assembly 250 is electrically connected to the electrodes of the four strings of battery cells by the circuit board 230. Specifically, the terminal assembly 250 includes a fixed base 251 and a fixed terminal 252 inserted and fixed in the fixed base 251. The fixed terminal 252 includes a first fixed terminal 2521 and a second fixed terminal 2522 arranged in a left-right manner on one straight line. Wherein the first fixed terminal 2521 is a positive terminal and is used for being electrically connected with the positive electrode of the corresponding battery string. And the second fixed terminal 2522 is a negative terminal for being electrically connected with the negative electrode of the corresponding battery string. Correspondingly, both the first fixed terminal 2521 and the second fixed terminal 2522 are provided with four, and are arranged in a ++++---- way to connect the four strings of battery cells respectively.

As shown in FIG. 27, FIG. 30 and FIG. 31, the fixed base 251 is provided with a containing groove 2511 for containing the fixed terminal 252; and each fixed terminal 252 is provided with a first inserting part 2523, a second inserting part 2524, and a connecting part 2525 connecting the first inserting part 2523 and the second inserting part 2524. And the connecting part 2525 is assembled and fixed in a containing groove 2511. The first inserting part 2523 and the second inserting part 2524 are perpendicular to each other. And the first inserting part 2523 protrudes from the containing groove 2511 in the horizontal direction beyond the front end of the fixed base 251 to be electrically connected with the converting assembly 240. The second inserting part 2524 protrudes from the containing groove 2511 in the vertical direction beyond the bottom of the fixed base 251, so that the second inserting part 2524 is fixedly and electrically connected with the circuit board 230 in the vertical direction, and then the second inserting part 2524 can be electrically connected with the positive and negative electrodes of the four strings of battery cells.

As shown in FIG. 27 and FIG. 32 to FIG. 35, the converting assembly 240 has a first state, a second state, and a third state. When the converting assembly 240 is in the first state, the battery pack 200 outputs a first operating voltage. When the converting assembly 240 is in the second state, the battery pack 200 outputs a second operating voltage. And when the converting assembly 240 is in the third state, the battery pack 200 outputs a third operating voltage. In the embodiment, the converting assembly 240 includes a connecting assembly 241 electrically connected to the battery pack 220 and a sliding assembly 242 electrically connected with the connecting assembly 241. The sliding assembly 242 is slidably disposed with respect to the connecting assembly 241. When the sliding assembly 242 is in the first position, the first battery string 221, the second battery string 222, the third battery string 223, and the fourth battery string 224 are connected in parallel, and the battery pack 200 outputs the first operating voltage. When the sliding assembly 242 slides to the second position, the first battery string 221, the second battery string 222, the third battery string 223, and the fourth battery string 224 are connected in series-parallel, and the battery pack 200 outputs the second operating voltage. And when the sliding assembly 242 slides to the third position, the first battery string 221, the second battery string 222, the third battery string 223, and the fourth battery string 224 are connected in series, and the battery pack 200 outputs the third operating voltage. The third operating voltage is greater than the second operating voltage, and the second operating voltage is greater than the first operating voltage.

As shown in FIG. 27 and FIG. 32 to FIG. 35, the connecting assembly 241 is electrically connected to the terminal assembly 250 and includes a connecting body 2410 and a connecting terminal 2411 formed on the connecting body 2410. A containing cavity 24101 is concaved in the connecting body 2410. One end of the connecting terminal 2411 is housed and exposed in the containing cavity 24101, and the other end of the connecting terminal 2411 is located outside the connecting body 2410. The sliding assembly 242 is housed in the containing cavity 24101 and electrically connected to the connecting terminal 2411 in the containing cavity 24101. The connecting terminal 2411 includes a first positive terminal 2412 and a first negative terminal 2413. The first positive terminal 2412 is provided with four to be electrically connected to the positive electrodes of the first battery string 221, the second battery string 222, the third battery string 223, and the fourth battery string 224 respectively. The first negative terminal 2413 is also provided with four to be electrically connected with the negative electrodes of the first battery string 221, the second battery string 222, the third battery string 223, and the fourth battery string 224 respectively.

As shown in FIG. 32 to FIG. 35, in the embodiment, the connecting terminal 2411 is detachably assembled to the connecting body 2410. As the connecting terminal 2411 is easy to wear after suffering many times of sliding friction, the stability of electrical connection between the connecting terminal 2411 and the sliding assembly 242 is poor. The connecting terminal 2411 is set to be detachable, such that the connecting terminal 2411 can be replaced directly after the connecting terminal 2411 is worn. And the entire connecting assembly 241 does not need to be replaced, and the cost is reduced thereby.

As shown in FIG. 27 and FIG. 32 to FIG. 35, noted that the connecting assembly 241 is not directly connected to the four strings of battery cells, but instead the indirect connection between the connecting assembly 241 and the four strings of battery cells is formed by using the terminal assembly 250 to transmit current. Specifically, the first positive terminal 2412 of the connecting assembly 241 is connected with the first fixed terminal 2521 of the terminal assembly 250 shown in FIG. 30. And the first negative terminal 2413 of the connecting assembly 241 is connected with the second fixed terminal 2522 of the terminal assembly 250.

As shown in FIG. 31 to 35, in the disclosure, the first positive terminal 2412 and the first negative terminal 2413 are arranged in a sheet shape to be assembled and fixed with the connecting body 2410 and expose one end in the containing cavity 24101. In addition, the other end of the first positive terminal 2412 and the first negative terminal 2413 is also convenient to be inserted into the first inserting part 2523 of the first fixed terminal 2521 and the second fixed terminal 2522. Then the connecting terminal 2411 can be electrically connected with the fixed terminal 252. Surely, that should not be limited herein.

Figure 32:
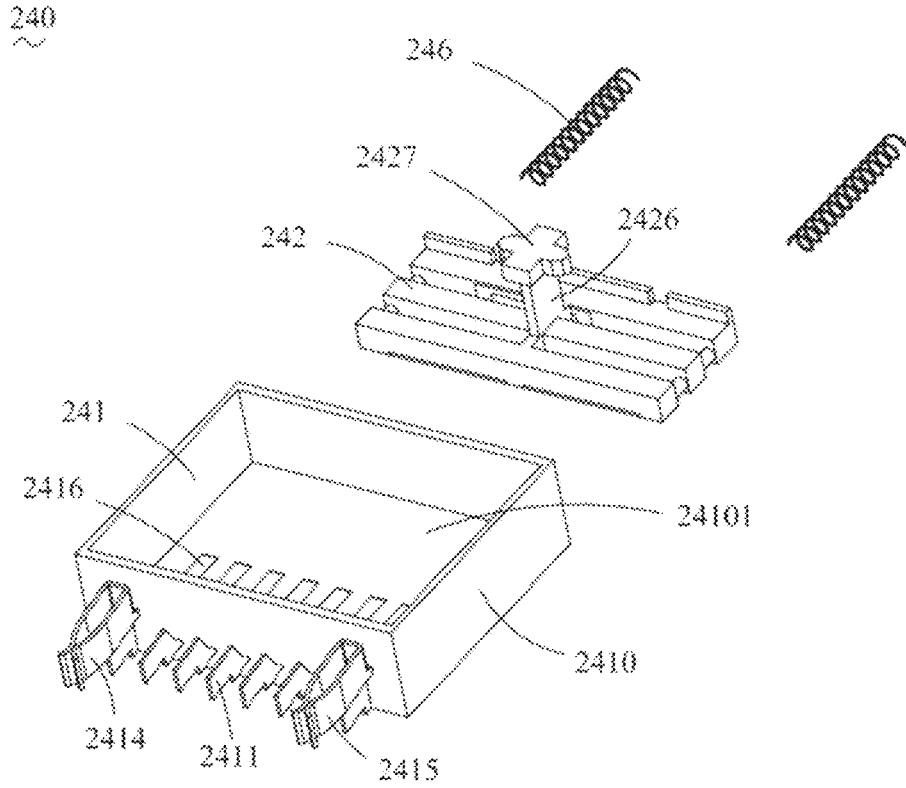
FIG. 32 is an exploded view of a converting assembly of FIG. 27.
Figure 33:
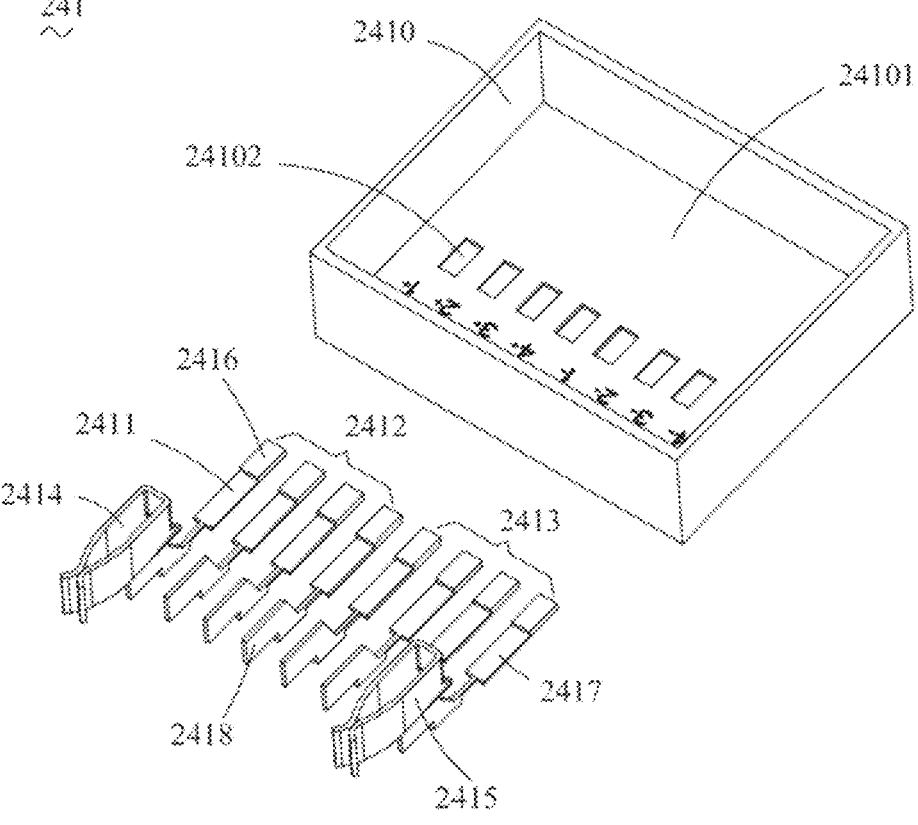
FIG. 33 is an exploded view of a connecting assembly of FIG. 32.

As shown in FIG. 31 to FIG. 33, eight openings 24102 are formed on the inner side wall of the bottom of the connecting body 2410. The eight openings 24102 are corresponding to four first positive terminals 2412 and four first negative terminals 2413 respectively. So that one ends of the four first positive terminals 2412 and the four first negative terminals 2413 are housed within and exposed to the corresponding openings 24102. Both the first positive terminal 2412 and the first negative terminal 2413 include contact parts 2416, mounting parts 2417 extending backwardly from the contact parts 2416, and abutting parts 2418 extending backwardly from the mounting part 2417. The thickness of the contact part 2416 is greater than the thickness of the mounting part 2417. Therefore, after the connecting body 2410 and the connecting terminal 2411 are assembled, the contact parts 2416 of the first positive terminal 2412 and the first negative terminal 2413 protrude and are housed in the openings 24102. Such that the sliding assembly 242 is directly and electrically connected with the contact parts 2416 within the openings 24102. The mounting parts 2417 are assembled and fixed in the connecting body 2410. And the abutting parts 2418 are used for connecting with the first inserting part 2523 of the fixed terminal 2521 and the second fixed terminal 2522 of the terminal assembly 250 to enable the terminal assembly 250 to electrically connect the converting assembly 240.

As shown in FIG. 27 and FIG. 33, the connecting terminal 2411 further includes a second positive terminal 2414 and a second negative terminal 2415 which are located outside the connecting body 2410. And the second positive terminal 2414 is formed on the first positive terminal 2412 corresponding to the positive electrode of the first battery string 221 to connect with the external socket as a total positive output terminal. The second negative terminal 2415 is formed on the first negative terminal 2413 corresponding to the negative electrode of the fourth battery string 224 to connect with the external socket as a total negative output terminal. Such that the voltage in the battery pack 200 can be output. The second positive terminal 2414 and the second negative terminal 2415 are disposed close to the jacks 2115 for connecting with the external socket.

Figure 34:
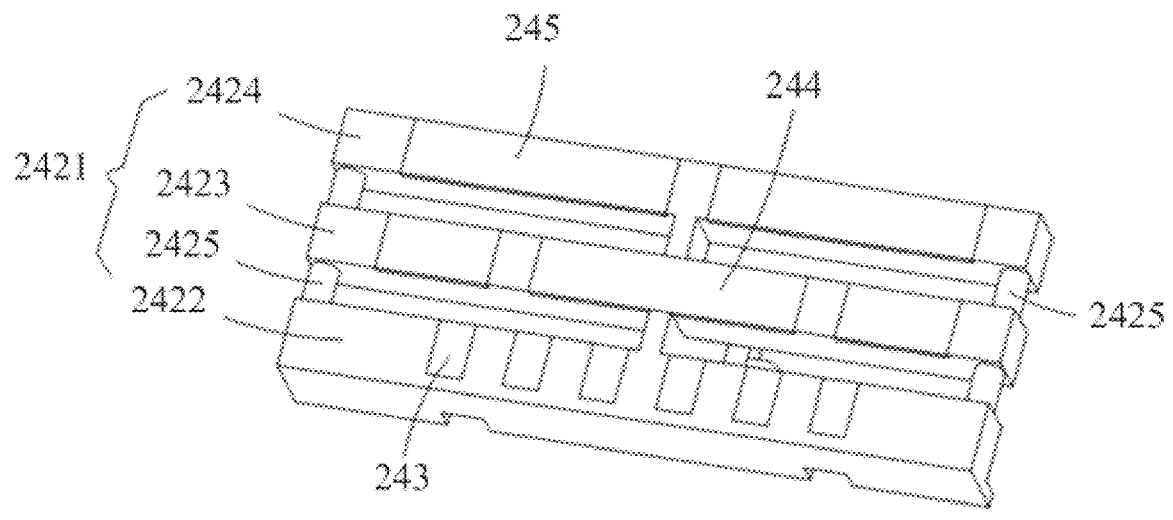
FIG. 34 is another perspective view of a sliding assembly of FIG. 32.
Figure 35:
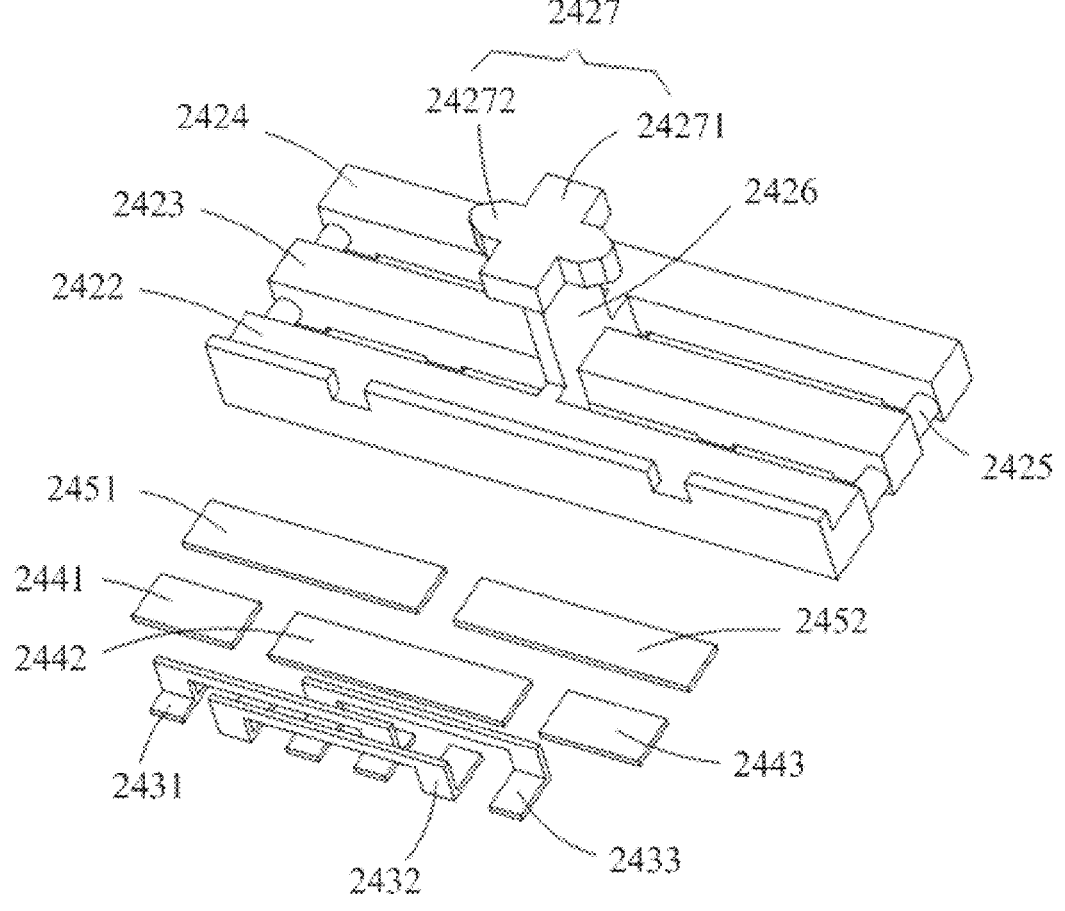
FIG. 35 is an exploded view of the sliding assembly of FIG. 32.
Figure 36:
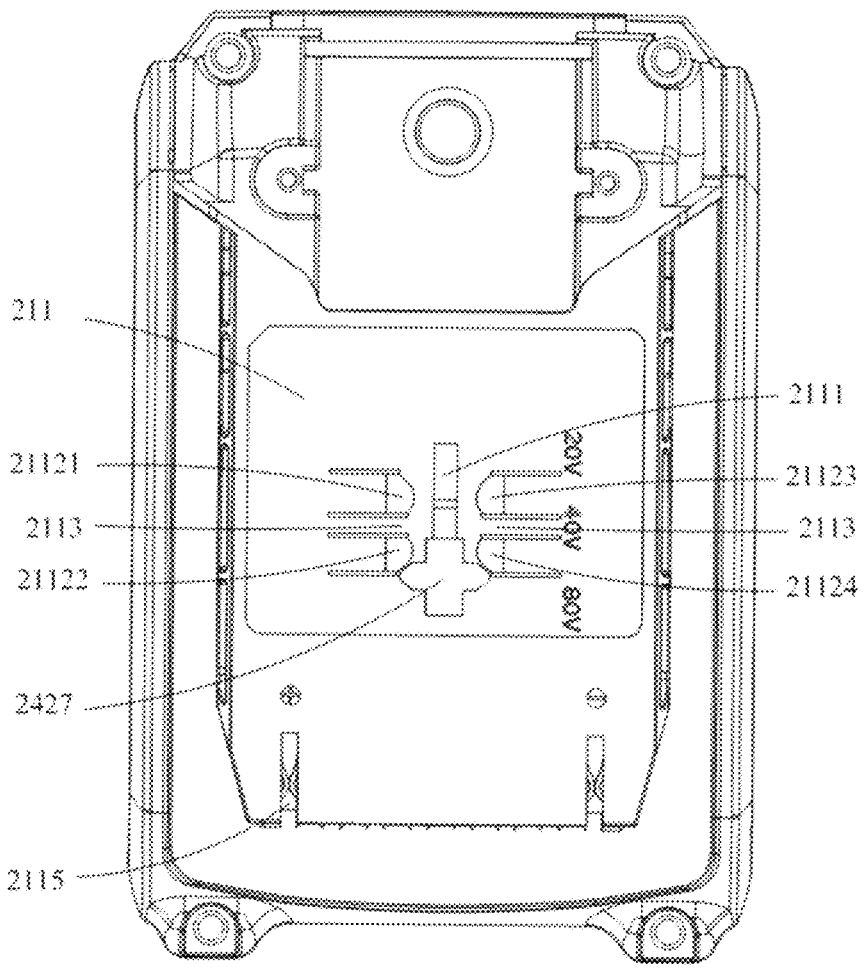
FIG. 36 is a schematic structural diagram of a sliding part in a first position after the first external socket is inserted.
Figure 37:
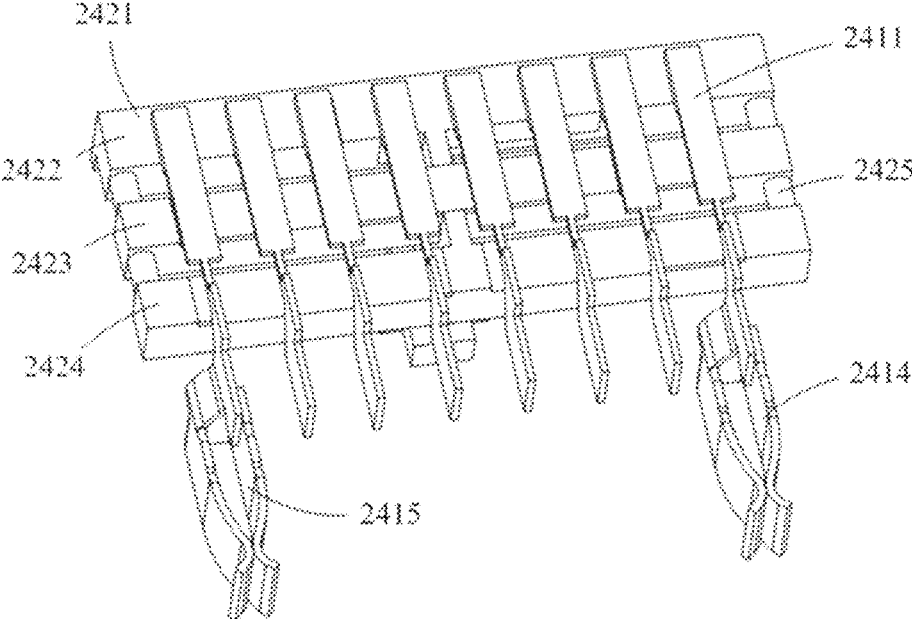
FIG. 37 is a schematic structural diagram of the connection of the connecting terminal with a first contacting terminal after the first external socket is inserted.
Figure 38:
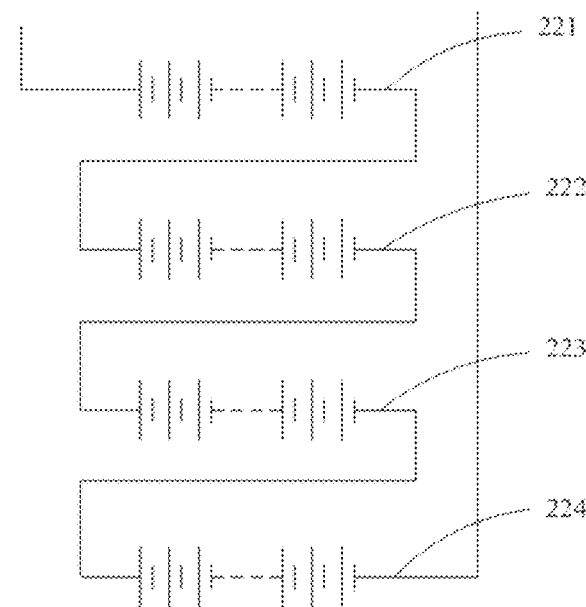
FIG. 38 is a connection circuit diagram of the battery strings after the first external socket is inserted.
Figure 39:
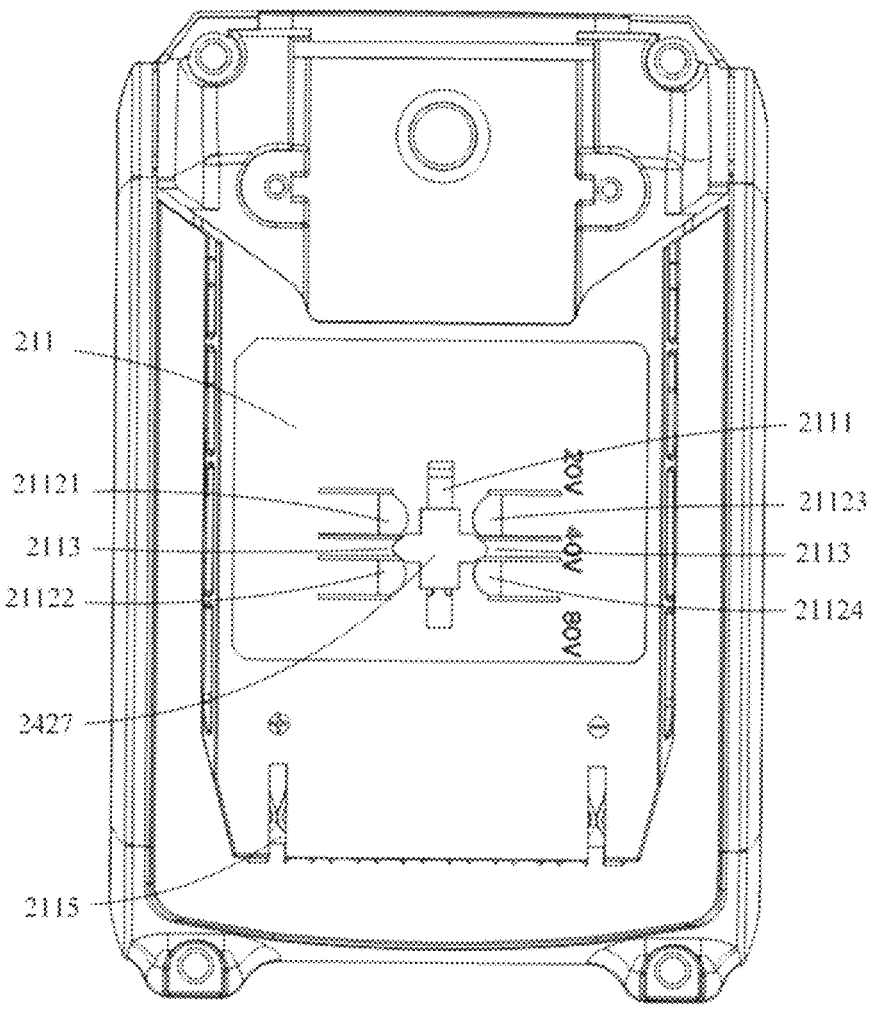
FIG. 39 is a schematic structural diagram of the sliding part in a second position after the second external socket is inserted.
Figure 40:
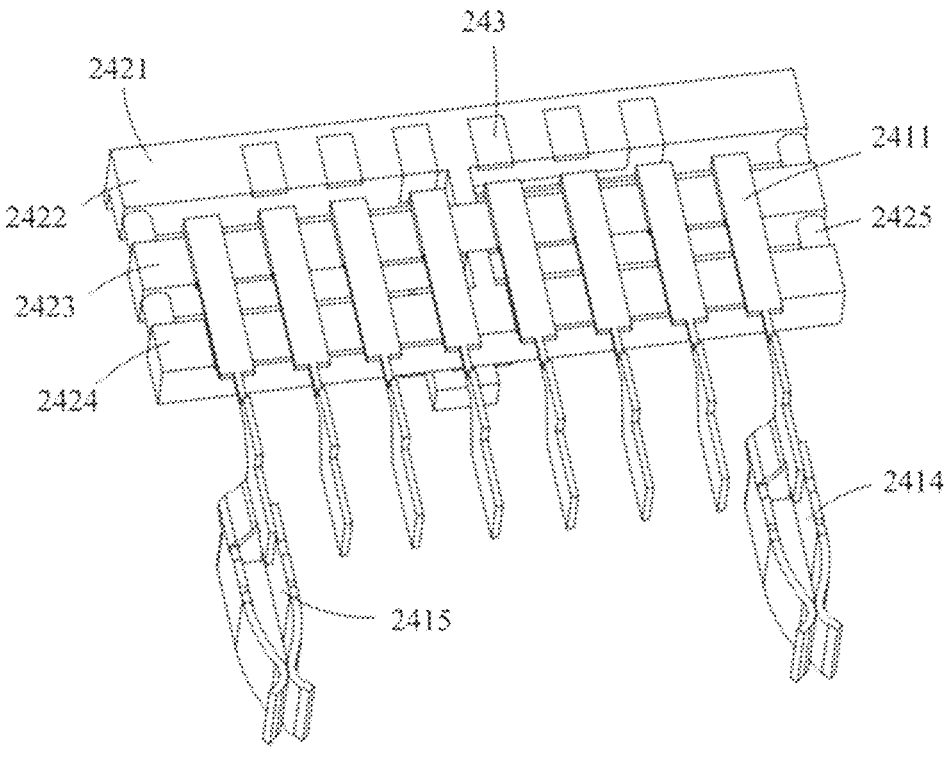
FIG. 40 is a schematic structural diagram of the connection of the connecting terminal with the second contacting terminal after the second external socket is inserted.
Figure 41:
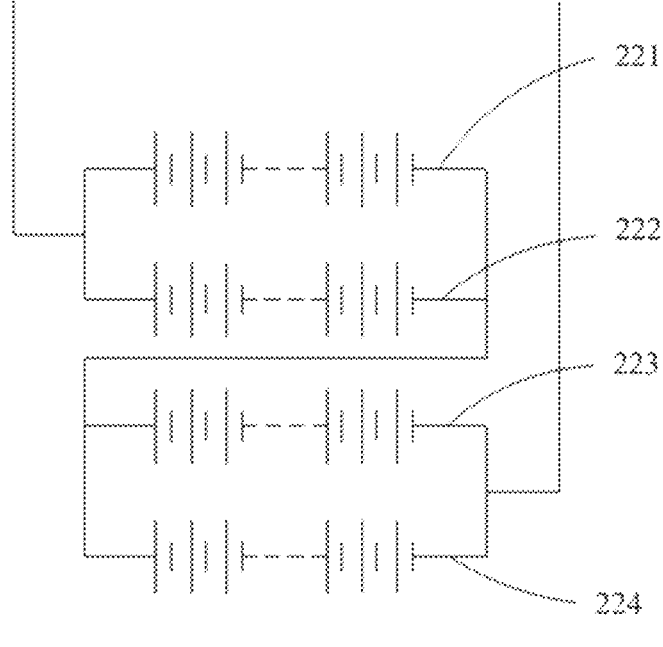
FIG. 41 is a connection circuit diagram of the battery strings after the second external socket is inserted.
Figure 42:
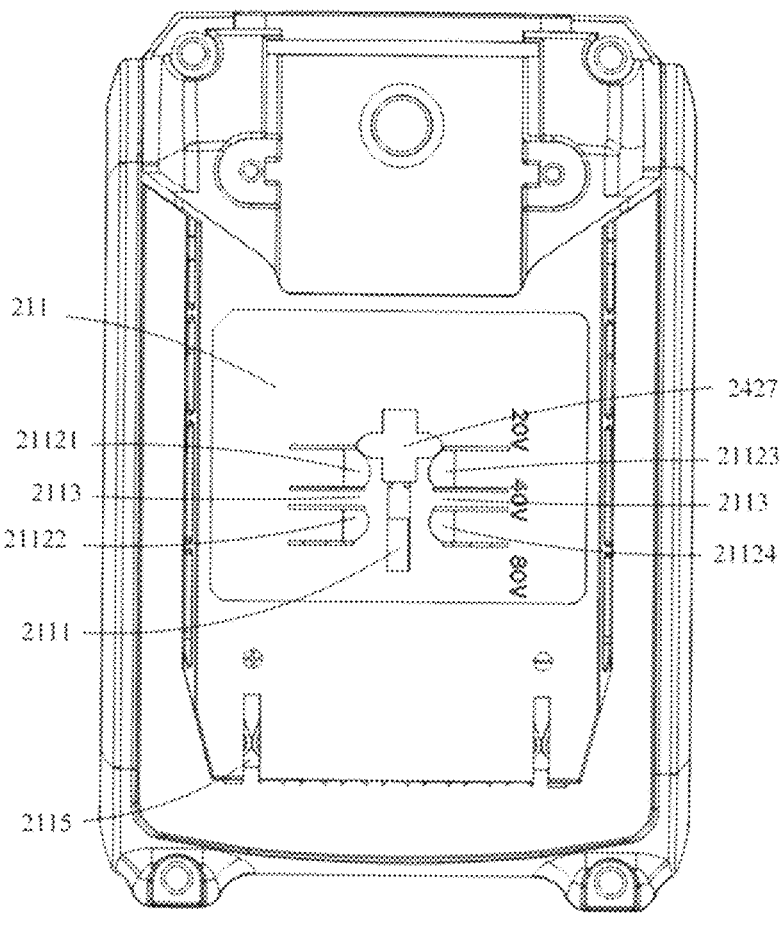
FIG. 42 is a schematic structural diagram of the sliding part in a third position after the third external socket is inserted.
Figure 43:
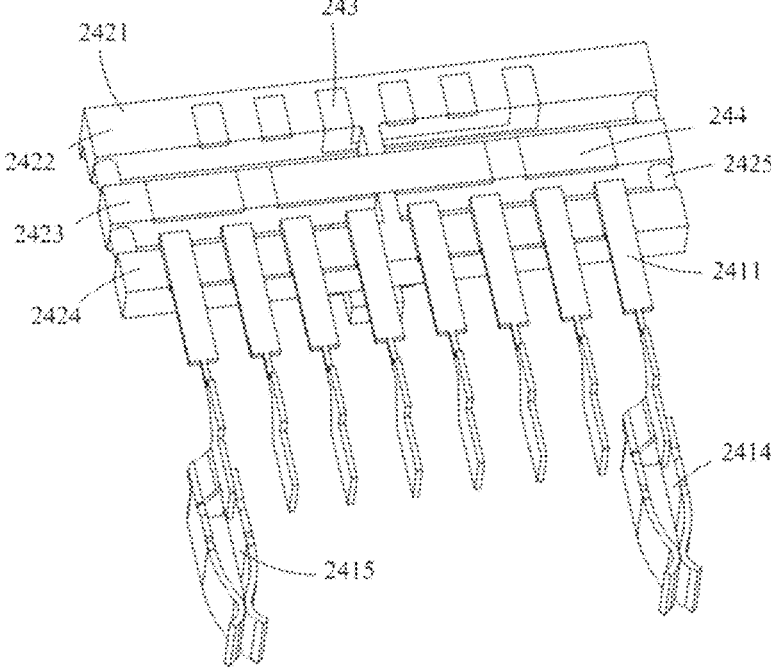
FIG. 43 is a schematic structural diagram of the connection of the connecting terminal with a third contacting terminal after the third external socket is inserted.

As shown in FIG. 32 to FIG. 34, the sliding assembly 242 includes a sliding body 2421, a third contact terminal 243 formed on the sliding body 2421 and spaced apart from each other, a second contact terminal 244, and a first contact terminal 245. The third contact terminal 243, the second contact terminal 244, and the first contact terminal 245 are used to electrically connect with the contact part 2416 of the connecting terminal 2411. When the sliding assembly 242 is in the first position, the contact part 2416 of the connecting terminal 2411 is only electrically connected to the first contact terminal 245. When the sliding assembly 242 slides to the second position, the contact part 2416 of the connecting terminal 2411 is only electrically connected to the second contact terminal 244. And when the sliding assembly 242 slides to the third position, the contact part 2416 of the connecting terminal 2411 is only electrically connected to the third contact terminal 243.

As shown in FIG. 27 and FIG. 32 to FIG. 35, the first contact terminal 245, the second contact terminal 244, and the third contact terminal 243 are arranged at intervals in the sliding direction (up-down direction) of the sliding assembly 242. When the contact part 2416 of the connecting terminal 2411 is electrically connected to the first contact terminal 245, the first battery string 221, the second battery string 222, the third battery string 223, and the fourth battery string 224 are connected in parallel, and the first operating voltage output by the battery pack 200 is 'n' V. When the contact part 2416 of the connecting terminal 2411 is electrically connected to the third contact terminal 243, the first battery string 221, the second battery string 222, the third battery string 223, and the fourth battery string 224 are connected in series with each other, and the third operating voltage output by the battery pack 200 is '4n' V. And when the contact part 2416 of the connecting terminal 2411 is electrically connected to the second contact terminal 244, the first battery string 221, the second battery string 222, the third battery string 223, and the fourth battery string 224 are connected in parallel-series, at which time the second operating voltage output by the battery pack 200 is '2n' V.

As shown in FIG. 27 and FIG. 32 to FIG. 35, the first contact terminal 245 includes a second positive connecting sheet 2451 and a second negative connecting sheet 2452. The second positive connecting sheet 2451 is connected to the positive electrodes of the first battery string 221, the second battery string 222, the third battery string 223, and the fourth battery string 224 respectively. And the second negative connecting sheet 2452 is connected to the negative electrodes of the first battery string 221, the second battery string 222, the third battery string 223, and the fourth battery string 224 respectively. Such that the first battery string 221, the second battery string 222, the third battery string 223, and the fourth battery string 224 are connected in parallel with each other, at which time the first operating voltage 'n' V is equal to the rated output voltage of each battery string.

As shown in FIG. 27 and FIG. 32 to FIG. 35, the second contact terminal 244 includes a first positive connecting sheet 2441 connecting a first positive electrode of the first battery string 221 with a second positive electrode of the second battery string 222; a fourth connecting sheet 2442 separately connecting with a third positive electrode of the third battery string 223, a fourth positive electrode of the fourth battery string 224, a first negative electrode of the first battery string 221, and a second negative electrode of the second battery string 222; and a first negative connecting sheet 2443 connecting the third negative electrode of the third battery string 223 with the fourth negative electrode of the fourth battery string 224. Such that the first battery string 221 is connected in parallel with the second battery string 222, and the third battery string 223 is connected in parallel with the fourth battery string 224, then the first battery string 221 and the second battery string 222 are connected in series with the third battery string 223 and the fourth battery string 224. At which time the second operating voltage '2n' V is equal to the sum of the rated output voltages of two strings of battery cells.

As shown in FIG. 27 and FIG. 32 to FIG. 35, specifically, the third contact terminal 243 includes a first connecting sheet 2431 connecting the second positive electrode of the second battery string 222 with the first negative electrode of the first battery string 221, a second connecting sheet 2432 connecting the third positive electrode of the third battery string 223 with the second negative electrode of the second battery string 222, and a third connecting sheet 2433 connecting the fourth positive electrode of the fourth battery string 224 with the third negative electrode of the third battery string 223. Such that the first battery string 221, the second battery string 222, the third battery string 223, and the fourth battery string 224 are connect in series, at which time the third operating voltage '4n' V is equal to the sum of the rated output voltages of the four strings of battery cells.

As shown in FIG. 32 to FIG. 35, the sliding body 2421 includes a first body 2422, a second body 2423, and a third body 2424 which are arranged in parallel and spaced apart from each other, and a connecting column 2425 connecting the first body 2422, the second body and the third body in its width direction. The third contact terminal 243 is formed on and exposed to the first body 2422. The second contact terminal 244 is formed on and exposed to the second body 2423. And the first contact terminal 245 is formed on and exposed to the third body 2424. The connecting column 2425 is provided with two, and two elastic elements 246 are sleeved on the corresponding connecting column 2425 respectively for driving the sliding assembly 242 to reset after the sliding assembly 242 finishes to slide.

As shown in FIG. 28 and FIG. 32 to FIG. 35, the sliding body 2421 further includes a sliding rod 2426 perpendicular to the second body 2423 and a sliding part 2427 at the tail end of the sliding rod 2426. The sliding rod 2426 protrudes beyond the outer surface of the upper housing 211 and is limited and housed in the sliding groove 2111 so that the sliding part 2427 is exposed outside the upper housing 211. And the sliding part 2427 is used for pushing the sliding body 2421 to slide along the sliding groove 2111 to switch among the first position, the second position and the third position. One end of the elastic element 246 is fixed to the first body 2422, and the other end of the elastic element 246 contacts and fixes to (abuts against) the inner wall surface of the containing cavity 24101 of the connecting body 2410.

When the sliding assembly 242 slides, the elastic element 246 is elastically compressed or released. So that the contact part 2416 of the connecting terminal 2411 switches the connection with the third contact terminal 243, the second contact terminal 244, or the first contact terminal 245.

As shown in FIG. 28, FIG. 29 and FIG. 32 to FIG. 35, the four limiting blocks 2112 on the upper housing 211 are used to limit and fix the sliding part 2427 in the first position, the second position or the third position. In particular, the sliding part 2427 includes a base part 24271 sliding along the sliding groove 2111 and a limiting part 24272 protruding outwards from both sides of the base part 24271. Such that the sliding part 2427 is approximately cross-shaped. When the sliding part 2427 is in the first position, the outer wall surface of the limiting part 24272 abuts against the outer wall surface 2114 of the first limiting block 21121 and the third limiting block 21123. When the sliding part 2427 is in the second position, the limiting part 24272 is housed in the limiting space 2113. And when the sliding part 2427 is in the third position, the outer wall surface of the limiting part 24272 abuts against the outer wall surface 2114 of the second limiting block 21122 and the fourth limiting block 21124. Thus, the sliding part 2427 can be fixed at the corresponding position.

For a more convenient description, defining that a power tool system includes a first power tool (not shown), a second power tool (not shown), and a third power tool (not shown). The first power tool is provided with a first tool interface. And the first tool interface has a first plug of a first configuration and is capable of operating at a first operating voltage. The second power tool is provided with a second tool interface, and has a second plug of a second configuration. The third tool interface is provided with a third tool interface. The third tool interface has a third plug of a third configuration and is capable of operating at a third operating voltage. And each plug is provided with a triggering device for coupling with the converting assembly to enable the converting assembly to switch between different states. In the embodiment, as an example, the first plug is the first external socket, the second plug is the second socket, and the third plug is the third socket. The voltage switching principle of the battery pack of the disclosure is described in detail below combined with the three external sockets. Defining that each battery string includes 5 battery cells connected in series, and the voltage of each battery string is 20 V.

As shown in FIG. 32 to FIG. 35 and FIG. 42 to FIG. 44, when the battery pack 200 is connected to the first external socket of the first power tool, the sliding assembly 242 slides upward to the first position. And then the two elastic elements 246 are compressed, the base part 24271 of the sliding part 2427 is located at the top most end of the sliding groove 2111. The lower side surface of the two limiting parts 24272 separately abut against the outer wall surfaces 2114 of the corresponding first limiting block 21121 and the third limiting block 21123. And the contact part 2416 of the connecting terminal 2411 is electrically connected with the first contact terminal 245. Then the first battery string 221, the second battery string 222, the third battery string 223, and the fourth battery string 224 are connected in parallel. At this time, the first operating voltage output by the battery pack 200 is equal to the rated output voltage of each battery string, namely U=u1=u2=u3=u4=20V. After using different external sockets, the battery pack 200 can output different voltages to satisfy the voltage requirements of the three different power tools and switch quickly and conveniently between the three voltages.

As shown in FIG. 32 to FIG. 35 and FIG. 39 to FIG. 41, when the battery pack 200 is connected to the second external socket of the second power tool, the sliding assembly 242 slides upward to the second position. And then the two elastic elements 246 are compressed. The base part 24271 of the sliding part 2427 is located at the middle position of the sliding groove 2111. The two limiting parts 24272 are limited and contained in the limiting space 2113. And the contact part 2416 of the connecting terminal 2411 is electrically connected with the second contact terminal 244. The first battery string 221 is connected in parallel with the second battery string 222, and the third battery string 223 is connected in parallel with the fourth battery string 224. And then the first battery string 221 and the second battery string 222 are connected in series with the third battery string 223 and the fourth battery string 224 (connected in parallel-series). At this point, the second operating voltage output by the battery pack 200 is equal to the sum of the rated output voltages of two strings of battery cells, namely U=u1+u2=u3+u4=40 V.

As shown in FIG. 32 to FIG. 38, when the battery pack 200 is connected to the third external socket of the third power tool, the sliding assembly 242 is located at the third position. And then the two elastic elements 246 are both in an initial state. The base part 24271 of the sliding part 2427 is located at the bottom end of the sliding groove 2111. The upper side surface of the two limiting parts 24272 separately abut against the outer wall surfaces of the second limiting block 21122 and the fourth limiting block 21124. And the contact part 2416 of the connecting terminal 2411 is electrically connected with the third contact terminal 244. Thereby the first battery string 221, the second battery string 222, the third battery string 223, and the fourth battery string 224 are connected in series. At this point, the third operating voltage output by the battery pack 200 is equal to the sum of the rated output voltages of the four strings of battery cells, namely U=u1+u2+u3+u4=80 V.

As shown in FIG. 28 and FIG. 36 to FIG. 44, in the embodiment, the sliding part 2427 is manually adjusted to slide. When adjusting the sliding part 2427, the sliding part 2427 is directly pushed or pulled toward the first position, the second position or the third position, then the elastic element 246 is compressed or released, and the corresponding limiting block 2112 is elastically deformed. Thereby the sliding part 2427 is convenient to move. After the sliding part 2427 reaches the target position, the limiting block 2112 is automatically reset to limit the position of the sliding part 2427.

As shown in FIG. 32 and FIG. 36 to FIG. 44, in other embodiments, the sliding part 2427 may also be pushed or pulled in a non-manual way, in which way the corresponding design of the connecting body 2410 and the external socket is required. Such that when the external socket is inserted, the external socket can synchronously push the sliding part 2427 to slide, that is not described in detail herein.

As shown in FIG. 26 to FIG. 44, the battery pack 200 of the disclosure may also be applied to a charging system (not shown) that includes the battery pack 200 and a charger for charging the battery pack 200. The charger is provided with a charging interface to couple with the battery interface of the battery pack 200. When the charger charges the battery pack 200, the sliding assembly 242 slides to the first position, and then the first battery string 221, the second battery string 222, the third battery string 223, and the fourth battery string 224 are connected in parallel. The charging voltage output by the charger is equal to the rated output voltage of a single battery string, and is a low voltage. When charging, the sliding assembly 242 may also be located at the third position. At this time, the first battery string 221, the second battery string 222, the third battery string 223, and the fourth battery string 224 are connected in series, and the charging voltage output by the charger is equal to the sum of the rated output voltages of the four strings of battery cells.

As shown in FIG. 26 to FIG. 44, the battery pack 200 of the present embodiment is provided with the first contact terminal 245, the second contact terminal 244, the third contact terminal 243 at different positions of the sliding body 2421. So that when the sliding assembly 242 switches its position among the first position, the second position, and the third position, the connecting terminal 2411 can choose to electrically connect with the first contact terminal 245, the second contact terminal 244, or the third contact terminal 243 to switch the series-parallel state of the strings of battery cells in the battery pack 200. Thereby the output voltage of the battery pack 200 can be changed, and the adaptability of the power tool system with the battery pack 200 can be improved.

Figures 44, 45:
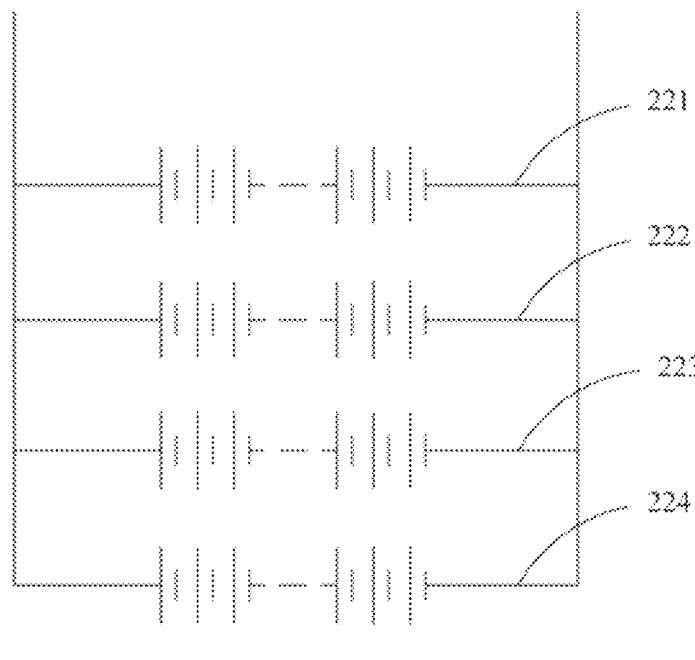
FIG. 44 is a connection circuit diagram of the battery strings after the third external socket is inserted.
FIG. 45 is a second perspective view of a power tool system of the disclosure.
Figures 46, 47:
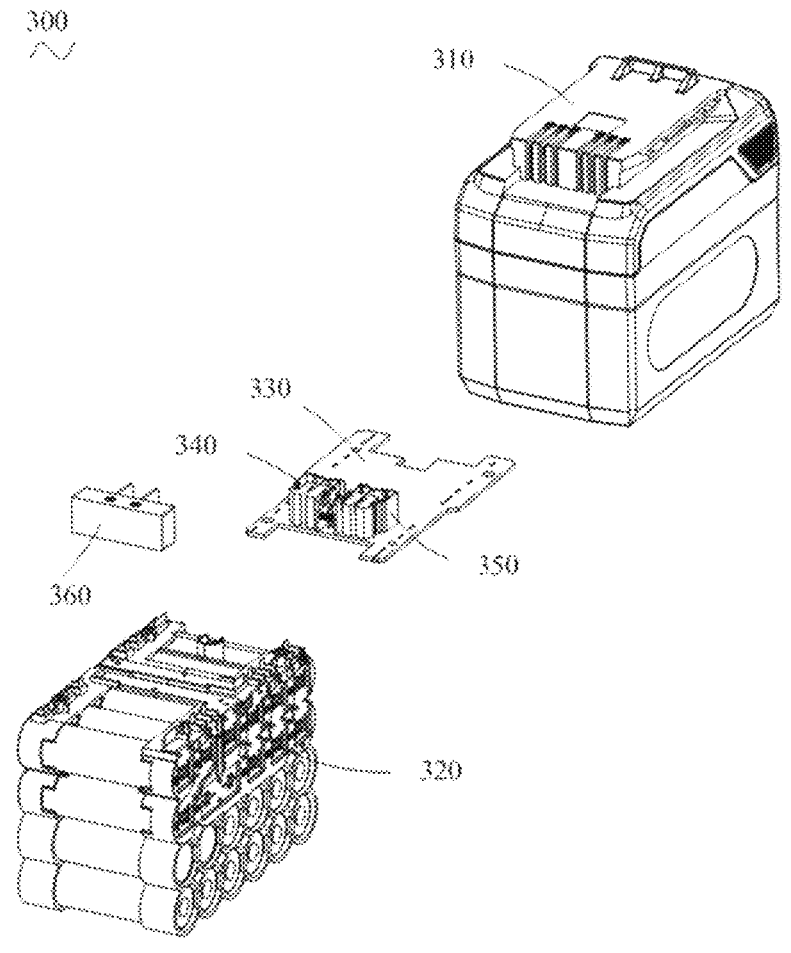
FIG. 46 is an exploded view of the power tool system shown in FIG. 45.
FIG. 47 is a combined side view of the converting assembly and the terminal assembly of FIG. 46.

As shown in FIG. 45 and FIG. 46, the disclosure provides a battery pack 300 which includes a housing 310, battery strings 320 disposed within the housing 310, a circuit board 330, a terminal assembly 350 electrically connected to the battery strings 320, and a converting assembly 340 electrically connected to the terminal assembly 350. The housing 110 is provided with a battery interface for use with a power tool, and an output terminal groove is provided on the battery interface to contain the output terminal. The battery strings 320 include a number of battery cells. The terminal assembly 350 is electrically connected to the battery cells by the circuit board 330. The battery pack 300 of the disclosure is applied to a power tool system. The system further includes an inserting assembly 360 that can be inserted into the battery pack 300 to connect with the converting assembly 340 of the battery pack 300.

Figure 48:
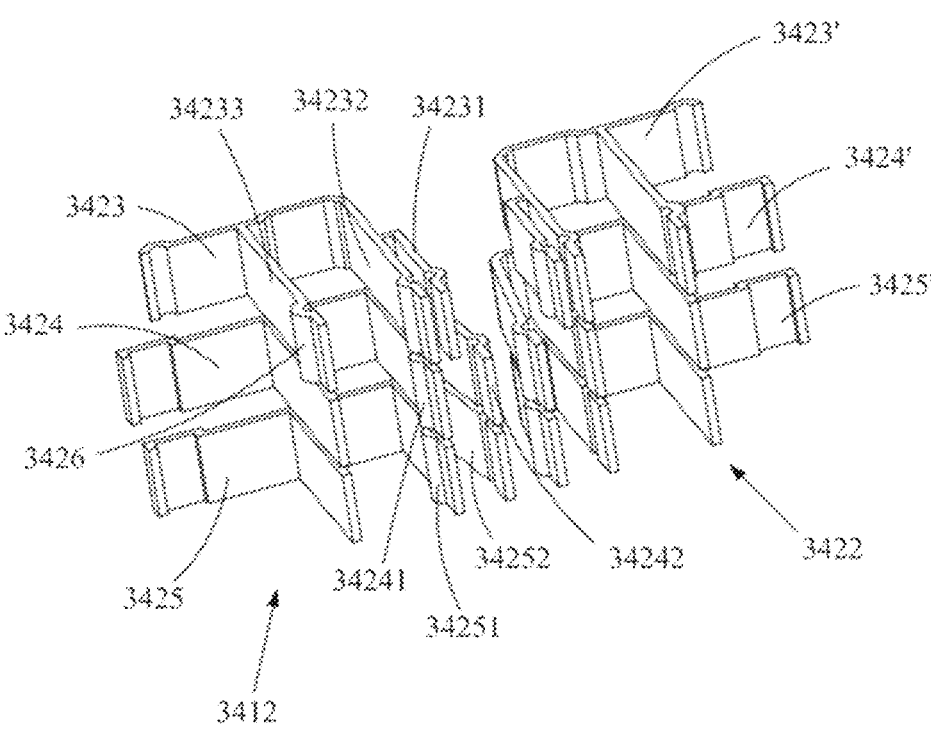
FIG. 48 is a perspective structural view of a first insert and a second insert of FIG. 47.
Figure 49:
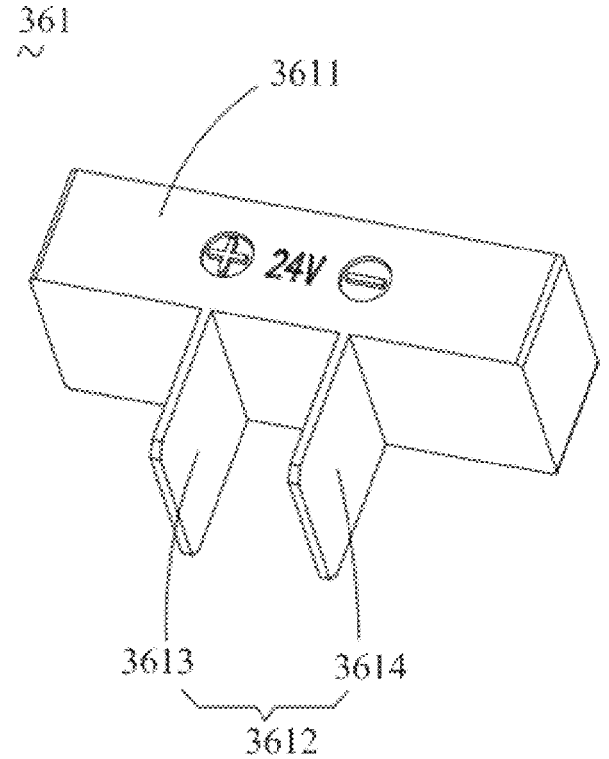
FIG. 49 is a perspective structural view of a first inserting assembly of FIG. 45.
Figure 50:
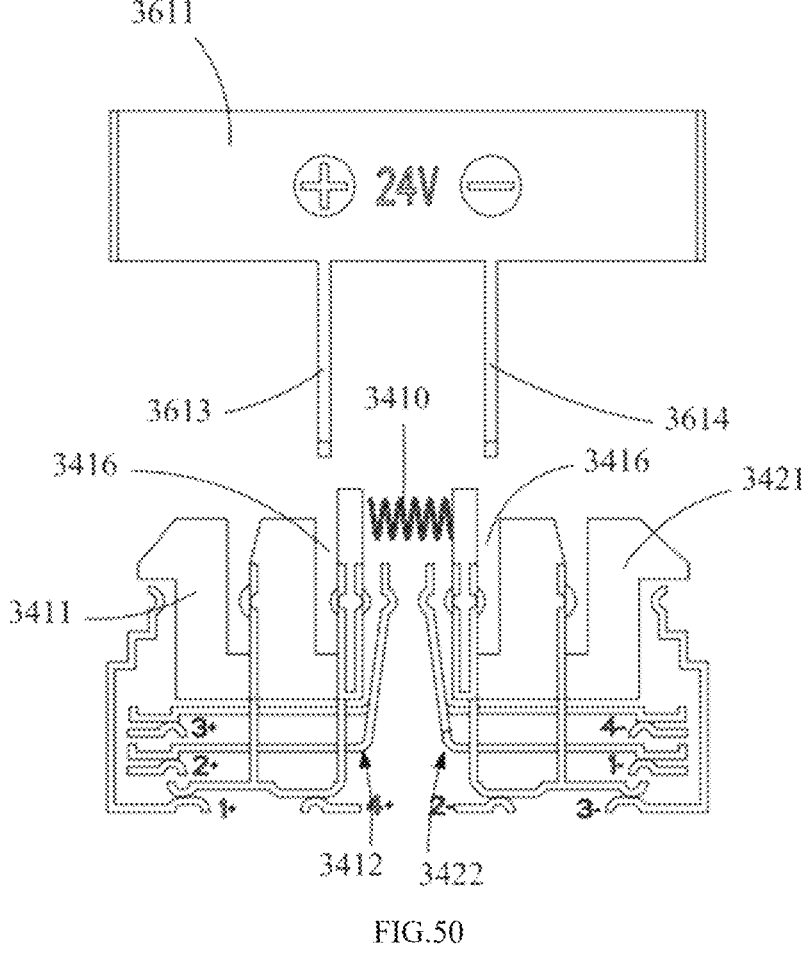
FIG. 50 is a combined schematic structural diagram of the converting assembly and the terminal assembly when the first inserting assembly shown in FIG. 49 begins to insert.
Figure 51:
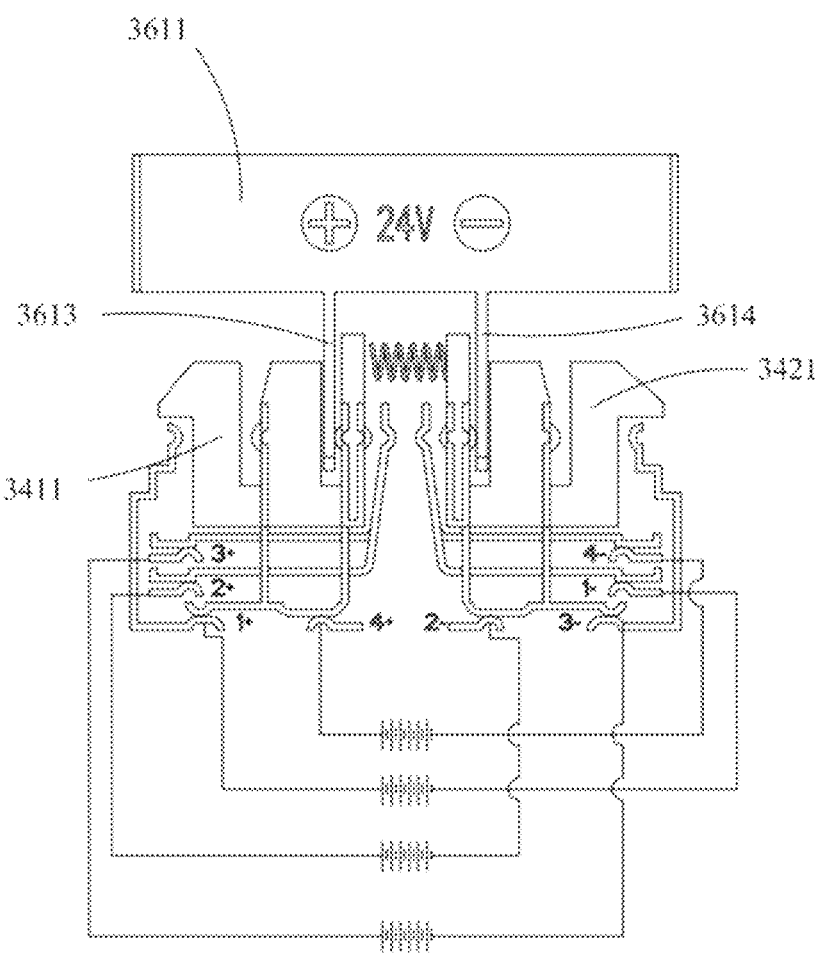
FIG. 51 is a schematic diagram of a circuit connection state within the battery pack after the first inserting assembly shown in FIG. 49 is inserted.
Figure 52:
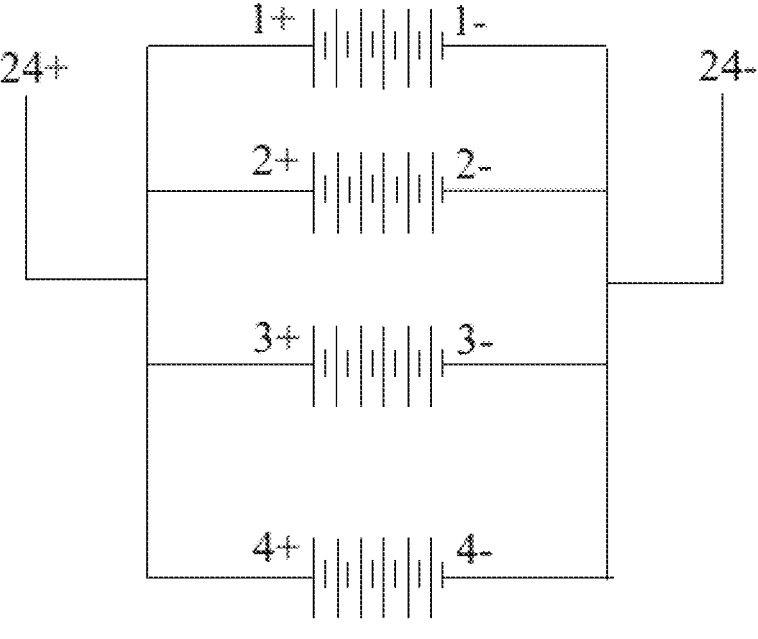
FIG. 52 is a connection circuit diagram of the battery strings after the first inserting assembly shown in FIG. 49 is inserted.
Figure 55:
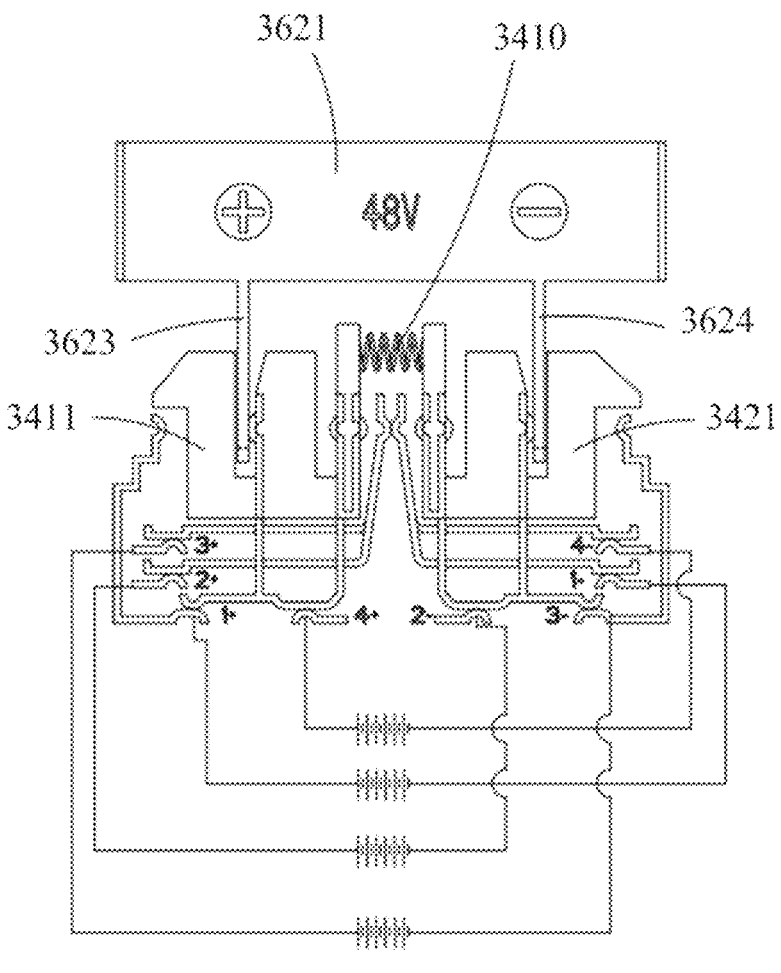
FIG. 55 is a schematic diagram of a circuit connection state within the battery pack after the second inserting assembly shown in FIG. 53 is inserted.
Figure 56:
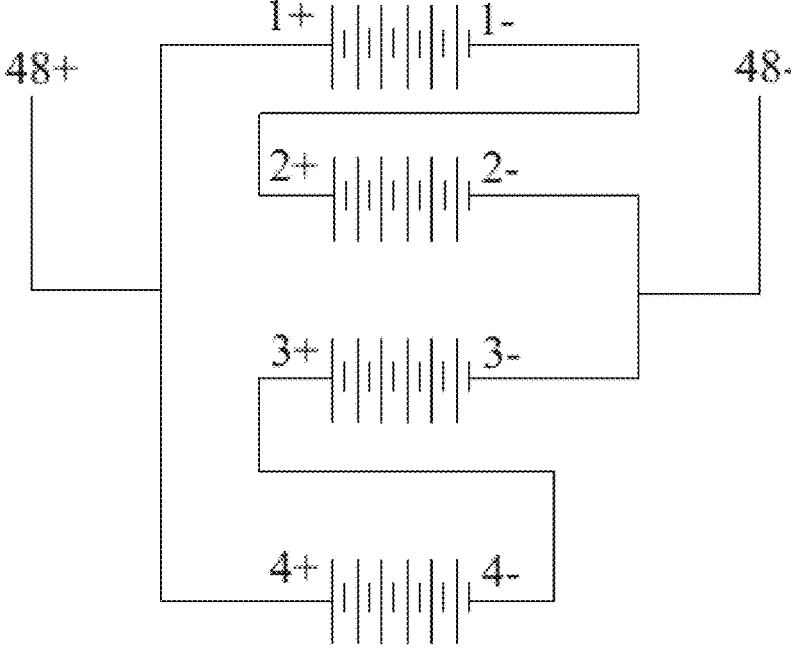
FIG. 56 is a connection circuit diagram of the battery strings after the second inserting assembly shown in FIG. 53 is inserted.
Figure 57:
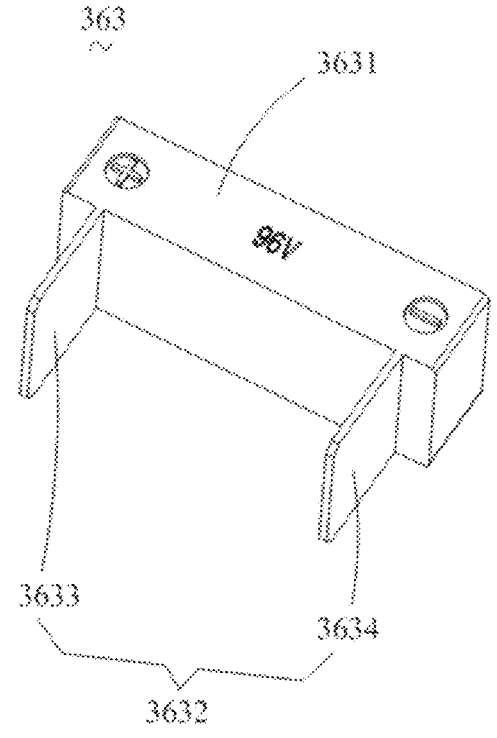
FIG. 57 is a perspective structural view of a third inserting assembly.
Figure 58:
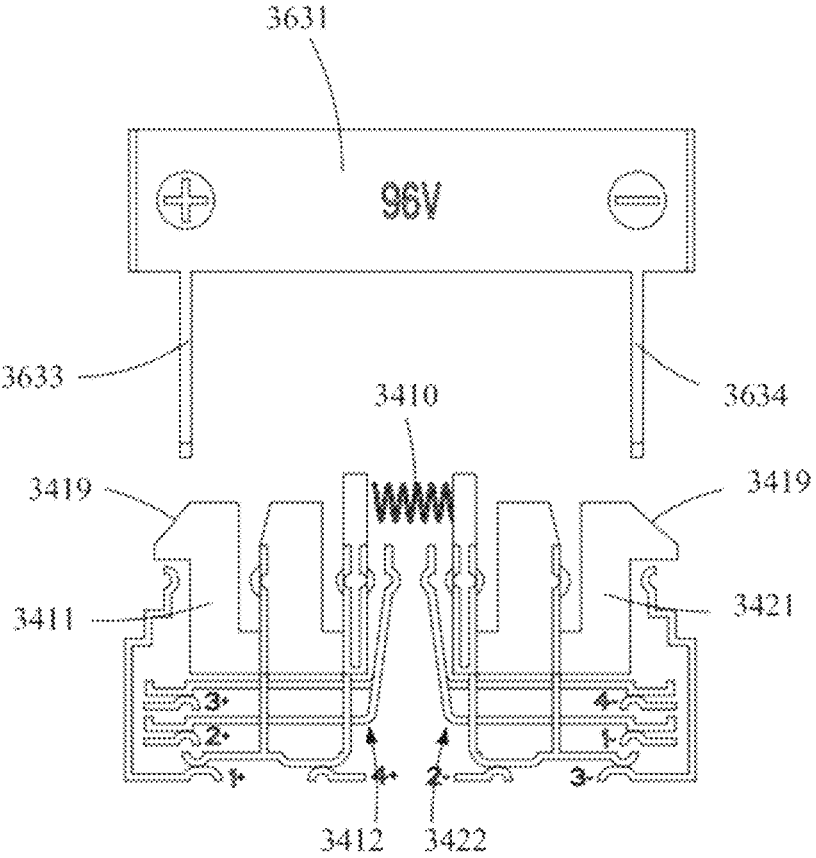
FIG. 58 is a combined schematic structural diagram of the converting assembly and the terminal assembly when the third inserting assembly shown in FIG. 57 starts to insert.
Figure 59:
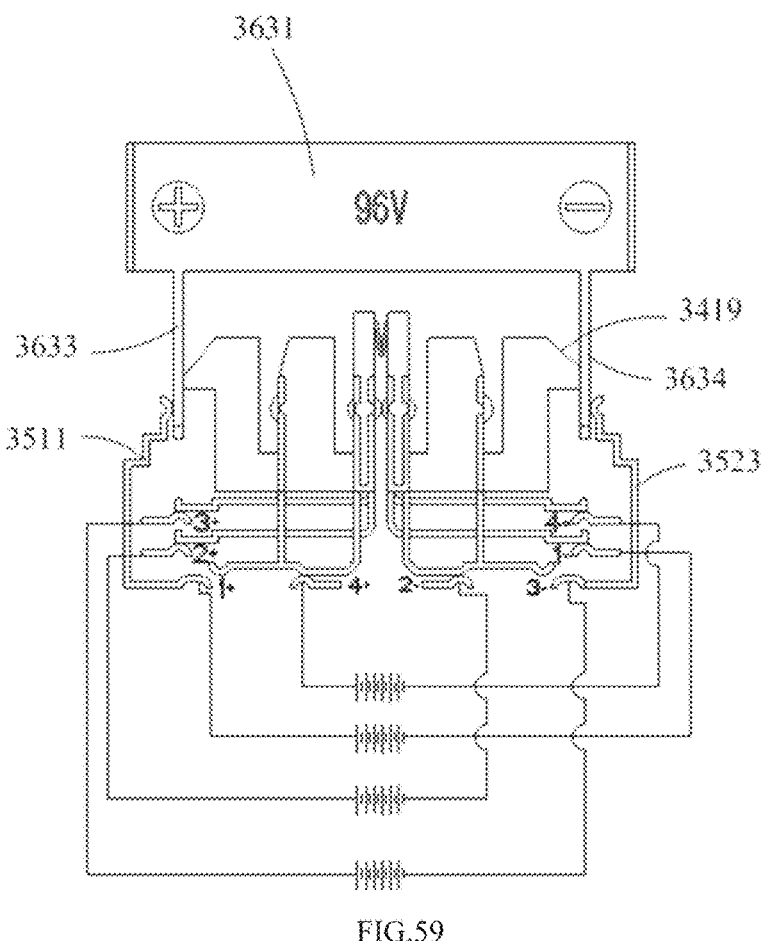
FIG. 59 is a schematic diagram of a circuit connection state within the battery pack after the third inserting assembly shown in FIG. 57 is inserted.
Figure 60:
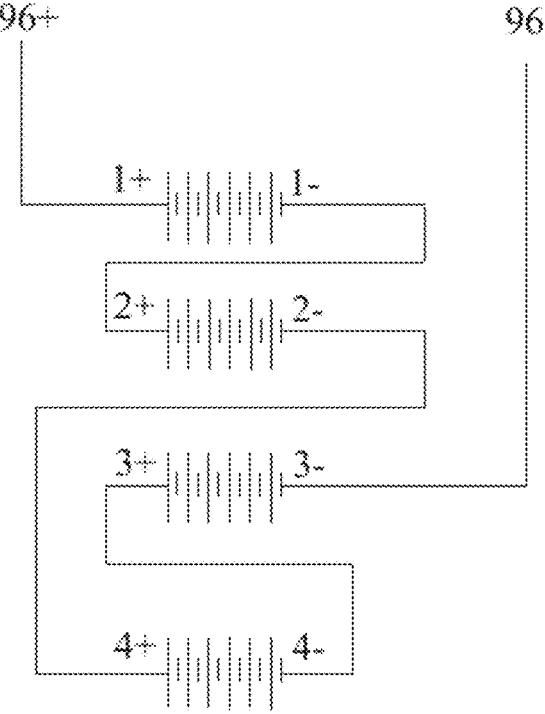
FIG. 60 is a connection circuit diagram of the battery strings after the third inserting assembly shown in FIG. 57 is inserted.

As shown in FIG. 47, FIG. 48 and FIG. 46, the battery strings 320 includes at least a first battery string, a second battery string, a third battery string, and a fourth battery string. Each battery string includes at least a plurality of battery cells connected in series or parallel, that would not be described in detail herein. In the embodiment, as an example, each battery string includes 6 battery cells. Assuming that the rated output voltage of each battery string is 'n' V, namely, the rated output voltage u1 of the first battery string=the rated output voltage u2 of the second battery string=the rated output voltage u3 of the third battery string=the rated output voltage u4 of the fourth battery string='n' V.

As shown in FIG. 46 to FIG. 48, the terminal assembly 350 includes a positive terminal 351 and a negative terminal 352, which are disposed symmetrically with each other. In particular, the positive terminal 351 includes a first positive terminal 3511 connected to a first positive electrode of the first battery string, a second positive terminal 3512 connected to a second positive electrode of the second battery string, a third positive terminal 3513 connected to a third positive electrode of the third battery string, and a fourth positive terminal 3514 connected to a fourth positive electrode of the fourth battery string. And the negative terminal 352 includes a first negative terminal 3521 connected to the first negative electrode of the first battery string, a second negative terminal 3522 connected to the second negative electrode of the second battery string, a third negative terminal 3523 connected to the third negative electrode of the third battery string, and a fourth negative terminal 3524 connected to the fourth negative electrode of the fourth battery string.

As shown in FIG. 46 to FIG. 48, in the embodiment, the first positive terminal 3511 and the third negative terminal 3523 are symmetrical to each other, the second positive terminal 3512 and the first negative terminal 3521 are symmetrical to each other, the third positive terminal 3513 and the fourth negative terminal 3524 are symmetrical to each other, and the fourth positive terminal 3514 and the second negative terminal 3522 are symmetrical to each other. In other embodiments, other designs may be performed on the arrangement of the positive terminal 351 and the negative terminal 352 to achieve the same technical effect as the present embodiment, and not limited herein.

As shown in FIG. 46 to FIG. 48, the converting assembly 340 has a first state, a second state, and a third state. When the converting assembly 340 is in the first state, the battery pack 300 outputs a first operating voltage. When the converting assembly 340 is in the second state, the battery pack 300 outputs a second operating voltage. And when the converting assembly 340 is in the third state, the battery pack 300 outputs a third operating voltage. In the embodiment, the converting assembly 340 includes a first part 341 and a second part 342 left-right symmetrically disposed. And the first part 341 and the second part 342 can move relatively. Such that when the converting assembly 340 is in a first position (in an initial state), the first battery string, the second battery string, the third battery string, and the fourth battery string are connected in parallel, and the battery pack 300 outputs the first operating voltage. When the first part 341 and the second part 342 relatively move a first distance, the converting assembly 340 is in a second position, then the first battery string, the second battery string, the third battery string, and the fourth battery string are connected in a way combined with series and parallel (including series-parallel connection or parallel-series connection), and the battery pack 300 outputs a second operating voltage. When the first part 341 and the second part 342 relatively move a second distance, the converting assembly 340 is located at a third position. And the first battery string, the second battery string, the third battery string and the fourth battery string are connected in series, then the battery pack 300 outputs a third operating voltage. The second distance is greater than the first distance. The first operating voltage is less than the second operating voltage, and the second operating voltage is less than the third operating voltage.

As shown in FIG. 46 to FIG. 48, noted that after the first part 341 and the second part 342 move relatively, the first part 341 and the second part 342 may be deformed or may not, as long as the first operating voltage, the second operating voltage, or the third operating voltage can be output.

As shown in FIG. 46 to FIG. 50, the first part 341 includes a first body 3411 and a first insert 3412 injection molded on the first body 3411. The second part 342 includes a second body 3421 and a second insert 3422 injection molded on the second body 3421. The first body 3411 and the second body 3421 are disposed symmetrically with each other. And the first insert 3412 and the second insert 3422 are also disposed symmetrically with each other. The first insert 3412 and the second insert 3422 are separately and electrically connected to the terminal assembly 350 to indirectly and electrically connect with each battery string. The converting assembly 340 further includes an elastic element 3410 located between the first body 3411 and the second body 3421. And when the first part 341 and the second part 342 relatively move a first distance or a second distance, the first body 3411 and the second body 3421 move relatively, then the elastic member 3410 is compressed. The elastic element 3410 is a compression spring. One end of the compression spring is clamped to the first body 3411, and the other end of the compression spring is clamped to the second body 3421. Such that the compression spring would not be inadvertently disengaged from the first body 3411 and the second body 3421. As the first body 3411 and the second body 3421 are identical in structure and symmetrically disposed, taking the structure of the first body 3411 as an example to describe the structure in detail below.

As shown in FIG. 46 to FIG. 47, the first body 3411 (the second body 3421) includes a first column 3413, a second column 3414, a third column 3415, a first inserting groove 3416, and a second inserting groove 3417. The first column 3413, the second column 3414, and the third column 3415 are disposed in parallel with each other. The first inserting groove 3416 is formed between the first column 3413 and the second column 3414. And the second inserting groove 3417 is formed between the second column 3414 and the third column 3415. The elastic element 3410 is fixedly connected to the two first columns 3413. One side of the second column 3414 facing the second inserting groove 3417 is provided with a first guide surface 3418 extending obliquely, and the third column 3415 is also provided with a second guide surface 3419 extending obliquely. The inclination angle (angle with respect to the horizontal plane) of the first guide surface 3418 is greater than the inclination angle of the second guide surface 3419. One end of the first positive terminal 3511 and one end of the third negative terminal 3523 extend to the lower side of the corresponding second guide surface 3419.

As shown in FIG. 46 to FIG. 50, the first insert 3412 is partially exposed to the first inserting groove 3416 and the second inserting groove 3417 of the first body 3411. The second insert 3422 is partially exposed to the first inserting groove 3416 and the second inserting groove 3417 of the second body 3421. The first insert 3412 is formed on the first body 3411 for connecting with the positive electrode of each battery string in the battery strings 320. And the second insert 3422 is formed on the second body 3421 for connecting with the negative electrode of each battery string in the battery strings 320. In the initial state, there is a space between the first insert 3412 and the second insert 3422.

Referring to FIG. 46 to FIG. 48, the first positive terminal 3511, the second positive terminal 3512, the third positive terminal 3513, the fourth positive terminal 3514, the first negative terminal 3521, the second negative terminal 3522, the third negative terminal 3523, and the fourth negative terminal 3524 are each provided with a convex hull 353 which is used for electrically contacting with the first insert 3412 and the second insert 3422. Thereby the terminal assembly 350 can be electrically connected with the converting assembly 340.

Referring to FIG. 47 to FIG. 50, the first insert 3412 includes a first connecting sheet 3423, a second connecting sheet 3424, and a third connecting sheet 3425. The first connecting sheet 3423 is connected with the first positive terminal 3511 and the fourth positive terminal 3514 simultaneously. The second connecting sheet 3424 is connected to the second positive terminal 3512. And the third connecting sheet 3425 is connected to the third positive terminal 3513. The second insert 3422 includes a fourth connecting sheet 3423', a fifth connecting sheet 3424', and a sixth connecting sheet 3425'. The fourth connecting sheet 3423' is connected to the second negative terminal 3522 and the third negative terminal 3523 simultaneously. The fifth connecting sheet 3424' is connected to the first negative terminal 3521, and the sixth connecting piece 3425' is connected to the fourth negative terminal 3524. The first connecting sheet 3423 is symmetrically arranged with the fourth connecting sheet 3423'. The second connecting sheet 3424 is symmetrically arranged with the fifth connecting sheet 3424'. And the third connecting sheet3425 is symmetrically arranged with the sixth connecting sheet 3425'. The specific structure of each connecting sheet is described in detail below by taking the first connecting sheet 3423, the second connecting sheet 3424 and the third connecting sheet 3425 as an example.

As shown in FIG. 47 to FIG. 48, the first connecting sheet 3423 (the fourth connecting sheet 3423') includes a first contact part 34231, a second contact part 34232, and a third contact part 34233 arranged in sequence. The first contact part 34231 and the second contact part 34232 are symmetrical to each other. The second contact part 34232 and the third contact part 34233 are parallel to each other. And the second connection sheet 3424 (the fifth connection sheet 3424') includes a fourth contact part 34241 and a fifth contact part 34242. The fourth contact part 34241 and the second contact part 34232 are parallel (or flush) with each other. And the fifth contact part 34242 is arranged obliquely in a direction away from the fourth contact part 34241. The third connecting sheet 3425 (the sixth connecting sheet 3425') includes a sixth contact part 34251 and a seventh contact part 34252. The sixth contact part 34251 and the fourth contact part 34241 are parallel to each other. And the sixth contact part 34251 is aligned front and rear with the fourth contact part 34241 and the second contact part 34232. The seventh contact part 34252 and the fifth contact part 34242 are parallel to each other. And the seventh contact part 34252 and the fifth contact part 34242 are parallel to each other aligned front and rear.

As shown in FIG. 47 to FIG. 48, preferably, each contact part is provided with a protruding part 3426 that protrudes. The first contact part 34231, the fifth contact part 34242, and the seventh contact part 34252 are both located between the first body 3411 and the second body 3421, and bellow the elastic element 3410. And the fifth contact part 34242 and the seventh contact part 34252 both can be elastically deformed. The protruding parts 3426 on the second contact part 34232, the fourth contact part 34241, and the sixth contact part 34251 are housed in and protrude out of the first inserting groove 3416. And the protruding part 3426 on the third contact part 34233 is housed in and protrudes out of the second inserting groove 3417.

As shown in FIG. 46 to FIG. 60, the inserting assembly 360 includes a first inserting assembly 361, a second inserting assembly 362, and a third inserting assembly 363. When the battery pack is connected to the first inserting assembly 361, the converting assembly 340 is in the first position (in an initial state), and the battery pack 300 outputs the first operating voltage. When the battery pack is connected with the second inserting assembly 362, the first part 341 and the second part 342 relatively move the first distance. Then the converting assembly 340 is located at the second position, and the battery pack 300 outputs the second operating voltage. When the battery pack is connected with the third inserting assembly 363, the first part 341 and the second part 342 relatively move the second distance. Then the converting assembly 340 is located at the third position, and the battery pack 300 outputs the third operating voltage.

For a more convenient description, defining that a power tool system includes a first power tool, a second power tool, and a third power tool. The first power tool is capable of operating at a first operating voltage, and a first tool interface is disposed on the first power tool. The second power tool is capable of operating at a second operating voltage, and a second tool interface disposed on the second power tool. And the third power tool is capable of operating at a third operating voltage, and a third tool interface is disposed on the third power tool. The first tool interface includes a first plug, and the first plug is the first inserting assembly 361, for instance. The second tool interface includes a second plug, and the second plug is the second inserting assembly 362, for instance. The third tool interface includes a third plug, and the third plug is the third inserting assembly 363, for instance. And the first inserting assembly 361, the second inserting assembly 362, and the third inserting assembly 363 are preferably male plug-ins. The converting assembly 340 is preferably a female plug-in. But that should not be limited thereto. The voltage switching principle of the battery pack of the disclosure will be described in detail below by taking the three inserting assemblies as an example.

As shown in FIG. 46 to FIG. 52, the first inserting assembly 361 includes a body part 3611 and a male terminal 3612 formed on the body part 3611. The male terminal 3612 includes a positive male terminal 3613 and a negative male terminal 3614. The positive male terminal 3613 is configured to connect with the first insert 3412. The negative male terminal 3614 is configured to connect with the second insert 3422. Thereby the terminal assembly 350 of the battery pack 300 and the male terminal of the first inserting assembly 361 can be electrically turned on to transmit current and voltage.

As shown in FIG. 47 to FIG. 52, when the first inserting assembly 361 is inserted, under the action of external thrust, the positive male terminal 3613 is gradually slid into the first inserting groove 3416 of the first body 3411, and the negative male terminal 3614 correspondingly slides into the first inserting groove 3416 of the second body 3421. At this time, the converting assembly 340 is in the first position (in the initial state), and an interval is left between the first insert 3412 and the second insert 3422.

As shown in FIG. 46 to FIG. 52, when the first inserting assembly 361 is inserted, the second contact part 34232 of the first connecting sheet 3423, the fourth contact part 34241 of the second connecting sheet 3424, and the sixth contact part 34251 of the third connecting sheet 3425 are simultaneously in electrical contact with the positive male terminal 3613. Corresponding, The second contact part 34232 of the fourth connecting sheet 3423', the fourth contact part 34241 of the fifth connecting sheet 3424', and the sixth contact part 34251 of the sixth connecting piece 3425' are also simultaneously in electrical contact with the negative male terminal 3614. At this time, the first battery string, the second battery string, the third battery string, and the fourth battery string are connected in parallel, and the first operating voltage output by the battery pack 300 is 'n' V. The first operating voltage output by the battery pack 300 is equal to the rated output voltage of each battery string. As an example, if the rated output voltage of a single battery string is 24 V, the first operating voltage is $U = u1 = u2 = u3 = u4 = 24$ V.

As shown in FIG. 46, FIG. 48, and FIG. 53 to FIG. 56, the second inserting assembly 362 includes a body part 3621 and a male terminal 3622 formed on the body part 3621. The male terminal 3622 includes a positive male terminal 3623 and a negative male terminal 3624. The positive male terminal 3623 is used to connect with the first insert 3412, and the negative male terminal 3624 is used to connect with the second insert 3422. Such that the terminal assembly 350 of the battery pack 300 and the male terminal 3622 of the second inserting assembly 362 can be electrically turned on to transmit current and voltage. Unlike the first inserting assembly 361 shown in FIG. 49, the distance between the positive male terminal 3623 and the negative male terminal 3624 of the second inserting assembly 362 is greater than the distance between the positive male terminal 3613 and the negative male terminal 3614 of the first inserting assembly 361.

As shown in FIG. 46, FIG. 48, and FIG. 53 to FIG. 56, When the second inserting assembly 362 is inserted, under the action of external thrust, the first guide surface 3418 guides the positive male terminal 3623 to gradually slide into the second inserting groove 3417 of the first body 3411, and the negative male terminal 3624 also correspondingly to slide into the second inserting groove 3417 of the second body 3421. As the distance between the second inserting groove 3417 of the first body 3411 and the second inserting groove 3417 of the second body 3421 is greater than the distance between the positive male terminal 3623 and the negative male terminal 3624 of the second inserting assembly 362, during insertion of the second inserting assembly 362, the first body 3411 and the second body 3421 would be pushed to relatively move the first distance, and the first insert 3412 and the second insert 3422 may follow to relatively move the first distance. Then the elastic element 3410 may be compressed.

As shown in FIG. 53 to FIG. 56 combined with FIG. 46 and FIG. 48, when the second inserting assembly 362 is inserted, the third contact part 34233 of the first connecting sheet 3423 is in electrical contact with the positive male terminal 3623. And the fifth contact part 34242 of the second connecting sheet 3424 and the fifth contact part 34242 of the corresponding fifth connecting sheet 3424' are elastically deformed and electrically contacted. The seventh contact part 34252 of the third connecting sheet 3425 and the seventh contact part 34252 of the corresponding sixth connecting sheet 3425' are elastically deformed and electrically contacted. And the third contact part 34233 of the fourth connecting sheet 3423' is in electrical contact with the negative male terminal 3624. At this time, the first battery string and the second battery string are connected in series to form a first battery string, the third battery string and the fourth battery string are connected in series to form a second battery string, and then the first battery string and the second battery string are connected in parallel (series-parallel connection). The second operating voltage output by the battery pack 300 is '2n' V, then the second operating voltage output by the battery pack 300 is equal to the sum of the rated output voltages of two strings of battery cells, namely U=u1+u2=u3+u4=48V.

As shown in FIG. 57 to FIG. 60 combined with FIG. 46 and FIG. 48, the third inserting assembly 363 includes a body part 3631 and a male terminal 3632 formed on the body part 3631. The male terminal 3632 includes a positive male terminal 3633 and a negative male terminal 3634. The positive male terminal 3633 is used for connecting with the positive terminal 351, and the negative male terminal 3634 is used for connecting with the negative terminal 352. So that terminal assembly 350 of the battery pack 300 and the male terminal 3632 of the third inserting assembly 363 can be turned on to transmit current and voltage. Unlike the second inserting assembly 362 shown in FIG. 53, the distance between the positive male terminal 3633 and the negative male terminal 3634 of the third inserting assembly 363 is greater than the distance between the positive male terminal 3623 and the negative male terminal 3624 of the second inserting assembly 362.

As shown in FIG. 57 to FIG. 60 combined with FIG. 46 and FIG. 48, when the third inserting assembly 363 is inserted, under the action of external thrust, the corresponding second guide surface guides the positive male terminal 3633 and the negative male terminal 3634 to gradually slid. Because the total length of the first body 3411 and the second body 3421 is longer than the distance between the positive male terminal 3633 and the negative male terminal 3634 of the third inserting assembly 363, during insertion of the third inserting assembly 363, the first body 3411 and the second body 3421 would be pushed to move the second distance relatively, the first insert 3412 and the second insert 3422 follow to move the second distance relatively, and then the elastic element 3410 is compressed. At the same time, the first connecting sheet 3423 is disconnected from the first positive terminal 3511, and the fourth connecting sheet 3423' is disconnected from the third negative terminal 3523.

As shown in FIG. 57 to FIG. 60 combined with FIG. 47 and FIG. 48, when the third inserting assembly 363 is inserted, the positive male terminal 3633 is in electrical contact with the first positive terminal 3511 below the second guide surface 3419. The first contact part 34231 of the first connecting sheet 3423 is in electrical contact with the first contact part 34231 of the corresponding fourth connecting sheet 3423'. The fifth contact part 34242 of the second connecting sheet 3424 and the fifth contact part 34242 of the corresponding fifth connecting sheet 3424' are elastically deformed and electrically contacted. The seventh contact part 34252 of the third connecting sheet 3425 and the seventh contact part 34252 of the corresponding sixth connecting sheet 3425' are elastically deformed and electrically contacted. And the negative terminal 3634 is in electrical contact with third negative terminal 3523 below the second guide surface. At this time, the first battery string, the second battery string, the fourth battery string, and the third battery string are connected in series, and the third operating voltage output by the battery pack 300 is '4n' V. The third operating voltage output by the battery pack 300 is equal to the sum of the rated output voltages of the four strings of battery cells, namely U=u1+u2+u3+u4=96 V.

As shown in FIG. 46 to FIG. 60, after using different inserting assemblies 360, the battery pack 300 can output different voltages to satisfy the voltage requirements of three different power tools and switch quickly and conveniently among the three voltages. Certainly, after finishing the power transmission, the first inserting assembly 361, the second inserting assembly 362, or the third inserting assembly 363 may be directly pulled out, then the first body 3411 and the second body 3421 will return to the initial state (the low-voltage state) under the elastic force of the elastic element 3410 to prepare for the next insertion.

As shown in FIG. 45 to FIG. 60, the battery pack 300 of the disclosure may further be applied to a charging system (not shown) that includes the battery pack 300 and a charger charging the battery pack 300. A charging interface is provided on the charger to couple with the battery interface of the battery pack 300. When the charger charges the battery pack 300, the converting assembly 340 is in the first position (in the initial state). At this time, the first battery string, the second battery string, the third battery string, and the fourth battery string are connected in parallel. The charging voltage output by the charger is equal to the rated output voltage of one battery string, and is a low-voltage. That can protect the battery pack 300 from the impact of high current and high voltage.

As shown in FIG. 45 to FIG. 60, the series and parallel state of each battery string of the battery pack 300 of the present embodiment can be switched by controlling the distance of the relative movement of the first part 341 and the second part 342 of the converting assembly 340. Thereby the output voltage of the battery pack 300 can be changed, and the adaptability of the power tool system with the battery pack 300 can be improved.

Figure 61:
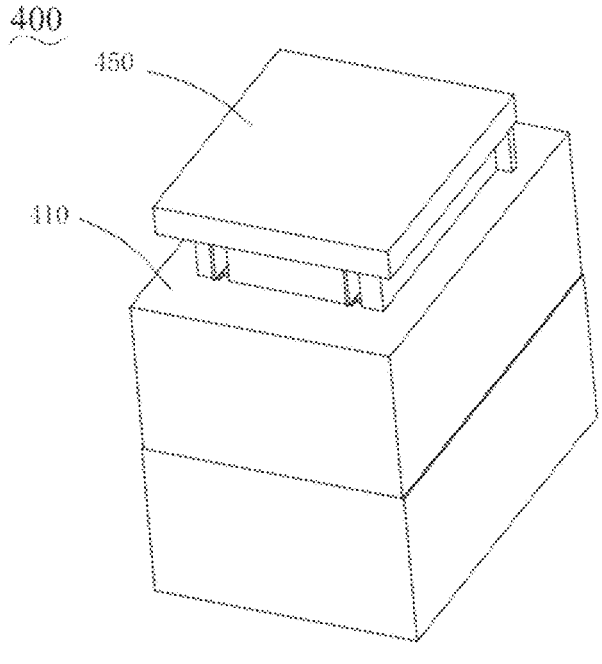
FIG. 61 is a third perspective view of a power tool system of the disclosure.
Figure 62:
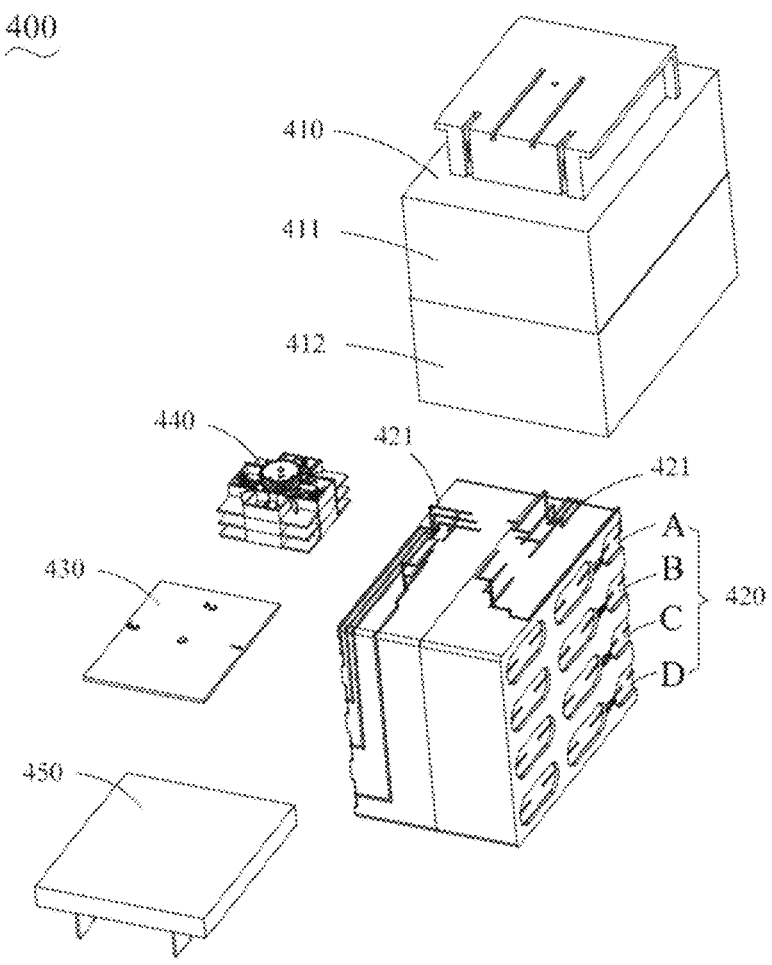
FIG. 62 is an exploded view of the power tool system shown in FIG. 61.

As shown in FIG. 61 and FIG. 62, the disclosure provides a battery pack 400 includes a housing 410, battery strings 420 housed within the housing 410, a circuit board 430, and a converting assembly 440 electrically connected to the battery strings 420. The battery strings 420 include a number of strings of battery cells. And the converting assembly 440 is electrically connected to each battery string. The battery pack 400 of the disclosure is used on a power tool system. And the power tool system further includes an external coupling element 450 that can be inserted into the battery pack 400 to connect with the battery pack 400.

Figure 63:
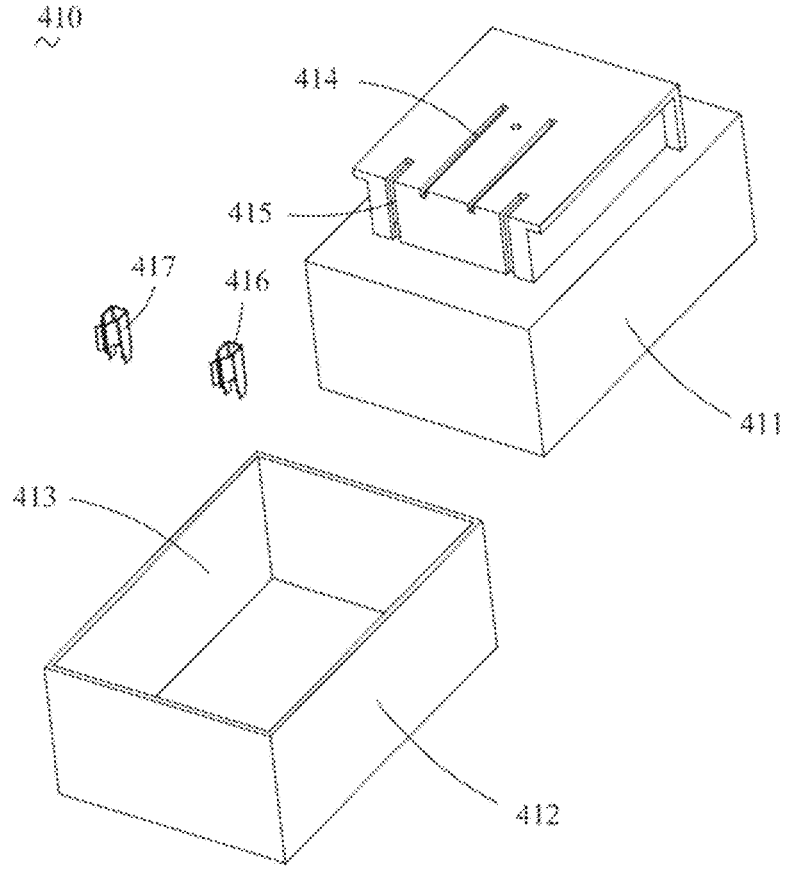
FIG. 63 is an exploded view of a housing assembly of FIG. 62.
Figure 64:
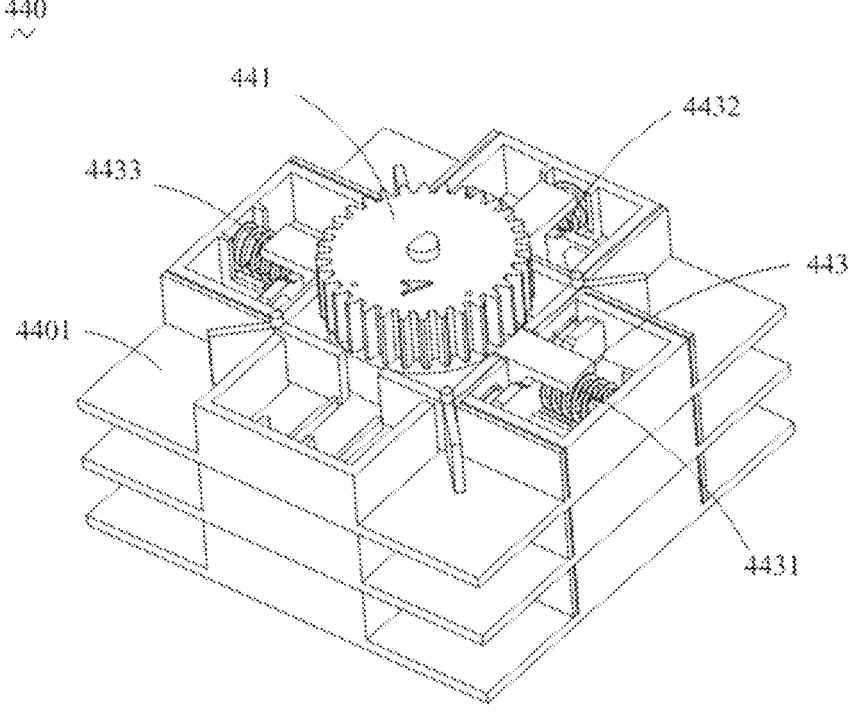
FIG. 64 is a perspective structural view of the converting assembly of FIG. 62.

As shown in FIG. 62 and FIG. 63, the housing 410 is provided with a battery interface for use with the power tool. And the battery interface is provided with an output terminal groove to contain the output terminal. Specifically, the housing 410 includes an upper housing 411 and a lower housing 412. The battery strings 420, the circuit board 430, and the converting assembly 440 are disposed within the containing space 413 enclosed by the upper housing 411 and the lower housing 412. The top of the upper housing 411 is provided with two docking grooves 414, and two plug interface 415 are arranged on the side wall of upper housing 411, and a positive terminal 416 and a negative terminal 417 electrically connected to the battery strings 420 are disposed at the plug interfaces 415. The positive terminal 416 is connected to the positive electrode of the battery strings 420 to coupling with the external coupling element 450 as a total positive output terminal, and the negative terminal 417 is connected to the negative electrode of the battery strings 420 to coupling with the external coupling element 450 as a total negative output terminal. Such that the voltage in the battery pack 400 can be output.

As shown in FIG. 62, the battery strings 420 includes at least a first battery string A, a second battery string B, a third battery string C and a fourth battery string D. And a first positive electrode and a first negative electrode of the first battery string A, a second positive electrode and a second negative electrode of the second battery string B, a third positive electrode and a third negative electrode of the third battery string C, and a fourth positive electrode and a fourth negative electrode of the fourth battery string D are both connected with the converting assembly 440 by the conductive sheets 421. So that the converting assembly 440 can control the connection states of the strings of battery cells to change the output voltage of the battery pack 400. In this embodiment, the first battery string A is horizontally disposed. The second battery string B is disposed above the first battery string A. The third battery string C is disposed above the second battery string B. And the fourth battery string D is disposed above the third battery string C.

As shown in FIG. 62 and FIG. 63, the first battery string A, the second battery string B, the third battery string C, and the fourth battery string D are each formed by a plurality of battery cells in series and/or in parallel. The four strings of battery cells have equal rated output voltages. Assuming that the rated output voltage of each battery string is 'n' V, then the rated output voltage u1 of the first battery string A=the rated output voltage u2 of the second battery string B=the rated output voltage u3 of the third battery string C=the rated output voltage u4 of the fourth battery string D='n' V. The circuit board 430 below the converting assembly 440 and above the battery strings 420 is used for connecting the converting assembly 440 and the battery strings 420. And the positive terminal 416 and the negative terminal 417 are welded and fixed on the circuit board 430.

As shown in FIG. 62 to FIG. 68, the converting assembly 440 has a first state, a second state, and a third state. When the converting assembly 440 is in the first state, the battery pack 400 outputs a first operating voltage. When the converting assembly 440 is in the second state, the battery pack 400 outputs a second operating voltage. And when the converting assembly 440 is in the third state the battery pack 400 outputs a third operating voltage. In this embodiment, the converting assembly 440 includes a gear trigger 441, a switch part 442 fixedly connected with the gear trigger 441, and a triggering part 443 connected to the battery strings 420. The gear trigger is rotably disposed. When the gear trigger 441 is in the first position, the switch part 442 triggers the corresponding triggering part 443. Then the first battery string A, the second battery string B, the third battery string C, and the fourth battery string D are connected in parallel, and the battery pack 400 outputs a first operating voltage. When the gear trigger 441 is rotated to the second position, the switch part 442 synchronously rotates and triggers the corresponding triggering part 443. Then the first battery string A, the second battery string B, the third battery string C, and the fourth battery string D are connected in series and parallel (in series-parallel or in parallel-series), and the battery pack 400 outputs a second operating voltage. When the gear trigger 441 rotates to the third position, the switch part 442 synchronously rotates, and triggers the corresponding triggering part 443. Then the first battery string A, the second battery string B, the third battery string C, and the fourth battery string D are connected in series, and the battery pack 400 outputs a third operating voltage. The first operating voltage is less than the second operating voltage, and the second operating voltage is less than the third operating voltage.

As shown in FIG. 64 to FIG. 68, the gear trigger 441 is provided with racks 4411. The switch part 442 is coaxially disposed with the gear trigger 441 by its fixed axis. When the gear trigger 441 rotates, the switch part 442 can be synchronously driven to rotate. The triggering part 443 is disposed on the peripheral of the switch part 442. The switch part 442 is provided with grooves 4421. The triggering part 443 has a closed position and an open position. When the triggering part 443 is in the closed position, one end of the triggering part 443 protrudes into the groove 4421. And when the triggering part 443 is in the open position, one end of the triggering part 443 is disengaged from the groove 4421.

As shown in FIG. 64 to FIG. 68, the switch part 442 includes at least a first switch X, a second switch Y, and a third switch Z which are arranged up and down. Grooves 4421 are formed in each of the first switch X, the second switch Y and the third switch Z. Three grooves 4421 are correspondingly formed in the same positions in each of the first switch X and the third switch Z. Four grooves 4421 are formed in the second switch Y, and divided into two groups to be symmetrically arranged on two sides of the second switch Y. The triggering part 443 includes at least a first triggering part 4431, a second triggering part 4432, and a third triggering part 4433. The first triggering part 4431 includes a first triggering element 44311 corresponding to the first switch X, a second triggering element 44312 corresponding to the second switch Y, and a third triggering element 44313 corresponding to the third switch Z. The second triggering part 4432 includes a fourth triggering element 44321 corresponding to the first switch X, a fifth triggering element 44322 corresponding to the second switch Y, and a sixth triggering element 44323 corresponding to the third switch Z. The third triggering part 4433 includes a seventh triggering element 44331 corresponding to the first switch X, an eighth triggering element 44332 corresponding to the second switch Y, and a ninth triggering element 44333 corresponding to the third switch Z.

As shown in FIG. 62 and FIGS. 64 to FIG. 68, When the gear trigger 441 is in the first position, the first triggering part 4431 and the third triggering assembly 4433 are both in the closed position, and the second trigger assembly 4432 is in the open position, then the first battery string A, the second battery string B, the third battery string C, and the fourth battery string D are connected in parallel. At this time, the first operating voltage output by the battery pack 400 is 'n' V. When the gear trigger 441 is rotated to the second position, the second triggering element 44312, the fourth triggering element 44321, the sixth triggering element 44323 and the eighth triggering element 44332 are both in the closed position, and the first triggering element 44311, the third triggering element 44313, the fifth triggering element 44322, the seventh triggering element 4431, and the ninth triggering element 44333 are both in the open position. Then the first battery string A and the second battery string B are connected in series to form a first battery string, and the third battery string C and the fourth battery string D are connected in series to form a second battery string, then the first battery string and the second battery string are connected in parallel (connected in series-parallel). At which time the second operating voltage output by the battery pack 400 is '2n' V When the gear trigger 441 is rotated to the third position, the second triggering part 4432 is in the closed position. The first triggering part 4431 and the third triggering part 4433 are both in the open position. Then the first battery string A, the second battery string B, the third battery string C, and the fourth battery string D are connected in series. At this time, the third operating voltage output by the battery pack 400 is '4n' V. Certainly, when the gear trigger 441 rotates to the second position, the first battery string A, the second battery string B, the third battery string C, and the fourth battery string D can also be designed and connected in parallel-series according to actual conditions, at which time the second operating voltage output by the battery pack is '2n' V.

As shown in FIG. 64 to FIG. 68, each triggering element includes a static contact sheet 444, a movable contact sheet 445 opposite to the static contact sheet 444, and a switch triggering block 446 connected with the movable contact sheet 445. When the triggering element is in the closed position, the switch triggering block 446 protrudes into the corresponding groove 4421, and the movable contact sheet 445 is electrically connected with the static contact sheet 444. When the triggering element is in the open position, the switch triggering block 446 is disengaged from the corresponding groove 4421, and the movable contact sheet 445 is disconnected from the static contact sheet 444.

As shown in FIG. 64 to FIG. 68, the converting assembly 440 further includes a containing box 4401 used for containing the switch part 442 and the triggering part 443. And one or more containing cavities are formed in the containing box 4401 for containing the switch part 442 and the triggering part 443 respectively. And the static contact sheet 444 is attached to the inner side wall of the containing cavity. Each triggering element further includes a spring 447 that is limited between the movable contact sheet 445 and the inner side wall of the containing cavity. When the triggering element is in the closed position, the spring 447 continues to abut against the movable contact sheet 445 to keep the movable contact sheet 445 being in contact with the static contact sheet 444. Designed as such, the influence of the vibration on the contact stability of the moving contact sheet 445 and the static contact sheet 444 can be reduced.

As shown in FIG. 64 to FIG. 68, the containing cavity includes a first containing cavity 4402 for containing the switch part 442 and a second containing cavity 4403 for containing the triggering part 443. The first containing cavity 4402 is approximately located at the center position of the containing box 4401. The second containing cavity 4403 is provided with three which are combined with the first containing cavity 4402 to form a T shape. The first containing cavity 4402 communicates with the second containing cavity 4403. The static contact sheet 444 is attached to the inner side wall of the second containing cavity 4403. When the triggering element is in the open position, the switch triggering block 446 is completely contained in the second containing cavity 4403. When the triggering element is in the closed position, the protruding part 4461 at one end of the switch triggering block 446 protrudes into the first containing cavity 4402 and cooperates with the groove 4421 in the corresponding position.

As shown in FIG. 64 to FIG. 68, the bottom of the second containing cavity 4403 is provided with a first limiting groove 4404. And the switch triggering block 446 is limited and contained in the first limiting groove 4404. A second limiting groove 4405 is formed in the rear side wall of the second containing cavity 4403. And one end of the spring 447 is limited in the second limiting groove 4405. The rear of the switch triggering block 446 is provided with a clamping groove 4462. The movable contact sheet 445 is perpendicular to the switch triggering block 446 and clamped in the clamping groove 4462. And the spring 447 is also contained in the clamping groove 4462 to push the movable contact sheet 445 and the switch triggering block 446 to move along the first limiting groove 4404 from the open position towards the closed position when the switch assembly 442 rotates synchronously.

Figure 67:
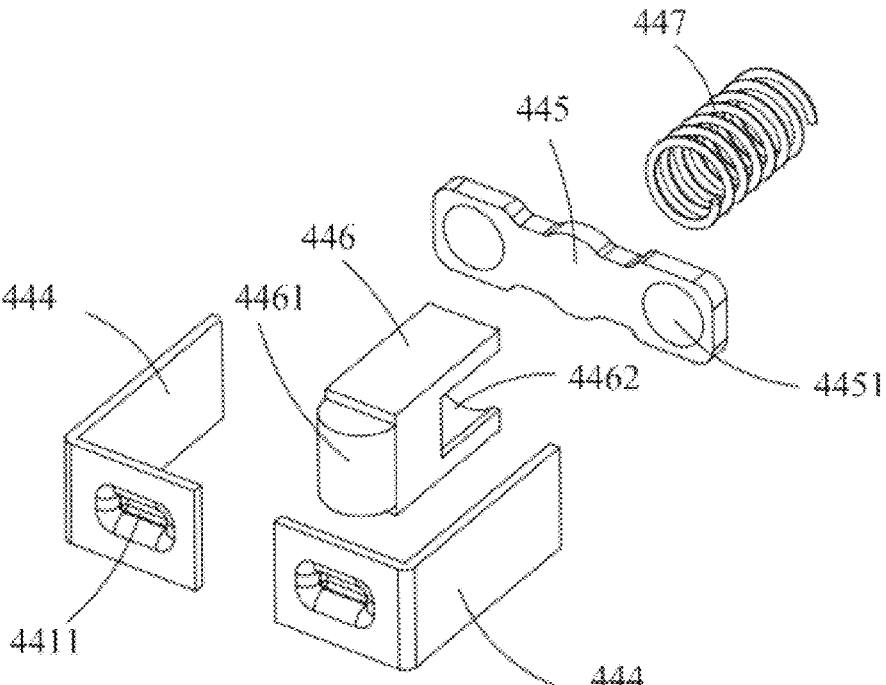
FIG. 67 is an exploded view of a single triggering element of FIG. 65.
Figure 68:
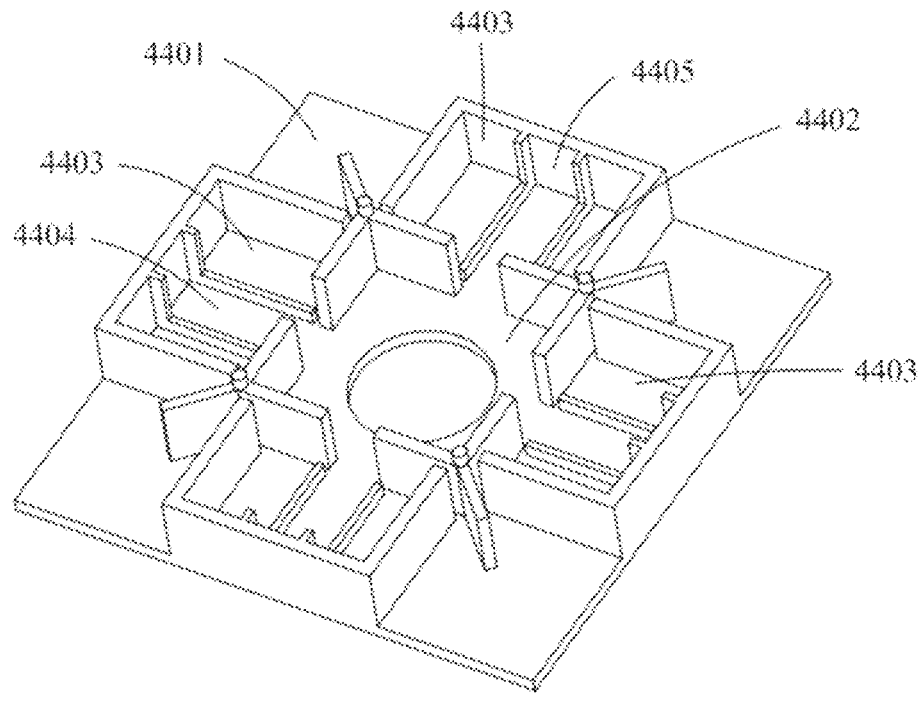
FIG. 68 is a schematic structural view of a containing box of FIG. 65.

As shown in FIG. 67 to FIG. 68, in the embodiment, two ends of the movable contact sheet 445 are each provided with a movable contact point 4451. Two static contact sheets 444 are correspondingly arranged in each second containing cavity 4403. And each static contact sheet 444 is provided with a static contact point 4441. So that the two movable contact points 4451 can be connected or disconnected with the corresponding two static contact points 4441 to close or open of the triggering element.

As shown in FIG. 64 to FIG. 68, the operating principle of the converting assembly 440 may be briefly described as bellow. The groove 4421 on the switch part 442 can be used to contain the protruding part 4461 of the switch triggering block 446. When the groove 4421 moves to the area of the switch triggering block 446, the spring 447 at the rear of the movable contact sheet 445 pushes the movable contact sheet 445 and the switch triggering block 446 automatically, so that the protruding part 4461 of the switch triggering block 446 is pushed out from the second containing cavity 4403 to the first containing cavity 4402, and the movable contact sheet 445 is pushed from the open position to the closed position to connect with the static contact sheet 444. And the non-groove part of the switch part 442 can also push the switch triggering block 446 to move, so that the protruding part 4461 is retracted to the second containing cavity 4403. During movement, the switch triggering block 446 needs to overcome the push force of the spring 447 at the rear of the movable contact sheet 445 to push the movable contact sheet 445 to move from the closed position to the open position. Thereby the movable contact sheet 445 is disconnected with the static contact sheet 444.

As shown in FIG. 62 and FIGS. 69 to FIG. 75, the external coupling element 450 includes a first external coupling element 451, a second external coupling element 452, and a third external coupling element 453. For a more convenient description, defining that a power tool system includes a first power tool, a second power tool, and a third power tool. The first power tool is capable of operating at a first operating voltage, and provided with a first tool interface coupling with a battery interface of the battery pack. Specifically, a first external coupling element 451 is disposed on the first power tool and is a first plug connecting the first power tool with the battery pack 400. The second power tool is capable of operating at a second operating voltage and is provided with a second tool interface coupling with the battery interface of the battery pack. In particular, the second external coupling element 452 is disposed on the second power tool and is a second plug connecting the second power tool with the battery pack 400. The third power tool is capable of operating at the third operating voltage and is provided with a third tool interface coupling with the battery interface of the battery pack. In particular, the third external coupling element 453 is disposed on the third power tool and is a third plug connecting the third power tool with the battery pack 400. The voltage switching principle of the battery pack 400 of the disclosure will be described in detail by taking the three external couplings elements as an example. Defining that each battery string includes 5 battery cells connected in series, and has a voltage of 20 V.

Figure 69:
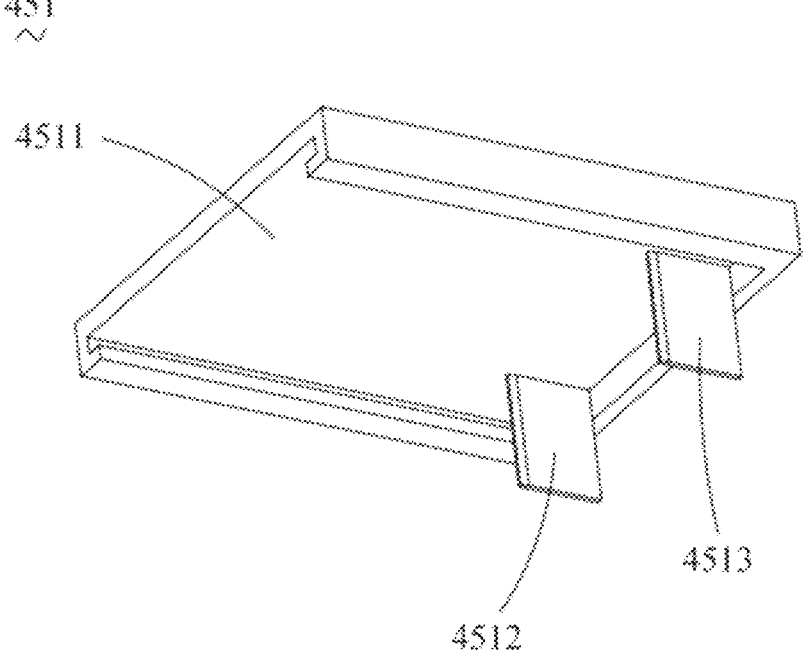
FIG. 69 is a perspective view of a first external coupling element of FIG. 62.

As shown in FIG. 69 and FIG. 62 to FIG. 63, the first external coupling element 451 includes a body part 4511 and a positive inserting sheet 4512 and a negative inserting sheet 4513 which are integrally formed with the body part 4511. After the first external coupling element 451 is inserted, the positive inserting sheet 4512 is inserted into the positive terminal 416, and the negative inserting sheet 4513 is inserted into the negative terminal 417. Such that the battery pack 400 can electrically and mechanically connect with the first external coupling element 451 to transmit of current and voltage.

As shown in FIG. 65 to FIG. 71, after the first external coupling element 451 is inserted from the plug interface 415, the positive inserting sheet 4512 is inserted into the positive terminal 416, and the negative inserting sheet 4513 is inserted into the negative terminal 417. The gear trigger 441 does not rotate, at which time the gear trigger 441 is in the first position (in the initial state). Then the first triggering element 44311 (switch X1), the second triggering element 44312 (switch Y1), the third triggering element 44313 (switch Z1), the seventh triggering element 44331 (the switch X3), the eighth triggering element 44332 (the switch Y3) and the ninth triggering element 44333 (the switch Z3) are all in the closed position. The fourth triggering element 44321 (the switch X2), the fifth triggering element 44322 (the switch Y2) and the sixth triggering element 44323 (the switch Z2) are all in the open position. And the first battery string A, the second battery string B, the third battery string C, and the fourth battery string D are connected in parallel. At this point, the first operating voltage output by the battery pack 400 is equal to the rated output voltage of each battery string, namely U=u1=u2=u3=u4=20V.

As shown in FIG. 62 and FIG. 68, the second external coupling element 452 includes a body part 4521 and a positive inserting sheet 4522 and a negative inserting sheet 4523 which are integrally formed with the body part 4521. After the second external coupling element 452 is inserted, the positive inserting sheet 4522 is inserted into the positive terminal 416, and the negative inserting sheet 4523 is inserted into the negative terminal 417. Such that the battery pack 400 can electrically and mechanically connect with the second external coupling element 452 to transmit current and voltage. Unlike the first external coupling element 451 shown in FIG. 69, the body part 4521 of the second external coupling element 452 is provided with a rack triggering rod 4524 disposed opposite the gear trigger 441. When the second external coupling element 452 is inserted, the rack triggering rod 4524 engages with the gear trigger 441 and drives the gear trigger 441 to rotate in positive direction.

Figures 70, 71:
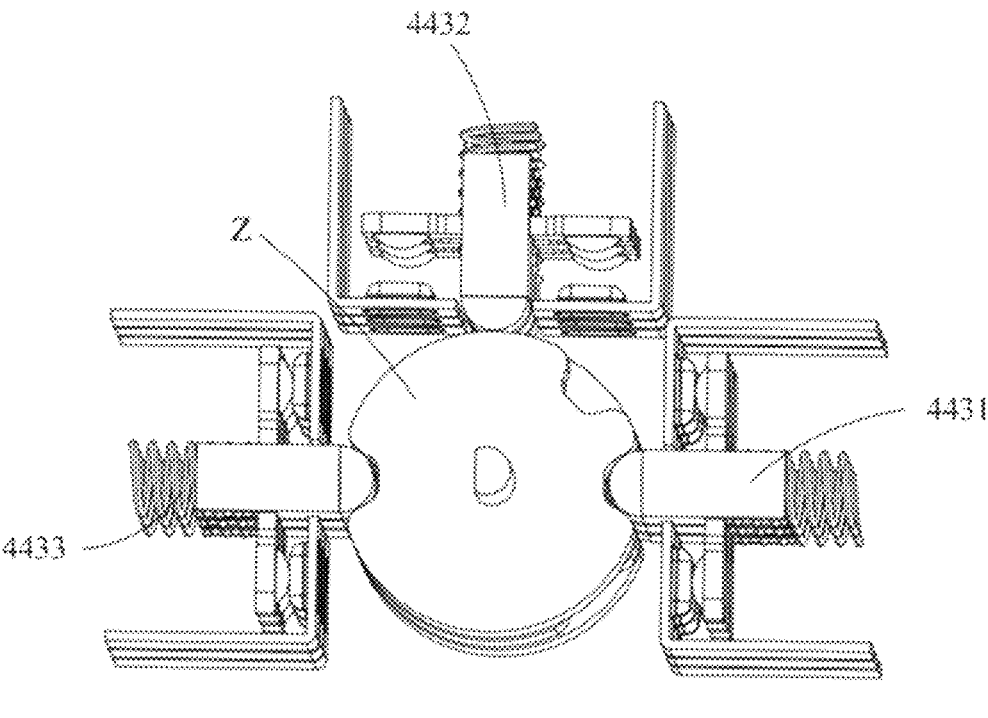
FIG. 70 is a schematic structural diagram of the switch part cooperating with the corresponding triggering assembly after the first external coupling element shown in FIG. 69 is inserted.
FIG. 71 is a connection circuit diagram within the battery pack after the first external coupling element shown in FIG. 69 is inserted.
Figure 72:
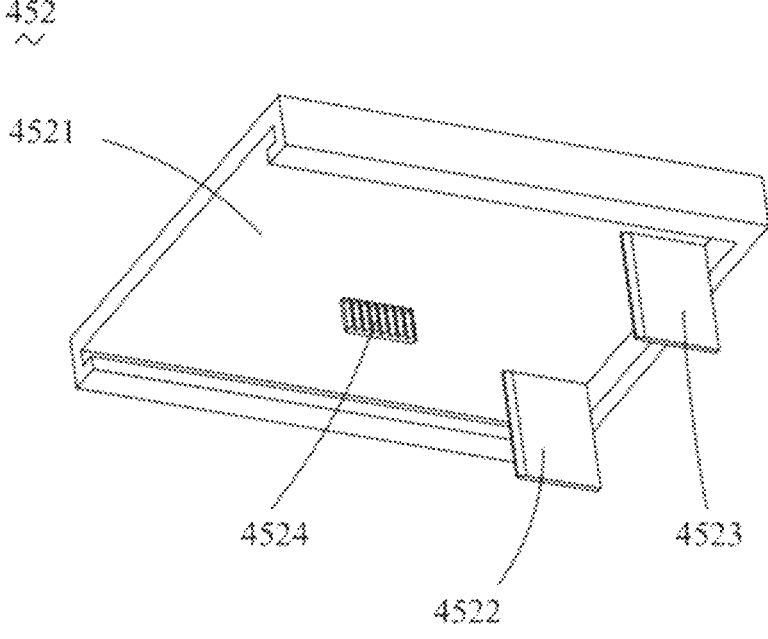
FIG. 72 is a perspective view of a second external coupling element.
Figure 73:
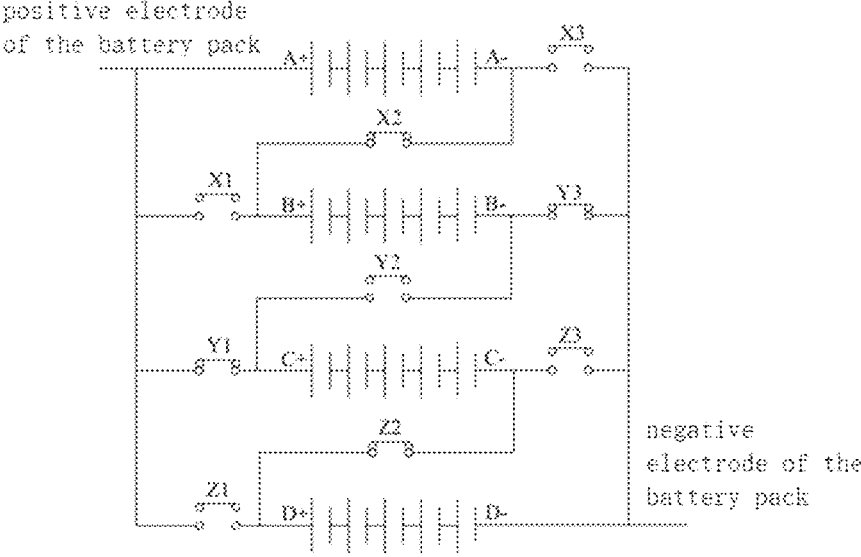
FIG. 73 is a connection circuit diagram within the battery pack after the second external coupling element shown in FIG. 72 is inserted.

As shown in FIG. 73 combined with FIG. 62 and FIG. 70, when the second external coupling element 452 is inserted, the rack triggering rod 4524 enters from the docking groove 414 and engages with the gear trigger 441 to horizontally push the body part 4521 of the second external coupling element452, until the positive inserting sheet 4522 is inserted into the positive terminal 416 and the negative inserting sheet 4523 is inserted into the negative terminal 417. At this time, the gear trigger 441 is pushed by the rack triggering rod 4524 to rotate to the second position, and the second triggering element 44312 (the switch Y1), the fourth triggering element 44321 (switch X2), the sixth triggering element 4423 (switch Z2) and the eighth triggering element 44332 (switch Y3) are all in the closed position. The first triggering element 44311 (the switch X1), the third triggering element 44313 (switch Z1), the fifth triggering element 44322 (switch Y2), the seventh triggering element 44331 (switch X3) and the ninth triggering element 44333 (switch Z3) are all in the open position. Thereby the first battery string A is connected in series with the second battery string B, and the third battery string C is connected in series with the fourth battery string D, and then the first battery string A and the second battery string B are connected in parallel with the third battery string C and the fourth battery string D (connected in series-parallel). At this point, the second operating voltage output by the battery pack 400 is equal to the sum of the rated output voltages of two strings of battery cells, namely U=u1+u2=u3+u4=40 V.

Figure 74:
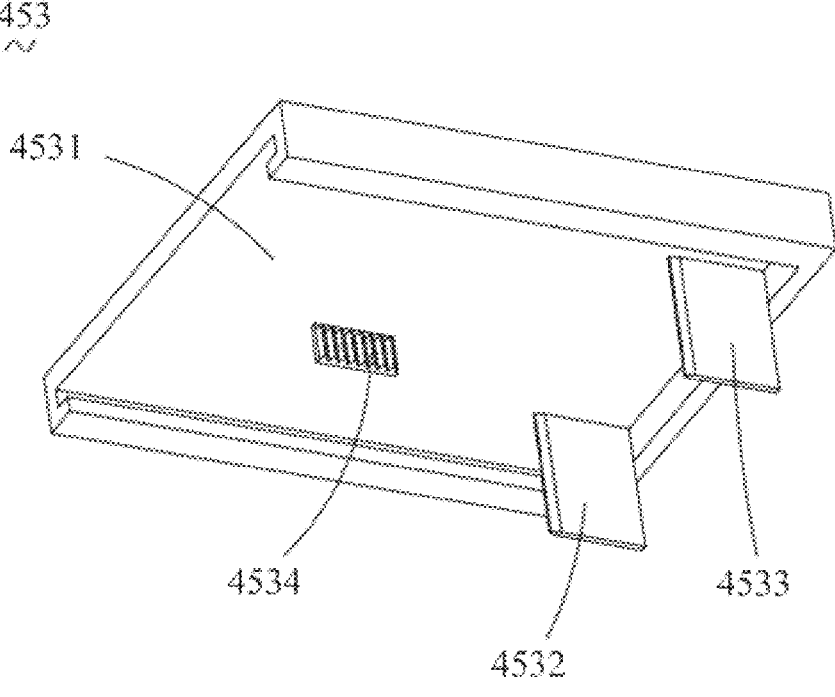
FIG. 74 is a perspective view of a third external coupling element.

As shown in FIG. 74 combined with FIG. 62 and FIG. 68, the third external coupling element 453 includes a body part 4531 and a positive inserting sheet 4532 and a negative inserting sheet 4533 which are integrally formed with the body part 4531. After the third external coupling element 453 is inserted, the positive inserting sheet 4532 is inserted into the positive terminal 416, and the negative inserting sheet 4533 is inserted into the negative terminal 417. Such that the battery pack 400 can electrically and mechanically connect with the third external coupling element 453 to transmit current and voltage. Unlike the second external coupling element 452 shown in FIG. 72, the third external coupling element 453 is also provided with a rack triggering rod 4534 to drive the gear trigger 441 to rotate in a positive direction. however, the distance between the rack triggering rod 4534 and the plug interface 415 (or the distance between the rack triggering rod 4534 and the positive or negative inserting sheets 4532, 4533) is greater than the distance between the rack triggering rod 4524 and the plug interface 415 (or the distance between the rack triggering rod 4524 and the positive or negative inserting sheets 4522, 4523). Such that the stroke of the gear trigger 441 rotated by the rack triggering rod 4534 is greater than the stroke of the gear trigger 441 rotated by the drive of the rack triggering rod 4524.

Figure 75:
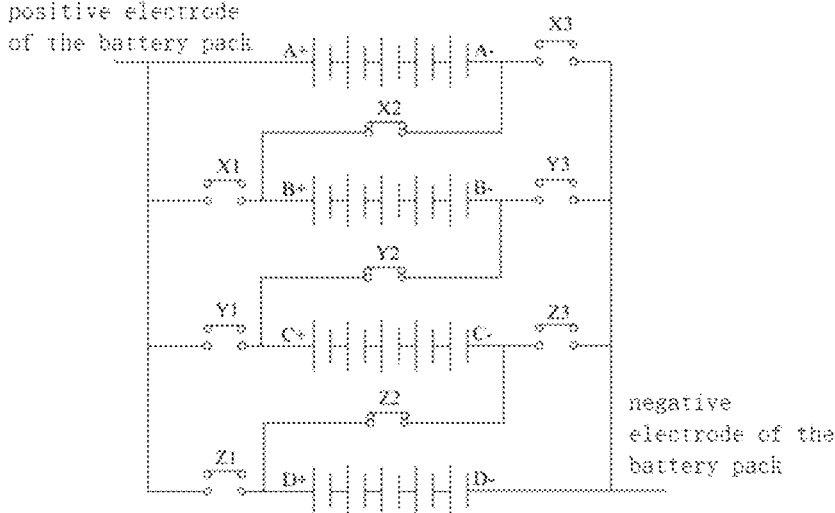
FIG. 75 is a connection circuit diagram within the battery pack after the third external coupling element shown in FIG. 74 is inserted.

As shown in FIG. 75 combined with FIG. 62 to FIG. 70, when the third external coupling element 453 is inserted, the rack triggering rod 4534 enters the gear trigger 441 and engages with the gear trigger 441 to horizontally push the body part 4531 of the third external coupling element 453, until the positive inserting sheet 4532 is inserted into the positive terminal 416 and the negative inserting sheet 4533 is inserted into the negative terminal 417. At this time the gear trigger 441 is pushed by the rack triggering rod 4534 to rotate to the third position. Then the first triggering element 44311 (the switch X1), the second triggering element 44312 (switch Y1), the third triggering element 44313 (switch Z1), the third triggering element 44313 (switch Z1), the seventh triggering element 44331 (the switch X3), the eighth triggering element 44332 (the switch Y3), and the ninth triggering element 44333 (the switch Z3) are all in the open position. And the fourth triggering element 44321 (the switch X2), the fifth triggering element 44322 (the switch Y2), and the sixth triggering element 44323 (the switch Z2) are all in the closed position. The first battery string A, the second battery string B, the third battery string C, and the fourth battery string D are connected in series with each other. At this point, the third operating voltage output by the battery pack 400 is equal to the sum of the rated output voltages of the four strings of battery cells, namely U=u1+u2+u3+u4=80 V.

As shown in FIG. 69 to FIG. 75, after the second external coupling element 452 is inserted, the gear trigger 441 rotates a the first angle under the drive of the rack triggering rod 4524 until the gear trigger 441 is in the second position. And after the third external coupling element 453 is inserted, the gear trigger 441 rotates a second angle under the drive of the rack triggering rod 4534 until the gear trigger 441 is in the third position. The first angle is smaller than the second angle. Preferably, the first angle is 45° and the second angle is 90°, but that should not be limited thereto. The angles may be adjusted to other angles depending on the actual situation.

As shown in FIG. 69 to FIG. 75, after a different external coupling element 450 is used, the battery pack 400 can output different voltages to satisfy the voltage requirements of the three different power tools and switch quickly and conveniently between the three voltages. Certainly, after finishing the transmission of power, the first external coupling element 451, the second external coupling element 452, or the third external coupling element 453 can be directly pulled out. At this time, the gear trigger 441 can rotate reversely under the drive of the rack triggering rod 4524 or the rack triggering rod 4534 until reaching the first position, namely the initial state. Ready for the next insertion thereby.

Figure 76:
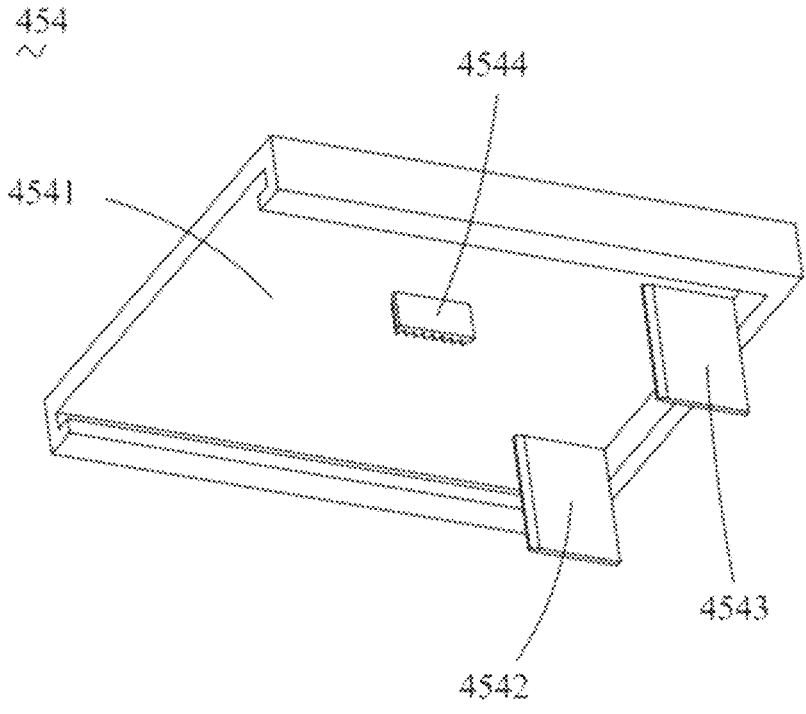
FIG. 76 is a perspective view of a fourth external coupling element.

As shown in FIG. 76 combined with FIG. 62 to FIG. 70, the battery pack 400 also has a transportation state that is implemented by the fourth external coupling element 454. The fourth external coupling element 454 also includes a body part 4541 and a positive inserting sheet 4542 and a negative inserting sheet 4543 which are integrally formed with the body part 4541. After the fourth external coupling element 454 is inserted, the positive inserting sheet 4542 is inserted into the positive terminal 416 and the negative inserting sheet 4543 is inserted into the negative terminal 417. Such that the battery pack 400 can electrically and mechanically connect with the fourth external coupling element 454. Unlike the third external coupling element 453 shown in FIG. 74, the fourth external coupling element 454 is also provided with a rack triggering rod 4544, but the position of the rack triggering rod 4544 is opposite to the position of the rack triggering rod 4534. In other words, with respect to the same body part, the rack triggering rod 4544 is located at the right half side of the body part and the racks on the rack triggering rod 4544 faces the left direction. And the rack triggering rod 4534 is located at the left half side of the body part and the racks on the rack triggering rod 4534 face the right direction. Thereby the rack triggering rod 4544 can drive the gear trigger 441 to rotate forward, and the rack triggering rod 4544 can drives the gear trigger 441 to rotate reversely.

Figure 77:
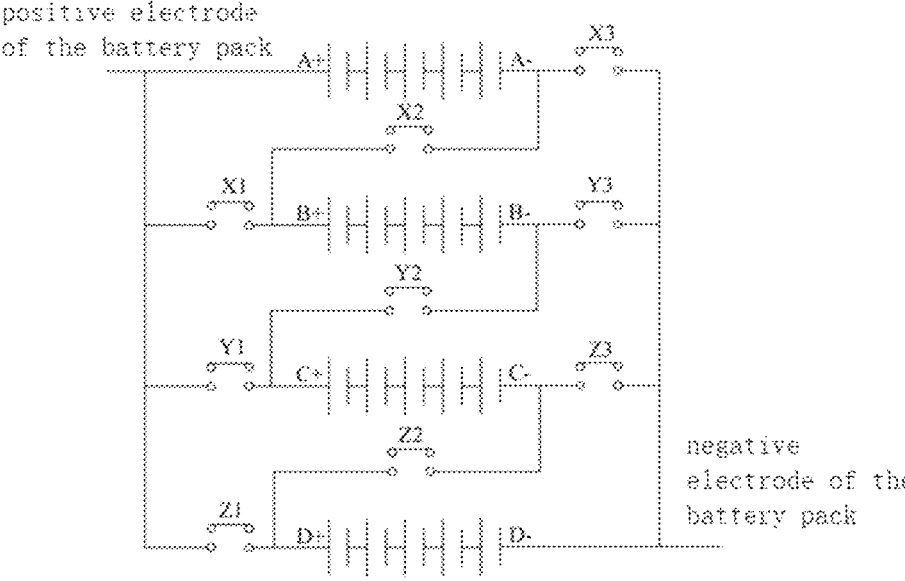
FIG. 77 is a connection circuit diagram within the battery pack after the fourth external coupling element shown in FIG. 76 is inserted.

As shown in FIG. 76 to FIG. 77 combined with FIG. 62 to FIG. 70, when the fourth external coupling element 454 is inserted, the rack triggering rod 4544 enters the gear trigger 441 from the other docking groove 414 at the top of the upper housing 441 and engages with the gear trigger 441 to horizontally push the body part 4541 of the fourth external coupling element 454, until the positive inserting sheet 4542 is inserted into the positive terminal 416 and the negative inserting sheet 4543 is inserted into the negative terminal 417. Then the gear rotates reversely to a fourth state under the drive of the rack triggering rod 4544. The first triggering element 44311 (the switch X1), the second triggering element 44312 (switch Y1), the third triggering element 44313 (switch Z1), the fourth triggering element 44321 (switch X2), the fifth triggering element 44322 (switch Y2), the sixth triggering element 44323 (switch Z2), the seventh triggering element 44331 (switch X3), the eighth triggering element 44332 (switch Y3), and the ninth triggering element 44333 (switch Z3) are all in the open position. And the first battery string A, the second battery string B, the third battery string C, and the fourth battery string D are all disconnected, at which time the battery pack 400 is free of output voltage.

Figure 65:
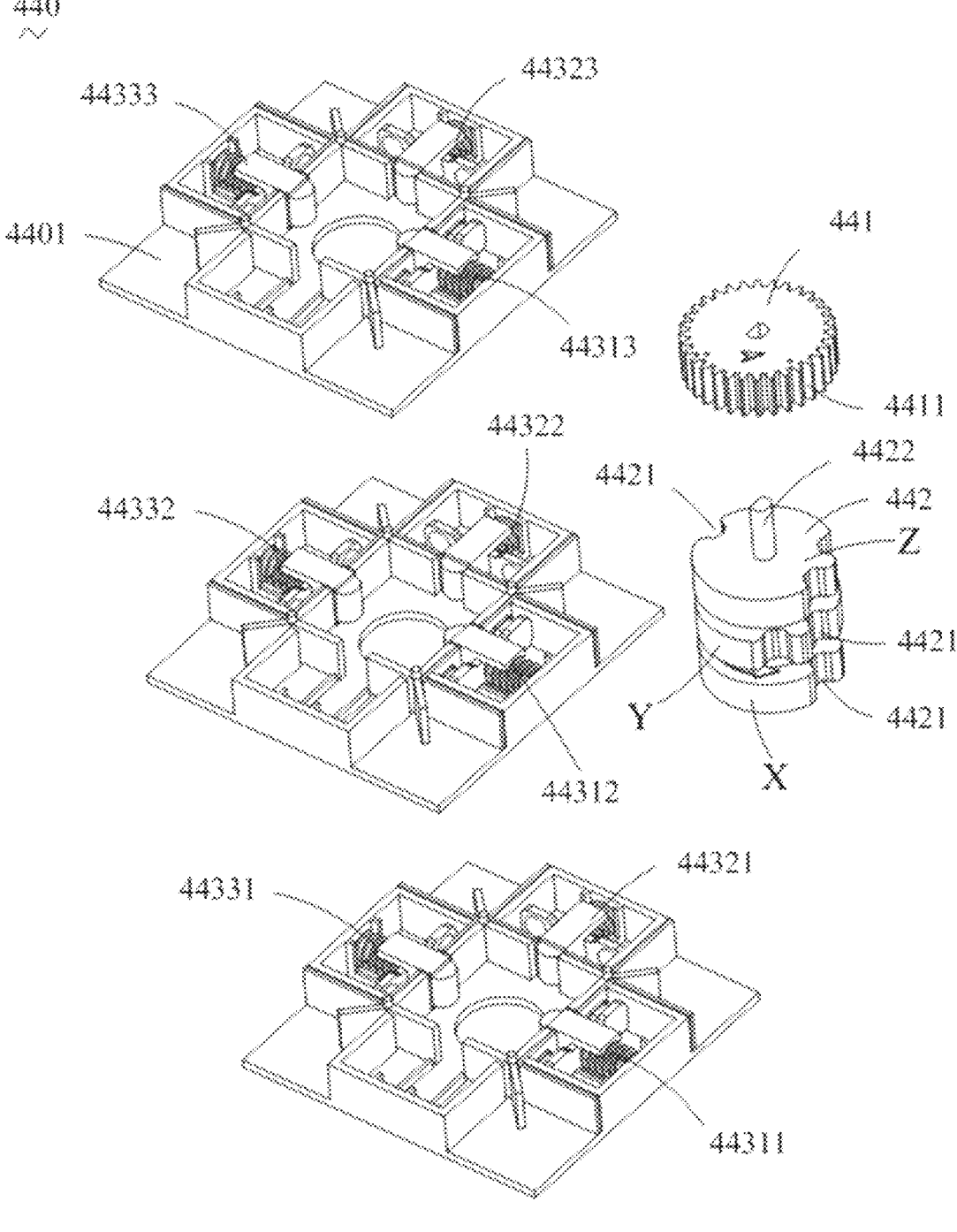
FIG. 65 is a partially exploded view of the converting assembly shown in FIG. 64.
Figure 66:
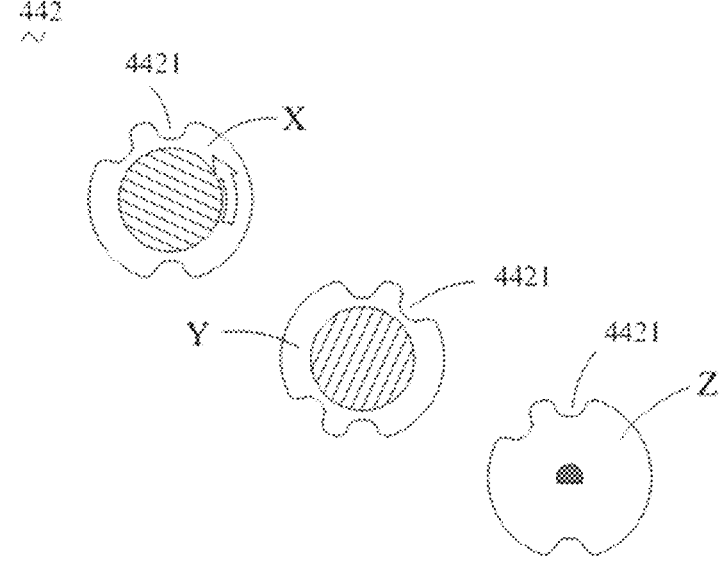
FIG. 66 is a cross-sectional exploded view of the switch part of FIG. 65.

As shown in FIG. 77 combined with FIG. 65 and FIG. 70, due to the insertion of the fourth external coupling element 454, the entire battery pack 400 is free of output voltage. Thereby in a protected state, the battery pack 400 may be transported over a long distance or implement other operation of no power. That will protect the battery pack 400 and the operator. In this state, the reverse rotation angle of the gear trigger 441 is preferably 22.5°, but should not be limited thereto.

As shown in FIG. 61 to FIG. 77, the battery pack 400 of the disclosure may also be applied to a charging system (not shown) that includes the battery pack 400 and a charger that charges the battery pack 400. A charging interface is provided on the charger to connecting with the battery interface of the battery pack 400. When the charger charges the battery pack 400, the gear trigger 441 is in the first position. At this time, the first battery string A, the second battery string B, the third battery string C, and the fourth battery string D are connected in parallel. And the charging voltage output by the charger is equal to the rated output voltage of a single battery string, and is a low voltage. That can protect the battery pack 400 from the impact of high current and high voltage.

As shown in FIG. 61 to FIG. 77, the connected or disconnected state of the switch assembly 442 of the battery pack 400 of the present embodiment can be changed by rotating the gear trigger 441 to different positions (or different states). Such that the corresponding triggering assembly 443 is triggered to change the series connection state and parallel connection state of each battery string in the battery pack 400. And then the output voltage of the battery pack 400 can be changed (at least three voltages can be output), and adaptability of the power tool system with the battery pack 400 can be improved.

Figure 78:
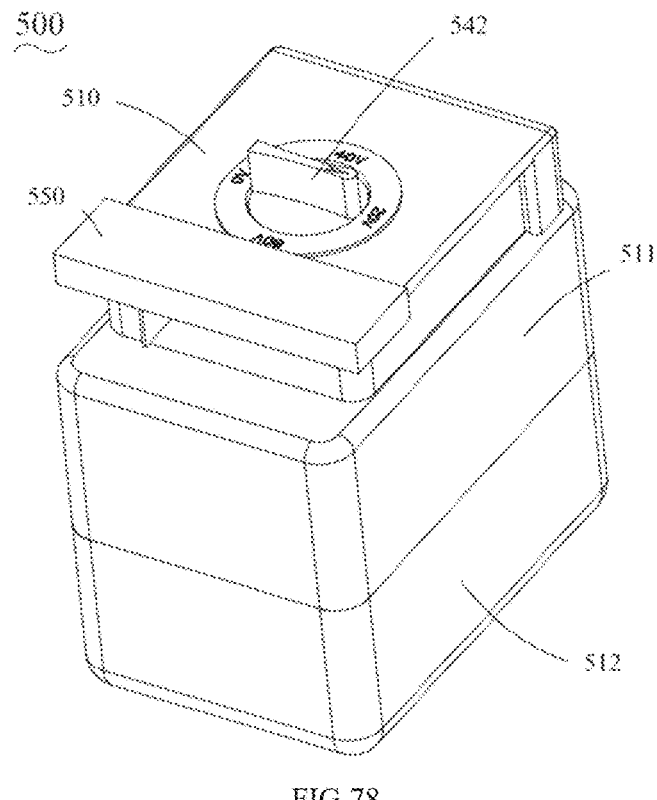
FIG. 78 is a fourth perspective view of a power tool system of the disclosure.
Figure 79:
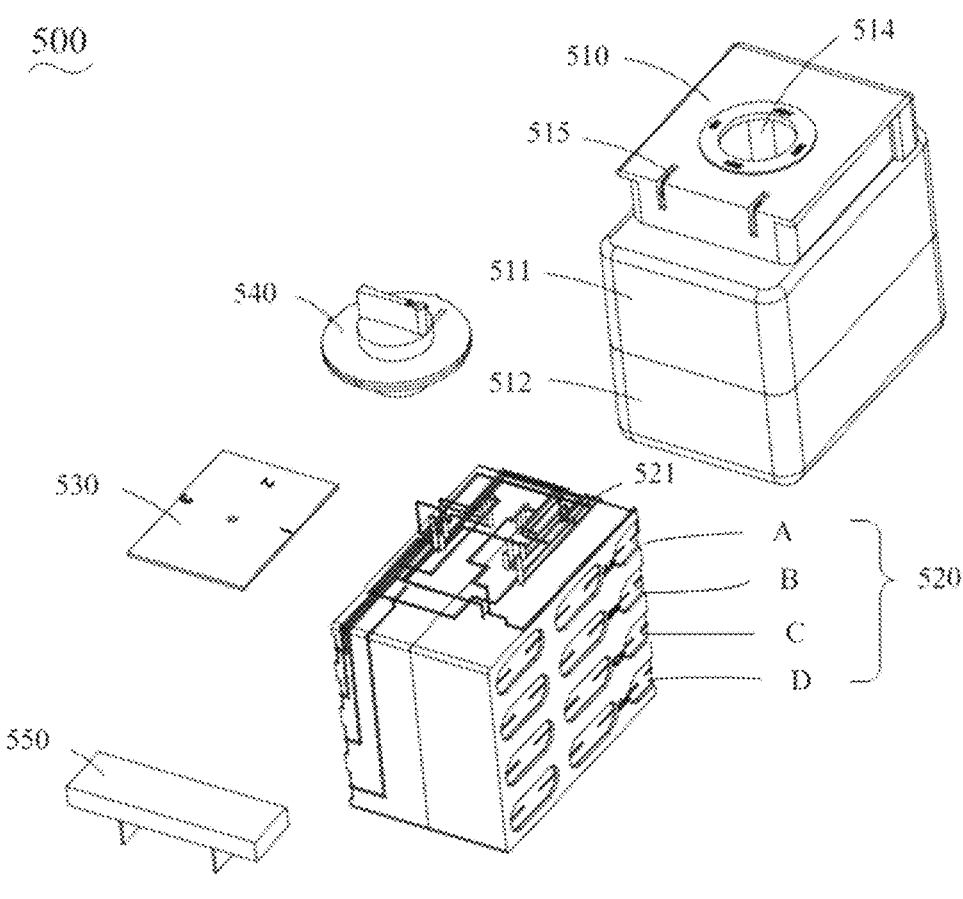
FIG. 79 is an exploded view of the power tool system shown in FIG. 78.

As shown in FIGS. 78 and 79, the disclosure provides a battery pack 500 that includes a housing 510, battery strings 520 housed within the housing 510, a circuit board 530, and a converting assembly 540 electrically connected to the battery strings 520. The battery strings 520 include a plurality of strings of battery cells, and the converting assembly 540 is electrically connected to each battery string. The battery pack 500 of the disclosure is applied to a power tool system that further includes an external coupling element 550 that can be inserted into the battery pack 500 to connect with the battery pack 500.

Figures 80, 81:
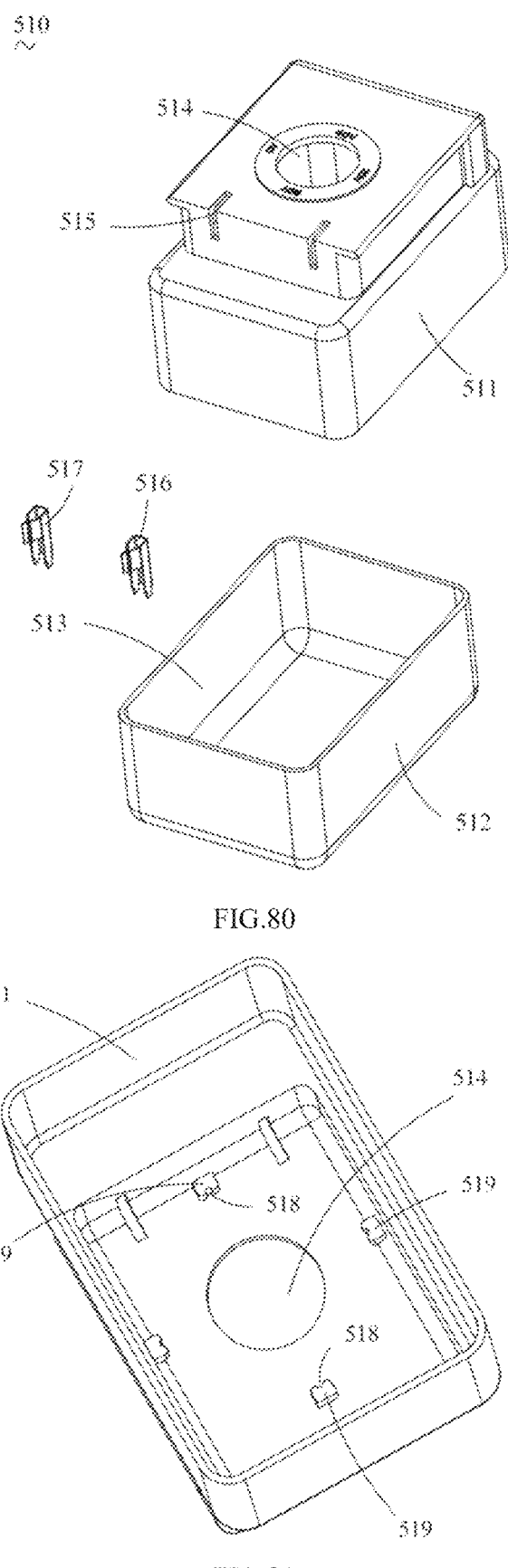
FIG. 80 is an exploded view of a housing assembly of FIG. 79.
FIG. 81 is a perspective view of the upper housing of FIG. 80 from another angle.

As shown in FIG. 79 to FIG. 81, the housing 510 is provided with a battery interface for use with a power tool. And the battery interface is provided with an output terminal groove for containing the output terminal. Specifically, the housing 510 includes an upper housing 511 and a lower housing 512. And the battery strings 520, the circuit board 530, and the converting assembly 540 are disposed within the containing space 513 enclosed by the upper housing 511 and the lower housing 512. The top of the upper housing 511 is provided with a through hole 514. Two plug interfaces 515 are provided on the side wall of the upper housing 511. And the two plug interfaces are provided with a positive terminal 516 and a negative terminal 517 which are electrically connected to the battery strings 520. The positive terminal 516 is connected to the positive electrode of the battery strings 520 to connect with the external coupling element 550 as a total positive output terminal, and the negative terminal 517 is connected to the negative electrode of the battery strings 520 to connect with the external coupling element 550 as a total negative output terminal. So that the battery pack 500 can output voltage.

As shown in FIG. 79, the battery strings 520 include at least a first battery string A, a second battery string B, a third battery string C, and a fourth battery string D. And the positive electrode and the negative electrode of the first battery string A, the positive electrode and the negative electrode of the third battery string B, the positive electrode and the negative electrode of the fourth battery string D are connected with the converting assembly 540 by the conductive sheets 521. So that the connection state among the strings of battery cells can be controlled by the converting assembly 540, and the output voltage of the battery pack 500 would be changed.

As shown in FIG. 79 to FIG. 80, the first battery string A, the second battery string B, the third battery string C, and the fourth battery string D are each formed by a plurality of battery cells in series and/or in parallel. The four strings of battery cells have equal rated output voltages. Assuming that the rated output voltage of each battery string is 'n' V, then the rated output voltage u1 of the first battery string A=the rated output voltage u2 of the second battery string B=the rated output voltage u3 of the third battery string C=the rated output voltage u4 of the fourth battery string D='n' V. The circuit board 530 is below the converting assembly 540 and above the battery strings 520, which is used for connecting the converting assembly 540 and the battery strings 520. And the positive terminal 516 and the negative terminal 517 are welded and fixed on the circuit board 530.

As shown in FIG. 79 and FIG. 82 to FIG. 86, the converting assembly 540 has a first state, a second state, and a third state. When the converting assembly 540 is in the first state, the battery pack 500 outputs a first operating voltage. When the converting assembly 540 is in the second state, the battery pack 500 outputs a second operating voltage. And when the converting assembly 540 is in the third state, the battery pack 500 outputs a third operating voltage. In the present embodiment, the converting assembly 540 is rotably arranged and has at least three target areas. When the converting assembly 540 is rotated to the first target area a (the first position), the first battery string A, the second battery string B, the third battery string C, and the fourth battery string D are connected in parallel, and the battery pack 500 outputs a first operating voltage. When the converting assembly 540 rotates to the second target area b (the second position), the first battery string A, the second battery string B, the third battery string C, and the fourth battery string D are connected in series and parallel (connected in series-parallel or in parallel-series), and the battery pack 500 outputs a second operating voltage. When the converting assembly 540 is rotated to the third target area c (the third position), the first battery string A, the second battery string B, the third battery string C, and the fourth battery string D are connected in series, and the battery pack 500 outputs a third operating voltage. The first operating voltage is less than the second operating voltage, and the second operating voltage is less than the third operating voltage.

As shown in FIG. 79 and FIG. 82 to FIG. 86, the converting assembly 540 includes a fixing assembly 541 and a rotating assembly 542 rotatable with respect to the fixing assembly 541. And connecting elements are formed on the fixing assembly 541 and electrically connected with the battery strings 520. The connecting element includes a first connecting element543 located at the first target area a, a second connecting element 544 located at the second target area B, and a third connecting element 545 located at the third target area c. A triggering element 5420 is formed on the rotating assembly 542. When the rotating assembly 542 is rotated to the first target area a, the triggering element 5420 is electrically connected with the first connecting element 543. When the rotating assembly 542 is rotated to the second target area b, the triggering element 5420 is electrically connected to the second connecting element 544. And when the rotating assembly 542 is rotated to the third target area c, the triggering element 5420 is electrically connected to the third connecting element 545. In this embodiment, one end of each of the first connecting element 543, the second connecting element 544 and the third connecting element 545 is formed on the conductive sheet 521, and the other end of each of the first connecting element 543, the second connecting element 544 and the third connecting element 545 is inserted and fixed on the fixing assembly 541.

As shown in FIG. 79 and FIG. 82 to FIG. 86, the fixing assembly 541 includes a first fixing part 5411 and a second fixing part 5412 which are in a disk shape, and a connecting part 5413 which connects the first fixing part 5411 and the second fixing part 5412. The diameter of the first fixing part 5411 is smaller than the diameter of the second fixing part 5412. The first fixing part 5411 is embedded in the circuit board 530 to fixedly connect the fixing assembly 541 and the circuit board 530. The connecting part 5413 is disposed perpendicular to the circuit board 530 such that there is a space between the second fixing part 5412 and the circuit board 530. The central position of the second fixing part 5412 is provided with a hole 5414. The first target area a, the second target area b, and the third target area c are distributed on the second fixing part 5412 of the fixing assembly 541, and are each provided with a plurality of through holes 5415. The through holes 5415 are disposed through the second fixing part 5412 for the corresponding first connecting part 543, the second connecting part 544, and the third connecting part 545 to pass through and expose to the upper surface of the second fixing part 5412.

As shown in FIG. 79 and FIG. 82 to FIG. 86, the triggering part 5420 on the rotating assembly 542 is arranged in a rectangular strip shape and is provided with four which are arranged in parallel and spaced apart from each other to electrical connect with the first connecting part 543, the second connecting part 544, or the third connecting part 545 on the second fixing part 5412. Such that the triggering part 5420 can be electrically connected with the battery strings 520.

As shown in FIG. 79 to FIG. 80 and FIG. 82 to FIG. 89, each of the first connecting part 543, the second connecting part 544 and the third connecting part 545 includes a first positive convex column A+ connected to the first positive electrode of the first battery string A, a first negative convex column A– connected to the first negative electrode of the first battery string A, a second positive convex column B+ connected to the second positive electrode of the second battery string B, a second negative convex column B– connected to the second negative electrode of the second battery string B, a third positive convex column C+ connected to the third positive electrode of the third battery string C, a third negative convex column C– connected to the third negative electrode of the third battery string C, a fourth positive convex column D+ connected to the fourth positive electrode of the fourth battery string D, and a fourth negative convex column D– connected to the fourth negative electrode of the fourth battery string D. Wherein the first positive convex column A+ is electrically connected with the positive terminal 516, and the fourth negative convex column D– is electrically connected with the negative terminal 517.

As shown in FIG. 82 to FIG. 86, the first positive convex column A+, the second positive convex column B+, the third positive convex column C+, and the fourth positive convex column D+ are arranged in the first column within the first target area a. The first negative convex column A–, the second negative convex column B–, the third negative convex column C–, and the fourth negative convex column D– are arranged in the second column within the first target area a. And the first column and the second column are parallel to each other and are arranged at intervals. When the rotating assembly 542 rotates to the first target area a, the two triggering part 5420 are in electrical contact with the first column and the second column respectively. Such that each positive convex column in the first column is connected with each other, and each negative convex column in the second column is connected with each other. At the moment, the first battery string A, the second battery string B, the third battery string C and the fourth battery string D are connected in parallel, and the first operating voltage output by the battery pack 500 is 'n' V.

As shown in FIG. 79 and FIG. 82 to FIG. 86, the third negative convex column C– and the fourth positive convex column D+ are arranged in the first column within the second target area b. The first negative convex column A– and the second positive convex column B+ are arranged in the second column within the second target area b. The second negative convex column B– and the fourth negative convex column D– are arranged in the third column within the second target area b. And the third positive convex column C+ and the first positive convex column A+ are arranged in the fourth column within the second target area b. The first column, second column, the third column, and the fourth column are in parallel with each other and are arranged at intervals. When the rotating assembly 542 is rotated to the second target area b, the four triggering parts 5420 are electrically connected to the first column, second column, the third column and the fourth column respectively. Such that each convex column in the first column is connected with each other, each convex column in the second column is connected with each other, each convex column in the third column is connected with each other, and each convex column in the fourth column is connected with each other. At this time the first battery string A and the second battery string B are connected in series to form a first battery string. The third battery string C and the fourth battery string D are connected in series to form a second battery string. Then the first battery string and the second battery string are connected in parallel (connected in series-parallel), and the second operating voltage output by the battery pack 500 is '2n' V.

As shown in FIG. 79 and FIG. 82 to FIG. 86, the second negative convex column B– and the third positive convex column C+ are arranged in the first column within third target area c. The first negative convex column A- and the second positive convex column B+ are arranged in the second column within third target area c. And the third negative convex column C– and the fourth positive convex column D+ are arranged in the third column within third target area c. The first column, the second column and the third column are in parallel with each other and are arranged at intervals. When the rotating assembly 542 is rotated to the third target area c, the three triggering part 5420 are in electrical contact with the first column, the second column and the third column respectively. Such that each convex column in the first column is connected with each other, each convex column in the second column is connected with each other, and each convex column in the third column is connected with each other. At the moment, the first battery string A, the second battery string B, the third battery string C and the fourth battery string D are connected in series, and the third operating voltage output by the battery pack 500 is '4n' V.

As shown in FIG. 82 to FIG. 86, when the rotating assembly 542 is rotated to the second target area b, the first battery string A, the second battery string B, the third battery string C, and the fourth battery string D may also be designed to connect with each other in parallel-series according to actual conditions, at which time the battery pack 500 can also output the second operating voltage '2n' V.

As shown in FIG. 82 to FIG. 86, the second fixing part 5412 is further provided with a fourth target area d which is a part of the second fixing part 5412 without providing any convex column to be electrically connected with the battery strings 520. Therefore, when the rotating assembly 542 rotates to the fourth target area d, the battery pack 500 is free of output voltage. Then, in a protected state, the battery pack 500 may be transported over a long distance or implement other operations without power. That would protect the battery pack 500 and the operator.

As shown in FIG. 82 to FIG. 86, the rotating assembly 542 includes a rotating body 5421 and a rotating part 5422 formed on the rotating body 5421. The triggering part 5420 is embedded in the rotating body 5421 and is exposed on the side surface facing the fixing assembly 541 of the rotating body 5421. Such that when rotating, the triggering part 5420 can be in electrical contact with the corresponding first connecting part 543, the second connecting part 544, or the third connecting part 545. A limiting rod 5423 is formed at the bottom of the rotating body 5421 for passing through the holes 5414 of the second fixing part 5412. Thereby rotating assembly 542 can be connected with the fixing assembly 541 and the rotating assembly 542 can rotate flexibly when the rotating part 5422 is pulled and rotated.

As shown in FIG. 81 to FIG. 86, the periphery of the rotating body 5421 is provided with a protrusion 5424. And receiving grooves 518 are correspondingly formed on the inner side wall of the upper housing 511 and are provided with at least three which are corresponding to the first target area a, the second target area b, and the third target area c respectively. Therefore, when the rotating assembly 542 rotates to switch among the first target area a, the second target area b, and the third target area c, the protrusion 5424 is limited and housed in the containing groove 518 of the corresponding target area. In the embodiment, the protrusion 5424 is provided with four and uniformly distributed on the circumferential periphery of the rotating body 5421. And four protrusions 519 are correspondingly arranged on the inner side wall of the upper housing 511. Each protrusion 519 is provided with a containing groove 518. When the rotating assembly 542 rotates to switch among the first target area a, the second target area b, the third target area c, and the fourth target area d, the rotating assembly 542 can be fixed by mutual limitation of the four protrusions 5424 and the four containing grooves 518, and the structural stability of the rotating assembly 542 is enhanced. In other embodiments, the protrusions 5424 may be provided with one, two, or three, and the containing grooves 518 are provided with three or four, so long as the rotating assembly 542 can be fixed, and that should not be limited thereto.

As shown in FIG. 81 to FIG. 86, the rotating part 5422 protrudes outwardly from the surface of one side of the rotating body 5421 facing away from the fixing assembly 541. When pulling the rotating part 5422, the rotating body 5421 and the triggering part 5420 can be driven to rotate synchronously. In this embodiment, the rotating part 5422 protrudes from the through hole 514 at the top of the upper housing 511. When pulling the rotating part 5422, the rotating body 5421 and the triggering part 5420 can be driven to rotate synchronously to switch among the first target area a, the second target area b, the third target area c, and the fourth target area d.

As shown in FIG. 79, the external coupling element 550 includes a first external coupling element, a second external coupling element, and a third external coupling element. For a more convenient description, defining that a power tool system includes a first power tool, a second power tool, and a third power tool. The first power tool is capable of operating at a first operating voltage, and has a first tool interface that includes a first plug disposed on the first power tool. For instance, the first plug is the first external coupling element. The second power tool is capable of operating at a second operating voltage, and has a second tool interface that includes a second plug disposed on the second power tool. For instance, the second plug is the second external coupling element. The third power tool is capable of operating at a third operating voltage, and has a third tool interface that includes a third plug disposed on the third power tool. For instance, the third plug is the third external coupling element. Each plug is provided with a triggering device for use with the converting assembly, so that the converting assembly can be switched between different states. The voltage switching principle of the battery pack 500 of the disclosure will be described in detail below by taking the three external coupling elements as an example. Defining that each battery string includes 5 battery cells that are connected in series with has a voltage of 20 V.

Figure 82:
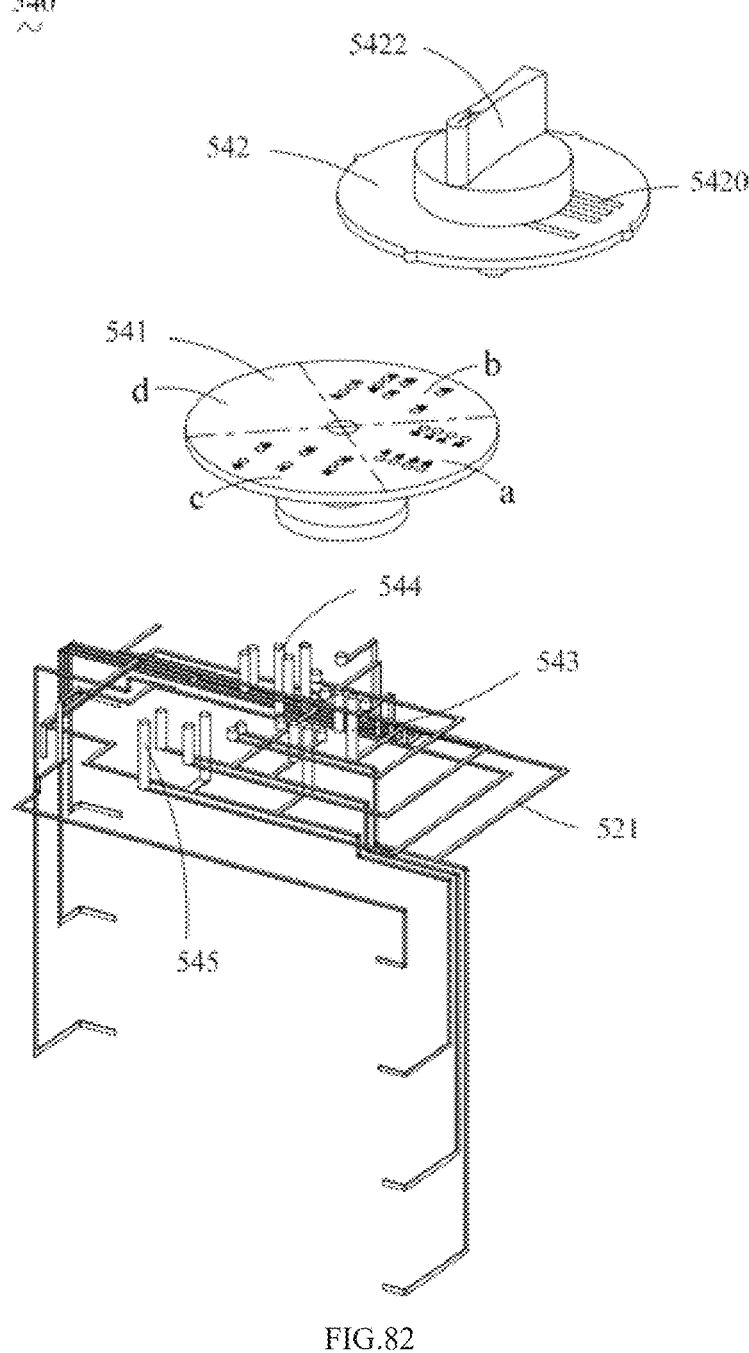
FIG. 82 is a partially exploded view of connection of the converting assembly of FIG. 79 with a conductive sheet.
Figure 83:
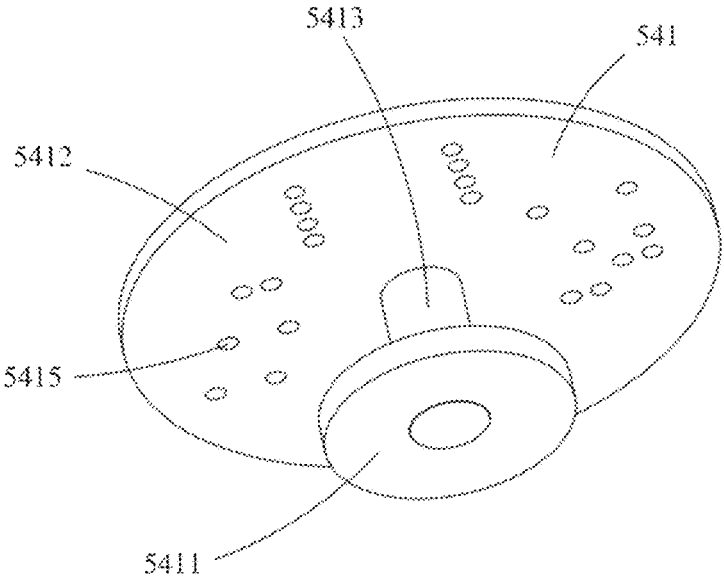
FIG. 83 is a perspective view of a fixing assembly of FIG. 82.
Figure 84:
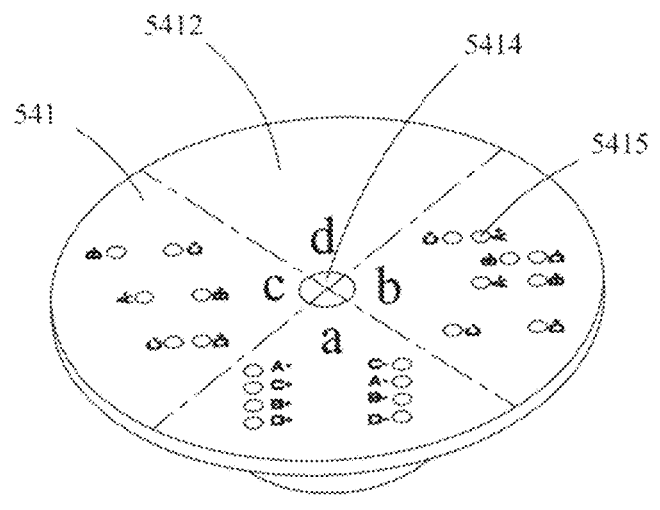
FIG. 84 is another perspective view of the fixing assembly shown in FIG. 83.
Figure 85:
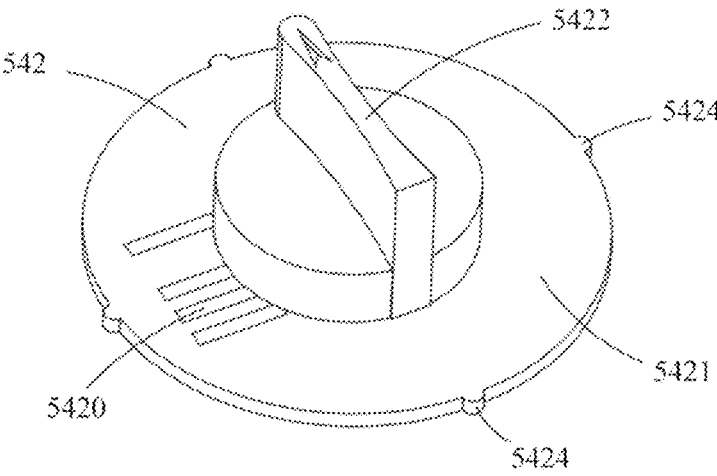
FIG. 85 is a perspective view of the rotating assembly of FIG. 82.
Figure 89:
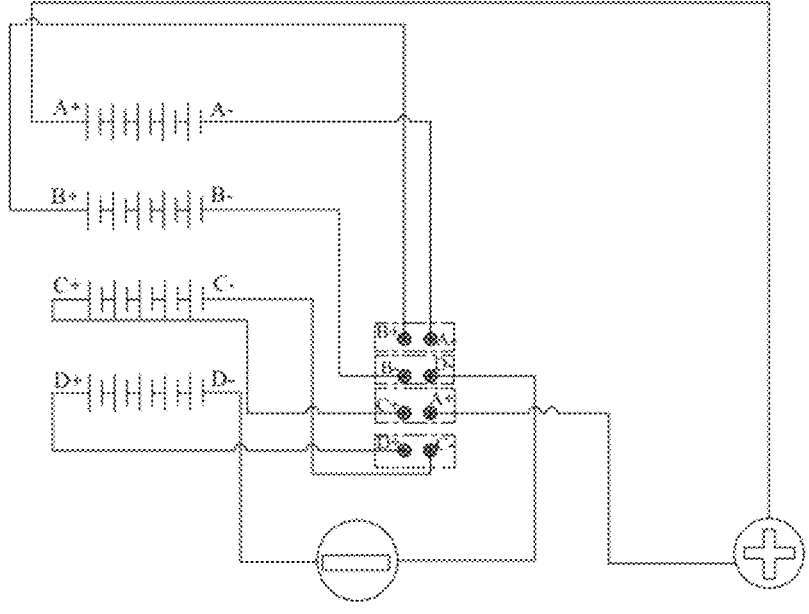
FIG. 89 is a circuit schematic diagram of the rotation of the rotating assembly to a second target area after the external coupling element shown in FIG. 87 is inserted.
Figure 90:
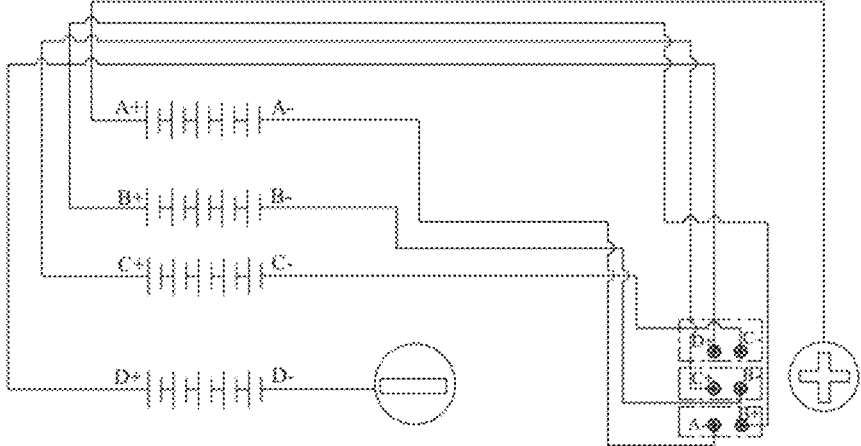
FIG. 90 is a circuit schematic diagram of the rotation of the rotating assembly to a third target area after the external coupling element shown in FIG. 87 is inserted.

As shown in FIG. 82, the rotating assembly 542 can be rotated by manually rotating the rotating part 5422. Therefore, the structures of the first external coupling element, the second external coupling element, and the third external coupling element may be identical or different. For a more convenient of description, the following will be illustrated with an external coupling element of the same structure.

As shown in FIG. 87, the external coupling element 550 includes a body part 551, and a positive inserting sheet 552 and a negative inserting sheet 553 which are integrally formed with the body part 551. After the external coupling element 550 is inserted, the positive inserting sheet 552 is inserted into the positive terminal 516, and the negative inserting sheet 553 is inserted into the negative terminal 517. Such that the battery pack 500 can electrically and mechanically connect with the external coupling element 550 to transmit of current and voltage.

As shown in FIG. 79 to FIG. 88, when the battery pack 500 is connected to the first power tool, the rotating part 5422 can be manually rotated to enable the entire rotating assembly 542 to rotate to the first target area a. Then the first triggering part 5420 at the bottom of the rotation body 5421 will connect the first positive convex column A+, the second positive convex column B+, the third positive convex column C+, and the fourth positive convex column D+. And the fourth triggering part 5420 will connect the first negative convex column A−, the second negative convex column B−, the third negative convex column C−, and the fourth negative convex column D−. So that the first battery string A, the second battery string B, the third battery string C, and the fourth battery string D are connected in parallel. At this point, the first operating voltage output by the battery pack 500 is equal to the rated output voltage of each battery string, namely, $U=u1=u2=u3=u4=20V$.

As shown in FIG. 79 to FIG. 88, when the battery pack 500 is connected to the second power tool, the rotating part 5422 can be manually rotated to enable the entire rotating assembly 542 to rotate to the second target area b. Then the first triggering part 5420 at the bottom of the rotating body 5421 will connect the third negative convex column C− with the fourth positive convex column D+. The second triggering part 5420 will connect the first negative convex column A− with the second positive convex column B+. The third triggering part 5420 will connect the second negative convex column B− with the fourth negative convex column D−. And the fourth triggering part 5420 will connect the third positive convex column C+ with the first positive convex column A+. Thereby the first battery string A and the second battery string B are connected in series, and the third battery string C and the fourth battery string D are connected in series. After that the first battery string A and the second battery string B are connected in parallel with the third battery string C and the fourth battery string D (connected in series-parallel). At this point, the second operating voltage output by the battery pack 500 is equal to the sum of the rated output voltages of two strings of battery cells, namely, $U=u1+u2=u3+u4=40$ V.

As shown in FIG. 79 to FIG. 90, when the battery pack 500 is connected to the third power tool, the rotating member 5422 can be manually rotated to enable the rotating assembly 542 to rotate to the third target area c. Then the first triggering part 5420 at the bottom of the rotating body 5421 will connect the second negative convex column B− with the third positive convex column C+. The second triggering part 5420 will connect the first negative convex column A− with the second positive convex column B+. And the fourth triggering part 5420 will connect the third negative convex column C− with the fourth positive convex column D+. Such that the first battery string A, the second battery string B, the third battery string C, and the fourth battery string D are connected in series. At this point, the third operating voltage output by the battery pack 500 is equal to the sum of the rated output voltages of the four strings of battery cells, namely, U=u1+u2+u3+u4=80 V.

As shown in FIG. 82 and FIG. 88 to FIG. 90, after the rotating assembly 542 is rotated to different target areas, the battery pack 500 can output different voltages to satisfy the voltage requirements of the three different power tools, and switch quickly and conveniently among the three voltages. After finishing the transmission of power, only require to rotate the entire rotating assembly 542 to the fourth target area d, and then pull out the external coupling element 550.

As shown in FIG. 82, in other embodiments, the rotation of the rotating part 5422 may also be configured to be triggered automatically, at which point triggering parts should be provided on the first external coupling element, the second external coupling element, and the third external coupling element which are corresponding to different voltages. Thereby the battery pack 500 is connected with the first power tool, the second power tool, or the third power tool. The corresponding rotating part can be used to trigger the rotating part 5422 to rotate to the corresponding target area to enable the battery pack 500 to output voltage. Preferably, the triggering parts may be protruding parts protruding from the first external coupling element, the second external coupling element, or the third external coupling element. The protruding part can be used to push the rotating part 5422 to rotate. The triggering part may also be a toothed rack disposed on the first external coupling element, the second external coupling element, or the third external coupling element. At this point, the corresponding teeth can be provided on the rotating part 5422 to engage with the corresponding rack, then the triggering part can be driven to rotate. Certainly, that should not be limited thereto.

As shown in FIG. 78 to FIG. 90, the battery pack 500 of the disclosure may also be applied to a charging system (not shown) that includes the aforementioned battery pack 500 and a charger that charges the battery pack 500. A charging interface is provided on the charger to couple with the battery interface of the battery pack 500. When the charger is connected with the battery pack 500 for charging, the rotating assembly 542 is rotated to the first target area a. At this time, the first battery string A, the second battery string B, the third battery string C, and the fourth battery string D are connected in parallel. The charging voltage output by the charger is equal to the rated output voltage of a single string battery cells, and is a low voltage that can protect the battery pack 500 from the impact of high current and high voltage.

As shown in FIG. 78 to FIG. 90, the battery pack 500 of the present embodiment utilizes the rotation of the rotating assembly 542 to connect with the connecting parts in different target areas. Thereby the series and parallel connection states of each battery string in the battery pack 500 can be switched to change the output voltage of the battery pack 500 (at least output three voltages). Then adaptability of the power tool system with the battery pack 500 can be improved.

In the description of this disclosure, the terminologies which includes present embodiment, example, specific example and the like, mean that a particular feature, structure, material, or characteristic described in the embodiments or examples should be included in at least one of the embodiment or example of the disclosure. In this specification, the schematic representations of the above terminologies not always refer to the same embodiment or example. Furthermore, the particular features, structures, materials, or characteristics as described may be combined in any one or more embodiments or examples in any proper way.

The embodiments of the disclosure above are only used to aid in the description of the disclosure. It is not intended to be exhaustive or to limit the disclosure to a specific embodiment. Obviously, many modifications and variations are possible in light of the disclosure. These embodiments are chosen and described in detail to better explain the principles and the practical application of the disclosure. Thereby those skilled in the art can easy to understand and utilize the disclosure. The disclosure is limited only by the claims and the full scope and equivalents thereof.

What is claimed is:

1. A multi-voltage battery pack for use with power tools of different operating voltages, the multi-voltage battery pack comprising:

a housing;

battery strings, disposed inside the housing, comprising:
　a first battery string, including a plurality of battery cells arranged in series;
　a second battery string, including a plurality of battery cells arranged in series;
　a third battery string, including a plurality of battery cells arranged in series; and
　a fourth battery string, including a plurality of battery cells arranged in series;

a battery interface, disposed on the housing for use with power tools;

a terminal assembly, disposed inside the housing and electrically connected with the battery strings; and a converting assembly, comprising an internal socket disposed opposite the terminal assembly, the converting assembly disposed within the housing and electrically connected to the battery strings, the converting assembly having a first state, a second state, and a third state; wherein the converting assembly comprises a first connecting assembly, a second connecting assembly, and a third connecting assembly simultaneously arranged at intervals inside the internal socket and connectable to the terminal assembly respectively, the first connecting assembly, the second connecting assembly, and the third connecting assembly are arranged at intervals along a sliding direction of the internal socket to form a plurality of rows, the first connecting assembly is in a first row of the plurality of rows, the second connecting assembly is in a second row of the plurality of rows, and the third connecting assembly is in a third row of the plurality of rows;

the first connecting assembly, the second connecting assembly, and the third connecting assembly have connecting sheets, the connecting sheets of the first connecting assembly, the second connecting assembly and the third connecting assembly are configured differently to switch connection states of the battery strings when the terminal assembly is connected to the first connecting assembly the second connecting assembly or the third connecting assembly, connection states of the battery strings are switched through pushing the converting assembly to slide along the sliding direction of the internal socket to different positions so that the first connecting assembly, the second connecting assembly, or the third connecting assembly is connected to the terminal assembly;

when the terminal assembly is electrically connected to the first connecting assembly, the converting assembly is in the first state, the converting assembly is located at a first position, the multi-voltage battery pack outputs a first operating voltage;

when the terminal assembly is electrically connected to the second connecting assembly, the converting assembly is in the second state, the converting assembly is located at a second position, the multi-voltage battery pack outputs a second operating voltage; and when the terminal assembly is electrically connected to the third connecting assembly, the converting assembly is in the third state, the converting assembly is located at a third position, the multi-voltage battery pack outputs a third operating voltage; wherein the third operating voltage is greater than the second operating voltage, and the second operating voltage is greater than the first operating voltage.

2. The multi-voltage battery pack of claim 1, wherein
the first battery string is provided with a first positive electrode and a first negative electrode,
the second battery string is provided with a second positive electrode and a second negative electrode,
the third battery string is provided with a third positive electrode and a third negative electrode, and
the fourth battery string is provided with a fourth positive electrode and a fourth negative electrode.

3. The multi-voltage battery pack of claim 2, wherein
when the converting assembly is in the first state,
the first positive electrode, the second positive electrode, the third positive electrode and the fourth positive electrode are connected to each other,
the first negative electrode, the second negative electrode, the third negative electrode and the fourth negative electrode are connected to each other, and
the first battery string, the second battery string, the third battery string and the fourth battery string are connected in parallel.

4. The multi-voltage battery pack of claim 2, wherein
when the converting assembly is in the second state,
the first positive electrode and the second positive electrode are connected to each other,
the first negative electrode, the second negative electrode, the third positive electrode, and the fourth positive electrode are connected to each other,
the third negative electrode and the fourth negative electrode are connected to each other, and
the first battery string, the second battery string, the third battery string, and the fourth battery string are in a parallel-series state.

5. The multi-voltage battery pack of claim 2, wherein
when the converting assembly is in the second state,
the first positive electrode and the third positive electrode are connected to each other,
the first negative electrode and the second positive electrode are connected to each other,
the third negative electrode and the fourth positive electrode are connected to each other,
the second negative electrode and the fourth negative electrode are connected to each other, and
the first battery string, the second battery string, the third battery string, and the fourth battery string are in a series-parallel state.

6. The multi-voltage battery pack of claim 2, wherein
when the converting assembly is in the third state,
the first negative electrode is connected to the second positive electrode,
the second negative electrode is connected to the third positive electrode,
the third negative electrode is connected to the fourth positive electrode, and the first battery string, the second battery string, the third battery string, and the fourth battery string are connected in series.

7. The multi-voltage battery pack of claim 1, wherein
the voltages of the first battery string, the second battery string, the third battery string, and the fourth battery string are separately nV,
the first operating voltage is nV,
the second operating voltage is 2nV, and
the third operating voltage is 4nV.

8. The multi-voltage battery pack of claim 7, wherein
when nV is 18 V,
the first operating voltage is 18 V,
the second operating voltage is 36 V, and
the third operating voltage is 72 V.

9. The multi-voltage battery pack of claim 7, wherein
when nV is 20 V,
the first operating voltage is 20 V,
the second operating voltage is 40 V, and
the third operating voltage is 80 V.

10. The multi-voltage battery pack according to claim 7, wherein
when nV is 24 V,
the first operating voltage is 24 V,
the second operating voltage is 48 V, and
the third operating voltage is 96 V.

11. The multi-voltage battery pack of claim 1, further comprising a circuit board and an output terminal, wherein
the circuit board is disposed inside the housing and electrically connected to the output terminal,
the output terminal is used for outputting energy to the power tool, and
an output terminal groove is configured on the battery interface to contain the output terminal.

12. The multi-voltage battery pack of claim 1, wherein
the first battery string is horizontally disposed, the second battery string is disposed above the first battery string, the third battery string is disposed above the second battery string, and the fourth battery string is disposed above the third battery string.

13. The multi-voltage battery pack of claim 1, wherein
each of the first battery string, the second battery string, the third battery string, and the fourth battery string includes five battery cells.

14. The multi-voltage battery pack according to claim 1, wherein
each of the first battery string, the second battery string, the third battery string, and the fourth battery string includes six battery cells.

15. The multi-voltage battery pack according to claim 1, wherein
in an initial state, the converting assembly is in the first state, the first battery string, the second battery string, the third battery string, and the fourth battery string are connected in parallel, and the multi-voltage battery pack outputs the first operating voltage.

16. The multi-voltage battery pack of claim 1, wherein
the internal socket further comprises a substrate and a spring structure, the first connecting assembly, the second connecting assembly, and the third connecting assembly are integrally-formed with the substrate, the substrate is provided with ribs and sliding grooves located on both sides of each rib, the first connecting assembly, the second connecting assembly, and the third connecting assembly are formed and exposed on the ribs, contact sheets of the terminal assembly are contained in the sliding grooves and clamping the ribs respectively, when the internal socket slides, the terminal assembly slides within the sliding grooves and maintains a state in which the ribs are clamped and abutted by the contact sheets of the terminal assembly, when the internal socket slides to the first position along the sliding grooves, the terminal assembly is electrically connected to the first connecting assembly, the first battery string, the second battery string, the third battery string, and the fourth battery string are connected in parallel to output the first operating voltage;

when the internal socket slides to the second position along the sliding grooves, the terminal assembly is electrically connected to the second connecting assembly, so that the first battery string is connected in parallel with the second battery string, the third battery string is connected in parallel with the fourth battery string, and then the first battery string and the second battery string are connected in series with the third battery string and the fourth battery string to output the second operating voltage; or the first battery string is connected in series with the second battery string, the third battery string is connected in series with the fourth battery string, and then the first battery string and the second battery string are connected in parallel with the third battery string and the fourth battery string to output the second operating voltage;

when the internal socket slides to the third position along the sliding grooves, the terminal assembly is electrically connected to the third connecting assembly, the first battery string, the second battery string, the third battery string, and the fourth battery string are connected in series to output the third operating voltage.

17. A power tool system, comprising:

a first power tool, having a first tool interface and capable of operating at a first operating voltage;

a second power tool, having a second tool interface and capable of operating at a second operating voltage;

a third power tool, having a third tool interface and capable of operating at a third operating voltage; and a multi-voltage battery pack comprising:

a housing;

battery strings, disposed inside the housing, comprising:

a first battery string, including a plurality of battery cells arranged in series;

a second battery string, including a plurality of battery cells arranged in series;

a third battery string, including a plurality of battery cells arranged in series; and a fourth battery string, including a plurality of battery cells in series;

a battery interface, disposed on the housing for use with (1) the first tool interface of the first power tool, (2) the second tool interface of the second power tool, and (3) the third tool interface of the third power tool;

a terminal assembly, disposed inside the housing and electrically connected with the battery strings; and a converting assembly, comprising an internal socket disposed opposite the terminal assembly, the converting assembly disposed within the housing and electrically connected to the battery strings, the converting assembly having a first state, a second state, and a third state, wherein the converting assembly comprises a first connecting assembly, a second connecting assembly, and a third connecting assembly simultaneously arranged at intervals inside the internal socket and connectable to the terminal assembly respectively, the first connecting assembly, the second connecting assembly, and the third connecting assembly are arranged at intervals along a sliding direction of the internal socket to form a plurality of rows, the first connecting assembly is in a first row of the plurality of rows, the second connecting assembly is in a second row of the plurality of rows, and the third connecting assembly is in a third row of the plurality of rows;

the first connecting assembly, the second connecting assembly, and the third connecting assembly have connecting sheets, the connecting sheets of the first connecting assembly, the second connecting assembly and the third connecting assembly are configured differently to switch connection states of the battery strings when connecting the terminal assembly to the first connecting assembly, the second connecting assembly or the third connecting assembly, connection states of the battery strings are switched through pushing the converting assembly to slide along the sliding direction of the internal socket to different positions so that the first connecting assembly, the second connecting assembly, or the third connecting assembly is connected to the terminal assembly:

when the terminal assembly is electrically connected to the first connecting assembly, the first power tool is coupled with the multi-voltage battery pack, the converting assembly is in the first state, the converting assembly is located at a first position, and the multi-voltage battery pack outputs the first operating voltage to the first power tool;

when the terminal assembly is electrically connected to the second connecting assembly, the second power tool is coupled with the multi-voltage battery pack, the converting assembly is in the second state, the converting assembly is located at a second position, and the multi-voltage battery pack outputs the second operating voltage to the second power tool; and when the terminal assembly is electrically connected to the third connecting assembly, the third power tool is coupled with the multi-voltage battery pack, the converting assembly is in the third state, the converting assembly is located at a third position, and the multi-voltage battery pack outputs the third operating voltage to the third power tool; wherein the third operating voltage is greater than the second operating voltage, and the second operating voltage is greater than the first operating voltage.

18. The power tool system of claim 17, wherein the first tool interface has a first plug of a first configuration, the second tool interface has a second plug of a second configuration, and the third tool interface has a third plug of a third configuration, wherein the first plug, the second plug, and the third plug are different in configuration.

19. The power tool system of claim 18, wherein at least two of the first plug, the second plug, and the third plug are provided with a triggering device, and the triggering device is used for cooperating with the converting assembly to enable the converting assembly to switch between different states.

20. A charging system, comprising:

a charger, having a charging interface; and a multi-voltage battery pack for use with power tools of different operating voltages, the multi-voltage battery pack comprising:

a housing;

battery strings, disposed inside the housing, comprising:

a first battery string, including a plurality of battery cells arranged in series;

a second battery string, including a plurality of battery cells arranged in series;

a third battery string, including a plurality of battery cells arranged in series; and a fourth battery string, including a plurality of battery cells arranged in series;

a battery interface, disposed on the housing for use with power tools;

a terminal assembly, disposed inside the housing and electrically connected with the battery strings; and a converting assembly, comprising an internal socket disposed opposite the terminal assembly, the converting assembly disposed within the housing and electrically connected to the battery strings, the converting assembly having a first state, a second state, and a third state; wherein the converting assembly comprises a first connecting assembly, a second connecting assembly, and a third connecting assembly simultaneously arranged at intervals inside the internal socket and connectable to the terminal assembly respectively, the first connecting assembly, the second connecting assembly, and the third connecting assembly are arranged at intervals along a sliding direction of the internal socket to form a plurality of rows, the first connecting assembly is in a first row of the plurality of rows, the second connecting assembly is in a second row of the plurality of rows, and the third connecting assembly is in a third row of the plurality of rows;

the first connecting assembly, the second connecting assembly, and the third connecting assembly have connecting sheets, the connecting sheets of the first connecting assembly, the second connecting assembly and the third connecting assembly are configured differently to switch connection states of the battery strings when connecting the terminal assembly to the first connecting assembly, the second connecting assembly or the third connecting assembly, connection states of the battery strings are switched through pushing the converting assembly to slide along the sliding direction of the internal socket to different positions so that the first connecting assembly, the second connecting assembly, or the third connecting assembly is connected to the terminal assembly;

when the terminal assembly is electrically connected to the first connecting assembly, the converting assembly is in the first state, the converting assembly is located at a first position, the multi-voltage battery pack outputs a first operating voltage;

when the terminal assembly is electrically connected to the second connecting assembly, the converting assembly is in the second state, the converting assembly is located at a second position, the multi-voltage battery pack outputs a second operating voltage; and when the terminal assembly is electrically connected to the third connecting assembly, the converting assembly is in the third state, the converting assembly is located at a third position, the multi-voltage battery pack outputs a third operating voltage; wherein the third operating voltage is greater than the second operating voltage, and the second operating voltage is greater than the first operating voltage;

wherein when the multi-voltage battery pack is coupled with the charger, the charging interface is coupled with the battery interface, the converting assembly is in the first state, and the first battery string, the second battery string, the third battery string, and the fourth battery string are connected in parallel, then the charger charges the multi-voltage battery pack in the first operating voltage.

* * * * *